(12) United States Patent
Park et al.

(10) Patent No.: US 11,508,367 B2
(45) Date of Patent: Nov. 22, 2022

(54) DIALOGUE SYSTEM AND DIALOGUE PROCESSING METHOD

(71) Applicants: HYUNDAI MOTOR COMPANY, Seoul (KR); KIA MOTORS CORPORATION, Seoul (KR); SOGANG UNIVERSITY RESEARCH & BUSINESS DEVELOPMENT FOUNDATION, Seoul (KR)

(72) Inventors: Youngmin Park, Gunpo-si (KR); Seona Kim, Seoul (KR); Jeong-Eom Lee, Yongin-si (KR); Jung Yun Seo, Seoul (KR)

(73) Assignees: HYUNDAI MOTOR COMPANY, Seoul (KR); KIA MOTORS CORPORATION, Seoul (KR); SOGANG UNIVERSITY RESEARCH & BUSINESS DEVELOPMENT FOUNDATION, Seoul (KR)

( * ) Notice: Subject to any disclaimer, the term of this patent is extended or adjusted under 35 U.S.C. 154(b) by 440 days.

(21) Appl. No.: 16/673,551

(22) Filed: Nov. 4, 2019

(65) Prior Publication Data
US 2020/0258514 A1 Aug. 13, 2020

(30) Foreign Application Priority Data
Feb. 11, 2019 (KR) .......................... 10-2019-0015728

(51) Int. Cl.
*G10L 15/22* (2006.01)
*G10L 15/18* (2013.01)
(Continued)

(52) U.S. Cl.
CPC .......... *G10L 15/22* (2013.01); *G01C 21/3608* (2013.01); *G01C 21/3629* (2013.01);
(Continued)

(58) Field of Classification Search
None
See application file for complete search history.

(56) References Cited

U.S. PATENT DOCUMENTS 6,023,673 A * 2/2000 Bakis .................... G10L 15/083
704/231
6,246,986 B1 * 6/2001 Ammicht ................ G10L 15/22
704/E15.04
(Continued)

*Primary Examiner* — Neeraj Sharma
(74) *Attorney, Agent, or Firm* — Lempia Summerfield Katz LLC

(57) ABSTRACT

A dialogue system includes: a storage configured to store a parameter tree including at least one parameter used for performing an action; a speech input device configured to receive speech from a user; an input processor configured to apply a natural language understanding algorithm to the received speech to generate a speech recognition result; a dialogue manager configured to determine an action corresponding to the received speech based on the speech recognition result, to retrieve a parameter tree corresponding to the action from the storage, and to determine additional information needed to perform the action based on the retrieved parameter tree; and a result processor configured to generate a dialogue response for requesting the additional information.

19 Claims, 42 Drawing Sheets

(51) Int. Cl.
  *G01C 21/36* (2006.01)
  *G10L 15/30* (2013.01)
  *G10L 15/26* (2006.01)

(52) U.S. Cl.
  CPC .......... *G10L 15/1815* (2013.01); *G10L 15/26* (2013.01); *G10L 15/30* (2013.01); *G10L 2015/223* (2013.01); *G10L 2015/228* (2013.01)

(56) References Cited

U.S. PATENT DOCUMENTS

| | | | | |
|---|---|---|---|---|
| 6,553,342 | B1 * | 4/2003 | Zhang | G10L 15/02 |
| | | | | 704/207 |
| 6,587,824 | B1 * | 7/2003 | Everhart | G10L 15/07 |
| | | | | 704/275 |
| 9,837,075 | B2 * | 12/2017 | Watanabe | G10L 15/22 |
| 2003/0115289 | A1 * | 6/2003 | Chinn | G06F 16/10 |
| | | | | 704/E15.044 |
| 2004/0225650 | A1 * | 11/2004 | Cooper | G10L 13/00 |
| 2007/0265849 | A1 * | 11/2007 | Grost | G10L 15/32 |
| | | | | 704/207 |
| 2008/0172376 | A1 * | 7/2008 | Yu | G06F 16/3334 |
| | | | | 707/999.005 |
| 2013/0304758 | A1 * | 11/2013 | Gruber | G06F 16/9535 |
| | | | | 707/769 |
| 2015/0235651 | A1 * | 8/2015 | Sharifi | G10L 15/20 |
| | | | | 704/233 |

* cited by examiner

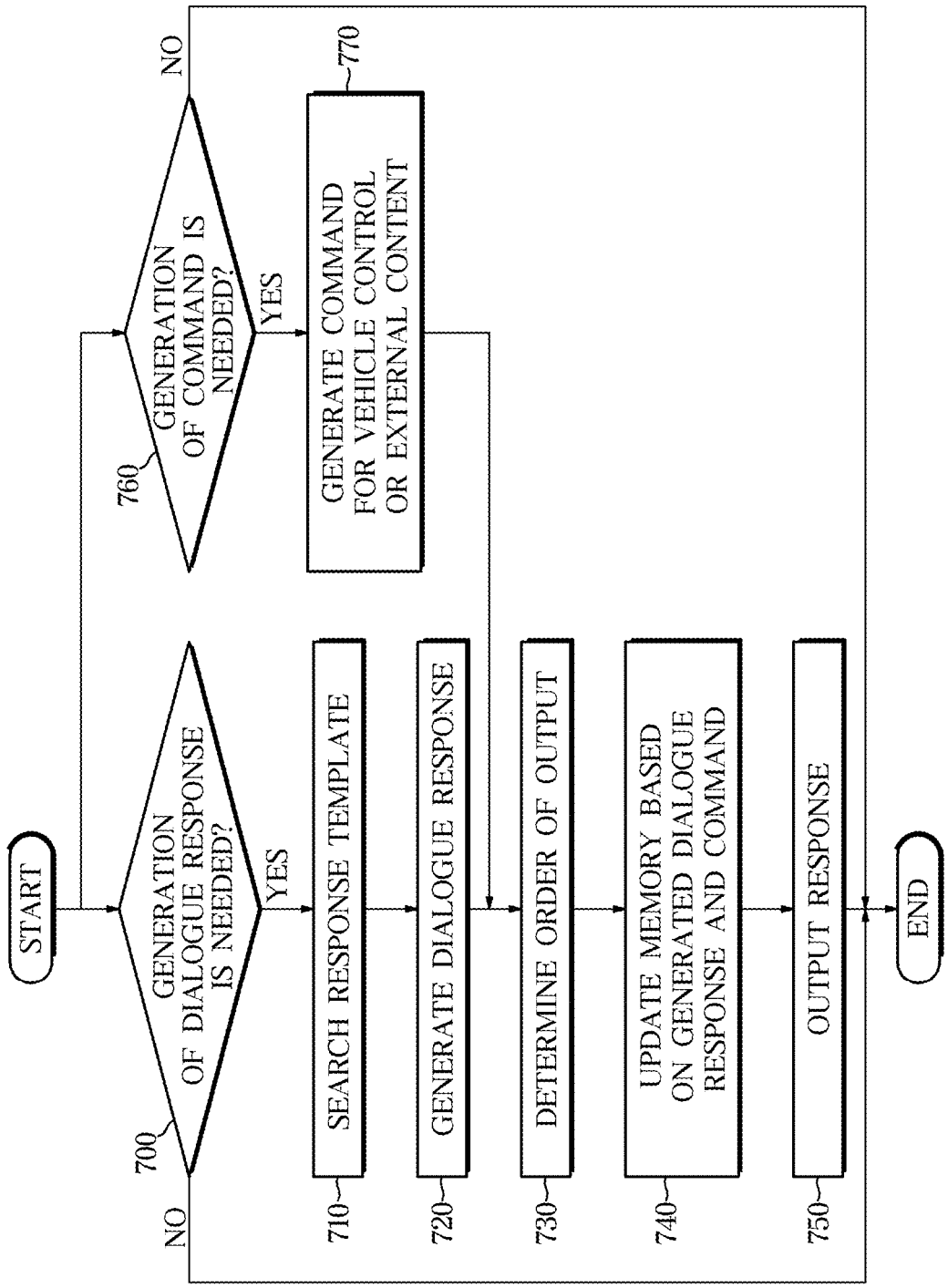

DIALOGUE SYSTEM AND DIALOGUE PROCESSING METHOD

CROSS-REFERENCE TO RELATED APPLICATION

This application is based on and claims priority under 35 U.S.C. § 119 to Korean Patent Application No. 10-2019-0015728, filed on Feb. 11, 2019 in the Korean Intellectual Property Office, the disclosure of which is incorporated by reference herein in its entirety.

BACKGROUND

1. Technical Field

Embodiments of the present disclosure relate generally to a dialogue system and a dialogue processing method. More particularly, the present disclosure relates to a dialogue system configured to provide information or a service needed for a user by recognizing the user's intent through dialogue with the user, a vehicle having the same, and a dialogue processing method.

2. Description of Related Art

Providing visual information to a user or requesting user input while driving a vehicle may cause inconvenience due to the user having to interact with a small interface (e.g., a small screen, a small button, and the like).

Particularly, when a user removes a hand from the steering wheel or looks away from the road to check visual information while driving, it may pose serious risks of harm.

Therefore, when implementing a dialogue system in a vehicle, it is preferable to provide such services in a safer and more convenient manner. Particularly, the dialogue system should be capable of recognizing a user's intent through dialogue with the user and safely providing information or services necessary for the user.

SUMMARY

It is an aspect of the disclosure to provide a dialogue system capable of providing a service in accordance with a user's real intent or capable of providing services necessary for the user by precisely recognizing the user's intent based on a variety of information such as dialogue with the user during driving.

In accordance with embodiments of the disclosure, a dialogue system may include a storage configured to store a parameter tree including at least one parameter used for performing an action. The dialogue system may further include a speech input device configured to receive speech from a user. The dialogue system may also include an input processor configured to apply a natural language understanding algorithm to the received speech to generate a speech recognition result. The dialogue system may also include a dialogue manager configured to determine an action corresponding to the received speech based on the speech recognition result, retrieve a parameter tree corresponding to the action from the storage, and determine additional information needed to perform the action based on the retrieved parameter tree. The dialogue system may further include a result processor configured to generate a dialogue response for requesting the additional information.

The dialogue manager may obtain a parameter value for at least one parameter included in the parameter tree from the speech recognition result. The dialogue manager may fill at least one parameter included in the parameter tree based on the obtained parameter value and may determine information on a parameter that is not filled with the parameter value as the additional information.

The dialogue manager may determine whether the first hierarchy is filled based on whether the first parameter is an alternative parameter or a partial parameter when a parameter value for a first parameter located in a first hierarchy of the parameter tree is obtained. The dialogue manager may determine information on a parameter that is not filled with the parameter value among the parameters located in the first hierarchy as the additional information when the first hierarchy is not filled.

The dialogue manager may determine information on a partial parameter that is not filled with the parameter value of the partial parameter located in the first hierarchy as the additional information when the first parameter is the partial parameter.

The dialogue manager may confirm that the first hierarchy is filled when a parameter value for all partial parameters located in the first hierarchy is obtained. The dialogue manager may obtain a parameter value of an upper parameter of the first parameter based on a parameter value of all partial parameters located in the first hierarchy.

The dialogue manager may confirm that the first hierarchy is filled when the first parameter is the alternative parameter. The dialogue manager may obtain a parameter value of an upper parameter of the first parameter based on a parameter value of the first parameter.

The dialogue manager may determine information on a partial parameter that is not filled with the parameter value among the partial parameters located in the upper hierarchy of the first hierarchy as the additional information when the upper parameter of the first parameter is a partial parameter.

The dialogue manager may transmit the obtained parameter value to the result processor when the parameter value for the highest-order parameter of the parameter tree is obtained. The result processor may generate an interactive response for performing an action corresponding to the received speech based on a parameter value for the highest parameter.

The storage may store status information including at least one of vehicle status information related to the status of the vehicle, user information related to the driver of the vehicle, or driving environment information related to the driving environment of the vehicle. The dialogue manager may convert the parameter value of the highest parameter into information of a predetermined format based on the context information.

The dialogue manager may obtain parameter value of at least one parameter included in the parameter tree based on the status information.

Furthermore, in accordance with embodiments of the disclosure, a dialogue processing method for a vehicle may include a dialogue system having a storage configured to store a parameter tree including at least one parameter used for performing an action. The dialogue processing method for a vehicle may include: receiving speech from a user; generating a speech recognition result by applying a natural language understanding algorithm: determining an action corresponding to the received speech based on the speech recognition result, retrieving the parameter tree corresponding to the action from the storage, and determining additional information needed to perform the action based on the retrieved parameter tree; and generating a dialogue response for requesting the additional information.

Determining additional information needed to perform the action may include obtaining a parameter value for at least one parameter included in the parameter tree from the speech recognition result, filling at least one parameter included in the parameter tree based on the obtained parameter value, and determining information on a parameter that is not filled with the parameter value as the additional information.

Determining additional information needed to perform the action may include determining whether the first hierarchy is filled based on whether the first parameter is an alternative parameter or a partial parameter when a parameter value for a first parameter located in a first hierarchy of the parameter tree is obtained, and determining information on a parameter that is not filled with the parameter value among the parameters located in the first hierarchy as the additional information when the first hierarchy is not filled.

Determining additional information needed to perform the action may include determining information on a partial parameter that is not filled with the parameter value of the partial parameter located in the first hierarchy as the additional information when the first parameter is the partial parameter.

Determining additional information needed to perform the action may include confirming that the first hierarchy is filled when a parameter value for all partial parameters located in the first hierarchy is obtained and obtaining a parameter value of an upper parameter of the first parameter based on a parameter value of all partial parameters located in the first hierarchy.

Determining additional information needed to perform the action may include confirming that the first hierarchy is filled when the first parameter is the alternative parameter and obtaining a parameter value of an upper parameter of the first parameter based on a parameter value of the first parameter.

Determining additional information needed to perform the action may include determining information on a partial parameter that is not filled with the parameter value among the partial parameters located in the upper hierarchy of the first hierarchy as the additional information when the upper parameter of the first parameter is a partial parameter.

When the parameter value for a highest-order parameter of the parameter tree is obtained, the method may further generate a speech response for performing an action corresponding to the received speech based on the obtained parameter value.

The storage may store status information including at least one of vehicle status information related to the status of the vehicle, user information related to the driver of the vehicle, or driving environment information related to the driving environment of the vehicle. The method may further generate a speech response for performing an action corresponding to the received speech converting the parameter value of the highest parameter into information of a predetermined format based on the status information.

The method may further determine additional information needed to perform the action and obtain a parameter value of at least one parameter included in the parameter tree based on the status information.

Furthermore, in accordance with embodiments of the disclosure, a computer program is stored on a recording medium. The recording medium is disposed in a computer device and is coupled to a processor. The execution of the computer program by the processor causes the computer device to provide functions including: receiving speech from a user; generating a speech recognition result by applying a natural language understanding algorithm; determining an action corresponding to the received speech based on the speech recognition result, retrieving a parameter tree corresponding to the action from the storage, and determining additional information needed to perform the action based on the retrieved parameter tree; and generating a dialogue response for requesting the additional information.

BRIEF DESCRIPTION OF THE DRAWINGS

These and/or other aspects of the disclosure will become apparent and more readily appreciated from the following description of embodiments, taken in conjunction with the accompanying drawings of which:

FIG. 36 is a flowchart illustrating a result processing method for generating a response corresponding to a result of the dialogue management in the dialogue processing method in accordance with embodiments of the present disclosure;

Figure 1:
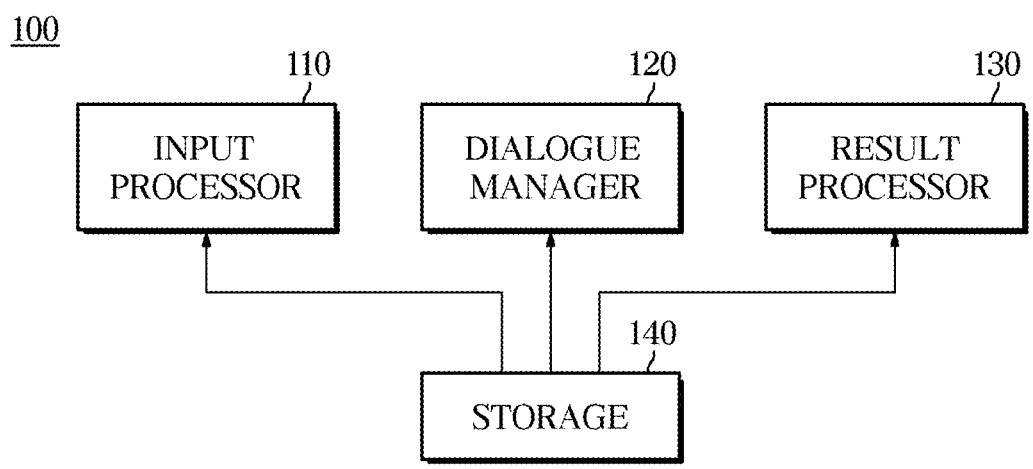
FIG. 1 is a control block diagram illustrating a dialogue system in accordance with an embodiment of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, may be determined in part by the particular intended application and use environment.

DETAILED DESCRIPTION OF THE EMBODIMENTS

Hereinafter, embodiments of the present disclosure are described in detail with reference to the accompanying drawings. As those having ordinary skill in the art would realize, the described embodiments may be modified in various different ways, all without departing from the spirit or scope of the present disclosure. In the following description, like reference numerals refer to like elements throughout the specification.

The terminology used herein is for the purpose of describing particular embodiments only and is not intended to be limiting of the disclosure. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It should be understood that when an element is referred to as being "connected" another element, it may be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

As used herein, the singular forms "a," "an" and "the" are intended to include the plural forms as well, unless the context dearly indicates otherwise.

An identification code is used for the convenience of the description but is not intended to illustrate the order of each step. Each step may be implemented in the order different from the illustrated order unless the context clearly indicates otherwise.

Reference is made below in detail to embodiments of the present disclosure, examples of which are illustrated in the accompanying drawings.

FIG. 1 is a control block diagram illustrating a dialogue system in accordance with embodiments of the present disclosure.

As shown in FIG. 1, a dialogue system 100 may include an input processor 110 processing a user input including a user's speech and an input other than the user speech, or an input including information related to a vehicle or information related to a user. The dialogue system 100 may further include a dialogue manager 120 to recognize a user's intent and a vehicle state using a result of the process of the input processor 110 and to determine an action corresponding to the user's intent or the vehicle state. The dialogue system 100 may also include a result processor 130 to provide a certain service according to an output result of the dialogue manager 120 or to output a system utterance for continuing the dialogue. The dialogue system 100 may further include a storage 140 storing a variety of information for the operation described later.

The input processor 110 may receive a user voice. At this time, the user may include both the driver and the passenger.

The input processor 110 may receive input such as a user speech and an input other than the speech. The input other than the speech may include recognizing the user's gesture, an input other than the user's speech input by an operation of an input device, vehicle state information indicating a vehicle state, driving environment information indicating driving information of the vehicle and user information indicating user's state. In addition, other than the above mentioned-information, information indicating that the user and the vehicle may be input to the input processor 110, if the information is used for recognizing a user's intent or providing a service to a user or a vehicle. A user may include a driver and a passenger.

The input processor 110 converts a user's speech into an utterance in the text type by recognizing the user's speech and recognizes a user's intent by applying natural language understanding algorithm to the user utterance.

The input processor 110 collects information indicating the vehicle state or the driving environment of the vehicle other than the user speech, and then understands the context using the collected information.

The input processor 110 transmits the user's intent, which is obtained by the natural language understanding technology, and the information related to the context to the dialogue manager 120.

The dialogue manager 120 determines an action corresponding to the user's intent or the current context based on the user's intent and the information related to the context transmitted from the input processor 110. The dialogue manager 120 manages parameters that are needed to perform the corresponding action.

According to embodiments of the present disclosure, the action may represent all kinds of actions for providing a certain service, and the kinds of the action may be determined in advance. As needed, providing a service may correspond to performing an action.

For example, actions such as a route guidance, a vehicle state check, and gasoline station recommendation may be pre-defined in a domain/action inference rule DB 141 (refer to FIG. 20A), and it may be possible to extract an action corresponding to a user's utterance, i.e., an action intended by a user, according to the stored inference rule.

There is no limitation in the kinds of the action. If an action is allowed to be performed by the dialogue system 100 via the vehicle 200 or the mobile device 400 and is pre-defined while the inference rule thereof or a relation with other action/event is stored, the action may become the above-mentioned action.

The dialogue manager 120 transmits information related to the determined action to the result processor 130.

The result processor 130 generates and outputs a dialogue response and a command that is needed to perform the transmitted action. The dialogue response may be output in text, image or audio type. When the command is output, a service such as vehicle control and external content provision, corresponding to the output command, may be performed.

The storage 140 stores a variety of information for the dialogue processing and the service provision. For example, the storage 140 may pre-store information related to domains, actions, speech acts and entity names used for the natural language understanding and a context understanding table used for understanding the context from the input information. In addition, the storage 140 may pre-store data detected by a sensor provided in the vehicle, information related to a user, and information needed for the action. A description of information stored in the storage 140 will be described later.

As mentioned above, the dialogue system 100 provides a dialogue processing technology that is specified for the vehicle environment. All or some of components of the dialogue system 100 may be contained in the vehicle. The dialogue system 100 may be provided in the remote server and the vehicle may act as a gateway between the dialogue system 100 and a user. In either case, the dialogue system 100 may be connected to the user via the vehicle or the mobile device connected to the vehicle.

Figure 2:
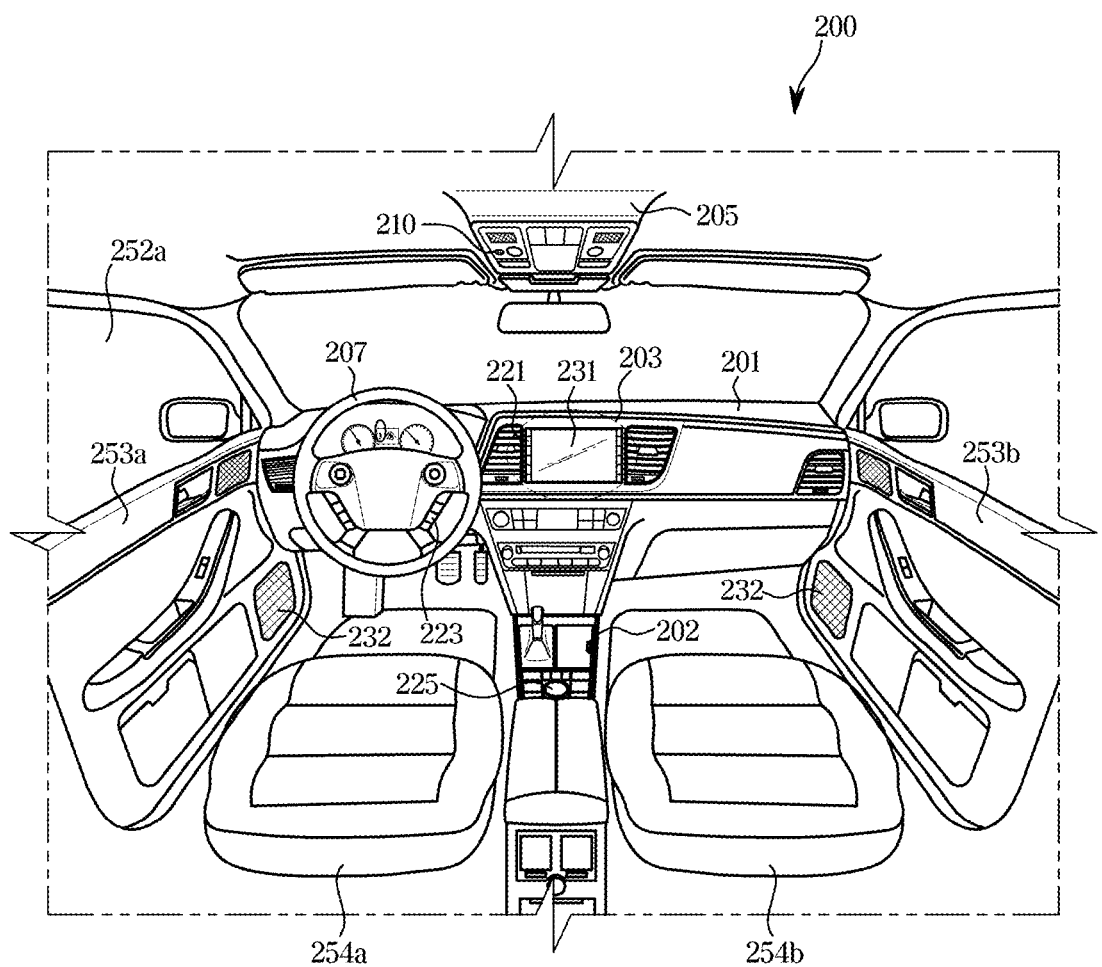
FIG. 2 is a view illustrating an interior of a vehicle.

FIG. 2 is a view illustrating an interior of a vehicle.

As shown in FIG. 2, a display 231 configured to display a screen required for the control of the vehicle including an audio function, a video function, a navigation function, and a calling function, and an input button 221 configured to receive a user's control command may be provided in a center fascia 203 corresponding to the center portion of a dashboard inside of the vehicle 200.

For the user's operation convenience, an input button may be provided in a steering wheel 207 and a jog shuttle 225 acting as an input button may be provided in a center console region 202 provided between a driver seat 254a and a passenger seat 254b.

A module including the display 231, the input button 221 and a processor controlling a variety of functions may correspond to an audio video navigation (AVN) terminal or a head unit.

The display 231 may be implemented by any one of various display devices, e.g., Liquid Crystal Display (LCD), Light Emitting Diode (LED), Plasma Display Panel (PDP), Organic Light Emitting Diode (OLED), and Cathode Ray Tube (CRT).

The input button 221 may be provided in a hard key type on an area adjacent to the display 231, as illustrated in FIG. 2. Alternatively, when the display 231 is implemented by a touch screen, the display 231 may perform a function of the input button 221.

The vehicle 200 may receive a user control command as a speech via a speech input device 210. The speech input device 210 may include a microphone configured to receive the sound and then covert the sound into an electrical signal.

For the effective speech input, the speech input device 210 may be mounted to a head lining 205, as illustrated in FIG. 2, but the vehicle 200 is not limited thereto. Therefore, the speech input device 210 may be mounted to the dashboard 201 or the steering wheel 207. In addition, the speech input device 210 may be mounted to any position if a position is appropriate for receiving the user's speech.

In the inside of the vehicle 200, a speaker 232 configured to perform dialogue with a user or configured to output a sound required to provide the service desired by the user may be provided. For example, the speaker 232 may be provided inside of the driver's seat door 253a and the passenger-seat door 253b.

The speaker 232 may output a speech for navigation route guidance, a sound or a speech contained in the audio and video contents, a speech for providing information or service desired by the user, and a system utterance generated as a response to the user's utterance.

The dialogue system 100 according to one embodiment may perform an object-oriented conversation that outputs an appropriate response for a particular purpose of the user. At this time, the dialogue system 100 may be a Task-Oriented Dialogue System.

The dialogue system 100 may output an appropriate response to the user's utterance based on the knowledge information of the corresponding area in the domain corresponding to the utterance of the user having a specific purpose. The knowledge information of the corresponding region may include information stored in a storage 140 of the dialogue system 100 (FIG. 1). The knowledge information may include information received from an external apparatus.

For example, when a user requests to find information of a specific program, such as a 'register schedule' question, the dialogue system 100 may output an appropriate response for 'schedule registration' within the domain 'schedule management'.

For this, the dialogue system 100 may acquire a parameter value corresponding to at least one parameter for a specific domain from the speech recognition result of the user. The dialogue system 100 may fill the obtained parameter value into each of at least one parameter corresponding thereto. Intent and purpose may be grasped. In this case, filling a parameter with a parameter value means matching a parameter value to a parameter and includes generating a pair of a parameter and a corresponding parameter value.

In other words, the dialogue system 100 may recognize the intention and purpose of the user's utterance by performing slot-filling on the parameter of the specific domain and may output an appropriate response corresponding thereto.

However, when the user utters only information about some parameter, not all parameters for a specific domain (for example, when the user utters "register schedule next week"), or when unexplained information is uttered (For example, when the user utters "register a schedule a day after tomorrow"), it is difficult to grasp the intention and purpose of the user's utterance or to provide an appropriate response corresponding to the utterance intention of the user.

For this purpose, the dialogue system 100 according to an embodiment may utilize a parameter tree constructed in a hierarchical structure, based on this parameter tree, it may output appropriate responses corresponding to the user's utterance or request the necessary information to output appropriate responses to the user. A detailed description of the parameter tree is given below.

Figure 3:
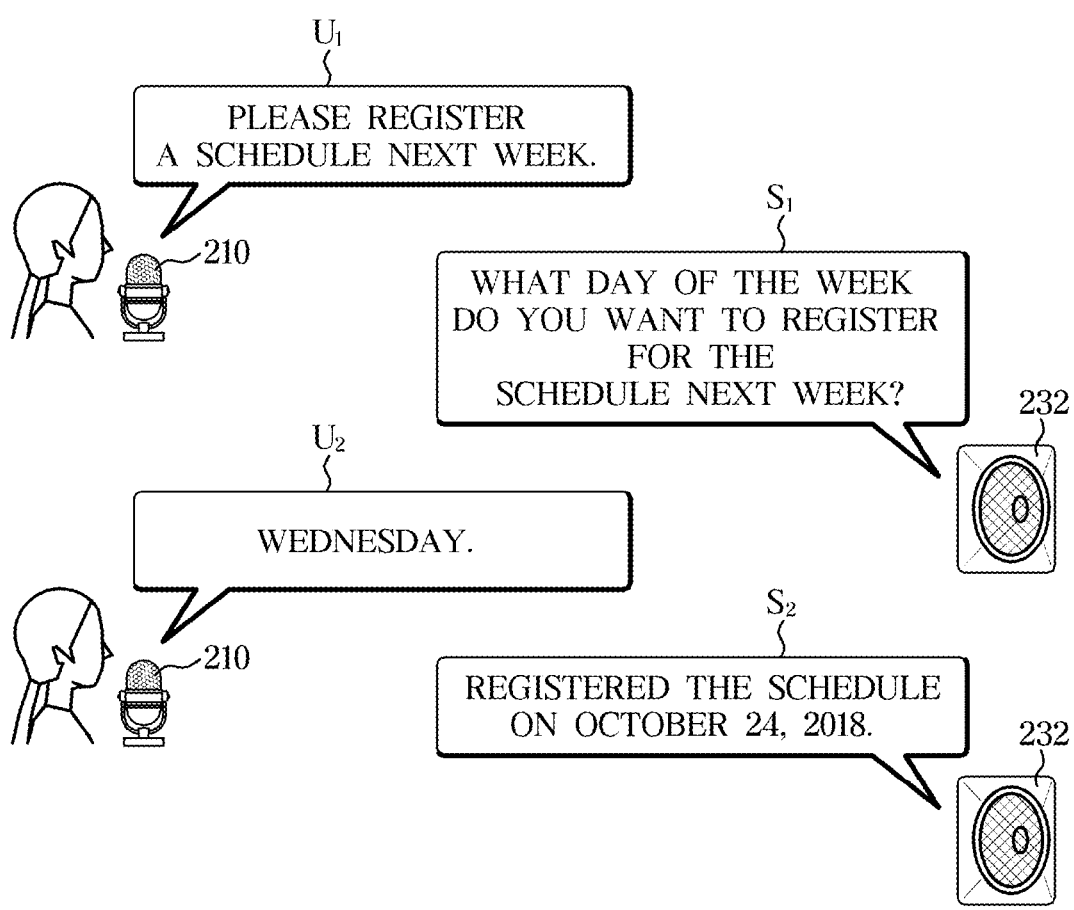
FIGS. 3-6 are views illustrating an example of dialogue that generates between a dialogue system and a driver.

FIGS. 3-6 are views illustrating an example of dialogue that generates between a dialogue system and a driver;

Referring to FIG. 3, when the user inputs an utterance (U1: "please register a schedule next week.") for requesting a schedule registration, the dialogue system 100 generates an utterance for requesting information necessary for registering a schedule (S1: "what day of the week do you want to register for the schedule next week?").

In response to this, the user may input an utterance (U2: "Wednesday") providing information necessary for registering the schedule. Based on the response of the user, the dialogue system 100 registers the schedule, and outputs a guiding utterance (S2: "registered schedule on Oct. 24, 2018").

In other words, the dialogue system 100 determines that the user is requesting a predetermined registration based on the speech input of the user received through the input processor 110 and asks the user a parameter value to fill a parameter (date).

In the example of FIG. 3, the dialogue system 100 may shorten the conversation step and time by omitting some queries and directly providing a service.

Figure 4:
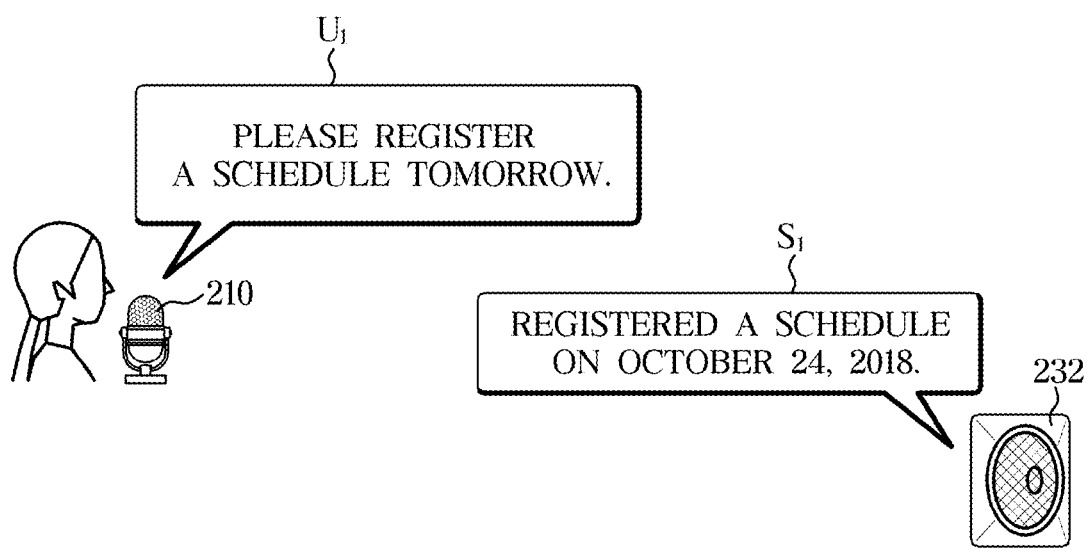

For example, as shown in FIG. 4, when a user inputs information about a parameter (date) required for registering a schedule together with a schedule registration request (U1: "Please register a schedule tomorrow."), the dialogue system 100 may generate a speech (S1: "Registered a schedule on Oct. 24, 2018.") that the schedule registration is performed based on the information inputted by the user.

To this end, the dialogue system 100 determines the absolute information (date Oct. 24, 2018) by utilizing the relative information (tomorrow) included in the input from the user and the reference information (current date: Oct. 23, 2018 Day). Such reference information may be stored in advance in the storage 140 of the dialogue system 100 or may be received from an external device.

Figure 5:
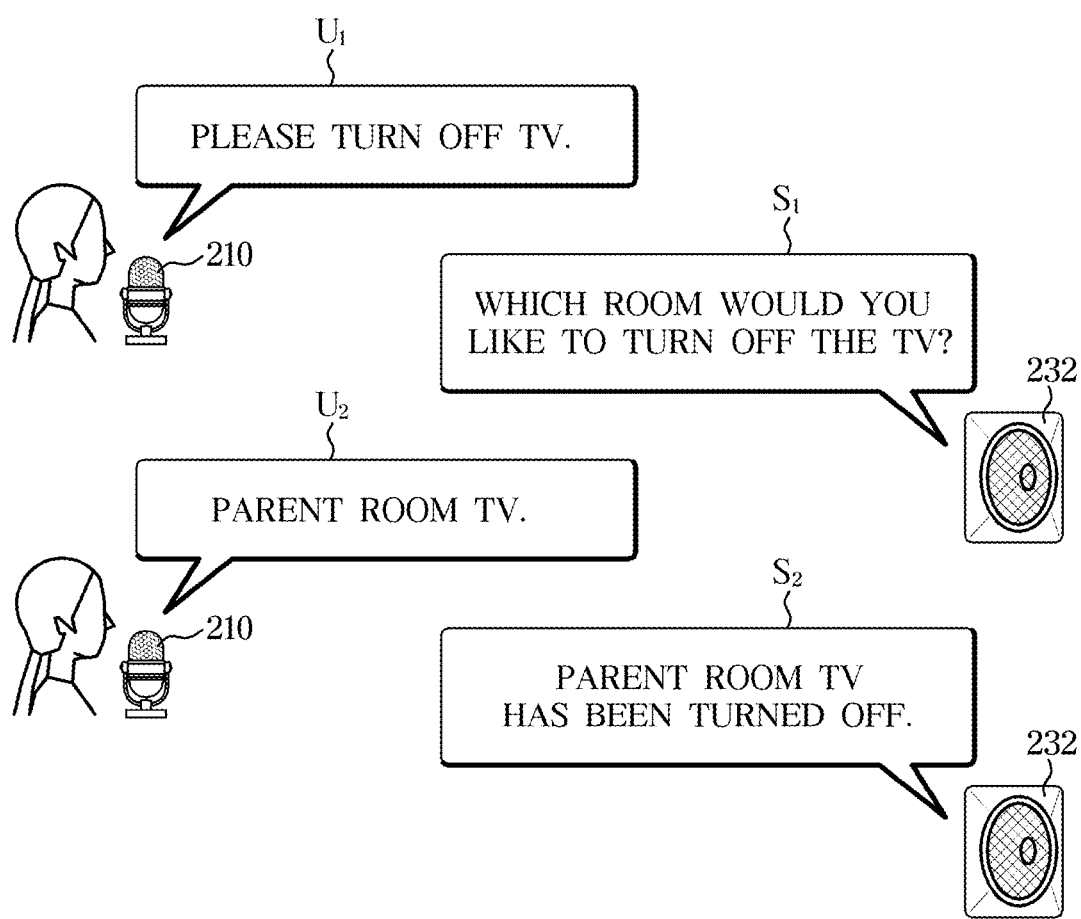

In another example, referring to FIG. 5, when the user inputs a utterance for home appliance control (U1: "Please turn off TV."), the dialogue system 100 generates an utterance for requesting information on parameters (home appliances) necessary for home appliance control (S1: "Which room would you like to turn off the TV?").

In response to this, when the user inputs an utterance (U2: "Parent room's TV"), the utterance U2 provides information on parameters (home appliances) necessary for home appliance control and the dialogue system 100 turns off the power of the corresponding TV, (S2: "Parent room TV has been turned off.").

In other words, the dialogue system 100 determines that the user is requesting home appliance control based on the user's speech input received through the input processor 110 and asks for a parameter value input to the user to fill a parameter (home appliance).

On the other hand, the dialogue system 100 may provide a query to obtain the necessary information to output an appropriate response corresponding to the user's utterance. This query may be performed step by step based on the hierarchy of parameters. In other words, the dialogue system 100 may determine the information to be requested to the user based on the location or hierarchy of the parameter on the parameter tree configured in a hierarchical structure. The dialogue system 100 may provide a query for the information.

Figure 6:
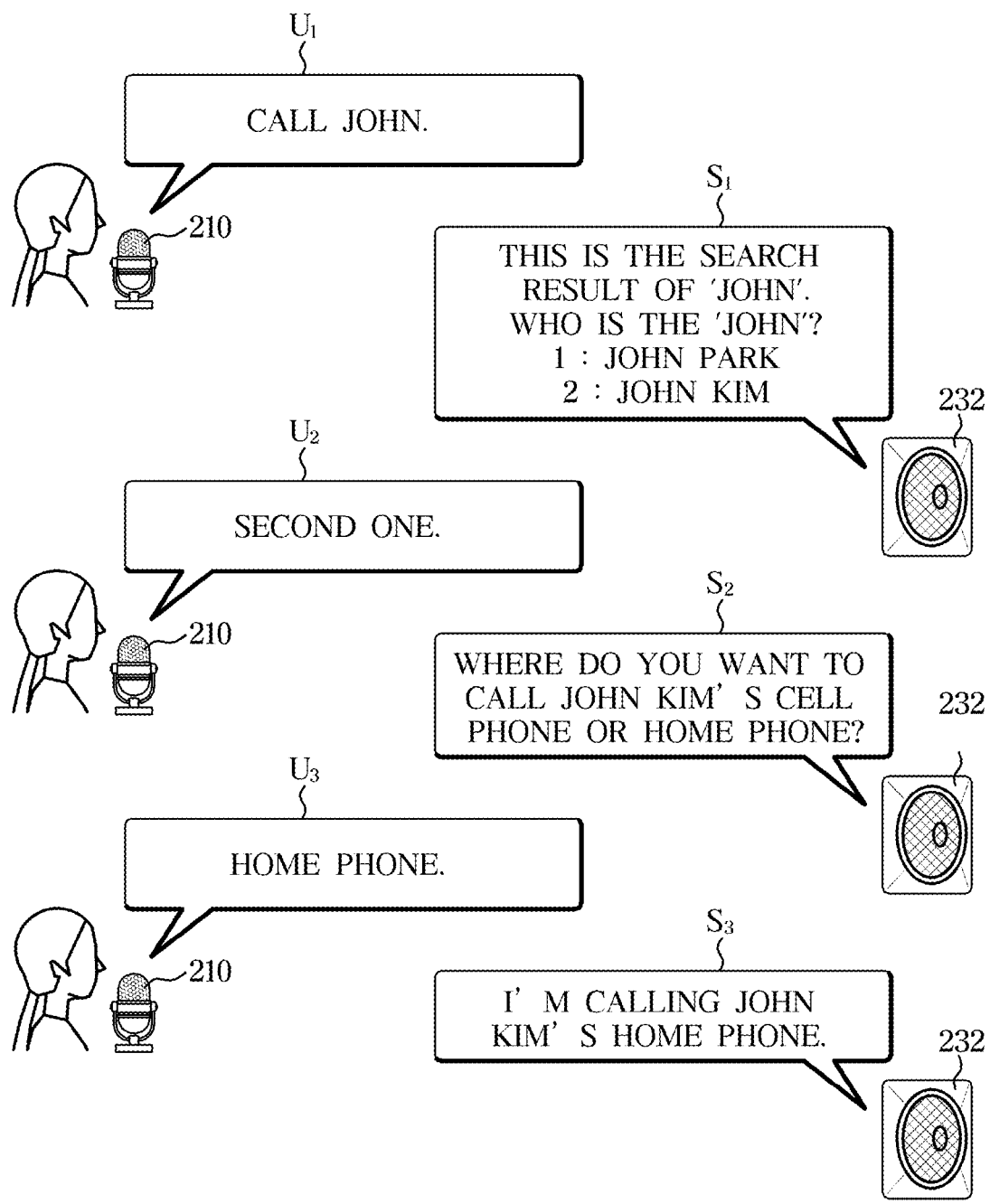

Referring to FIG. 6, when the user inputs an utterance U1 to make a telephone call, the dialogue system 100 transmits a query S1 (see FIG. 6) for an upper parameter (name) on a parameter tree of a parameter (telephone number).

When the user inputs a response U2 to the query S1, the dialogue system 100 may output a query S2 for the sub-parameter (type) for the upper parameter (name). When the user inputs a response U3 to the query S2, the dialogue system 100 makes a call based on the information contained in the parameter tree of the parameter (telephone number) corresponding to the dialing domain. The dialogue system outputs an utterance S3 that informs that the execution has been completed.

At this time, the dialogue system 100 may output a response corresponding to the intention and purpose of the user by mapping a parameter value to each of at least one parameter included in the parameter tree of the parameter (telephone number) corresponding to the dialing domain.

Figure 7:
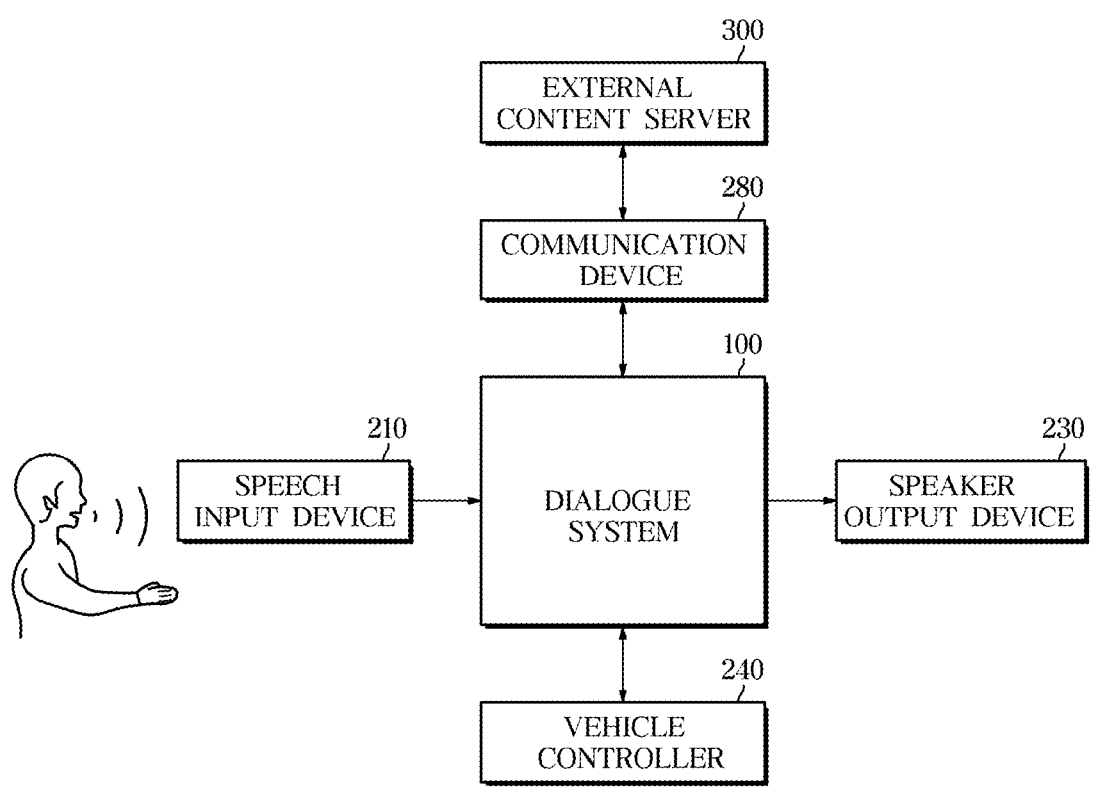
FIGS. 7 and 8 are control block diagrams schematically illustrating a connection between the dialogue system and components of the vehicle.
Figure 8:
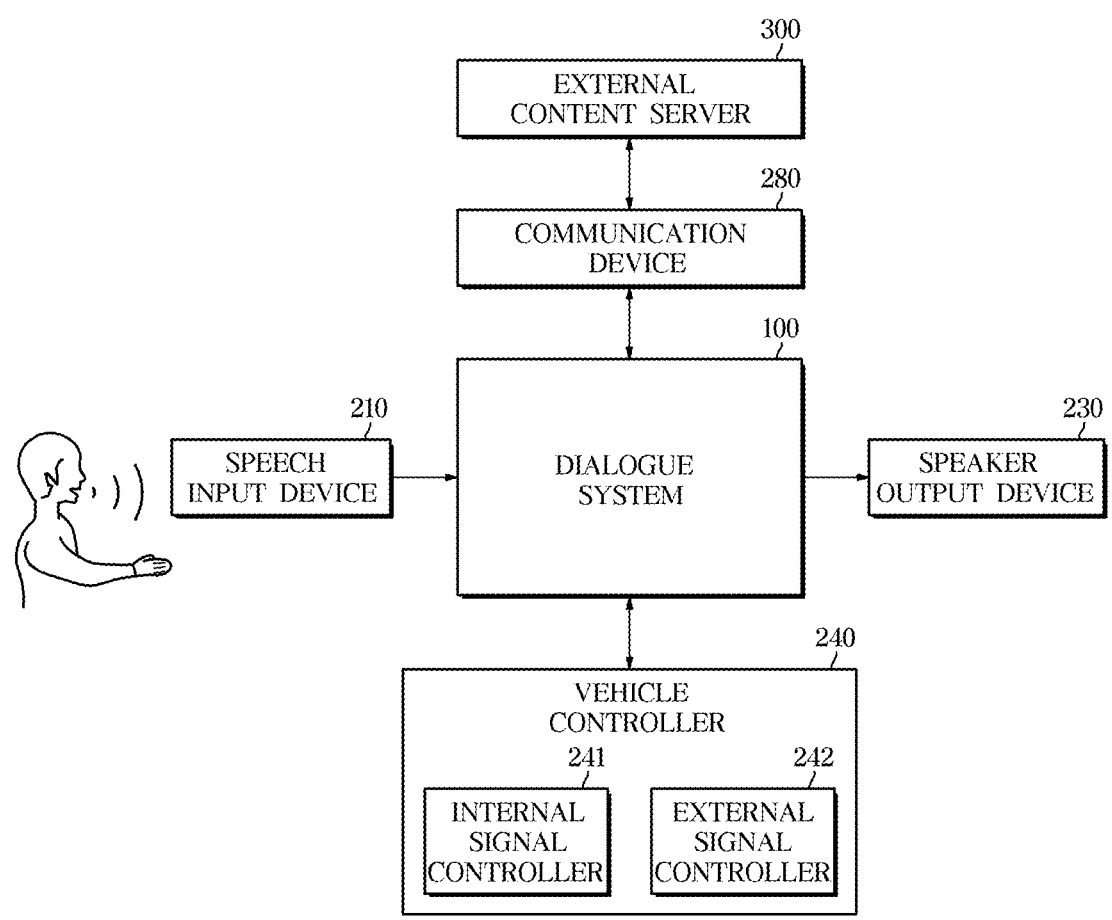

FIGS. 7 and 8 are control block diagrams that schematically illustrate a connection between the dialogue system and components of the vehicle.

As shown in FIG. 7, a user's speech input to the dialogue system 100 may be input via the voice input device 210 provided in the vehicle 200. As illustrated in FIG. 2, the speech input device 210 may include a microphone provided inside of the vehicle 200.

The input other than the speech in the user input may be input through a non-speech input device (not shown). The non-speech input device (not shown) may include an input button 221 and 223 for inputting a command through the operation of the jog shuttle 225 by the user.

Information related to the vehicle may be input into the dialogue system 100 via a vehicle controller 240. Information related to the vehicle may include vehicle state information or surroundings environment information acquired by a variety of sensors provided in the vehicle 200, and information which is initially stored in the vehicle 200, e.g. the fuel type of the vehicle.

The dialogue system 100 may recognize the user's intent and context using the user's speech input via the speech input device 210, the input other than the user's speech, input via the non-speech input device (not shown), and a variety of information input via the vehicle controller 240. The dialogue system 100 outputs a response to perform an action corresponding to the user's intent.

A speaker output device 230 is a device configured to provide an output in a visual, auditory or tactile manner to a user. The speaker output device 230 may include the display 231 and the speaker 232 provided in the vehicle 200. The display 231 and the speaker 232 may output a response to a user's utterance, a question about a user, or information requested by a user, in the visual or auditory manner. In addition, it may be possible to output a vibration by installing a vibrator in the steering wheel 207.

Further, according to the response output from the dialogue system 100, the vehicle controller 240 may control the vehicle 200 to perform an action corresponding to the user's intent or the current situation.

The vehicle 200 may collect information acquired by the sensor provided in the vehicle 200, as well as information acquired from an external content server 300 or an external device via the communication device 280, e.g., driving environment information and user information such as traffic conditions, weather, temperature, passenger information and driver personal information. Then, the vehicle 200 may transmit the information to the dialogue system 100.

As illustrated in FIG. 8, information acquired by the sensor provided in the vehicle 200, e.g., a remaining amount of fuel, an amount of rain, a rain speed, surrounding obstacle information, a speed, an engine temperature, a tire pressure, and current position, may be input to the dialogue system 100 via an internal signal controller 241.

The driving environment information acquired from the outside via a Vehicle to Everything (V2X) communication may be input to the dialogue system 100 via an external signal controller 242. The V2X allows a vehicle to perform exchanges and shares a variety of useful information, e.g. traffic condition, by communicating with a road infrastructure and other vehicle during driving.

The V2X communication may include Vehicle-to Infrastructure (V2I) communication, Vehicle-to-Vehicle (V2V) communication, and Vehicle-to-Nomadic devices (V2N) communication. Therefore, by using the V2X communication, it may be possible to send and receive information such as traffic information about the front side or an access of another vehicle or risk of collision with another vehicle through the communication directly performed between vehicles or the communication with the infrastructure installed in the road and thus it may be possible to inform a driver of the information.

Therefore, the driving environment information input to the dialogue system 100 via the external signal controller 242 may include traffic information about the front side, access information of adjacent vehicle, collision warning with another vehicle, real time traffic conditions, unexpected conditions, and a traffic flow control state.

Although not shown in the drawings, signals obtained via V2X may also be input to the vehicle 200 via the communication device 280.

The vehicle controller 240 may include a memory in which a program for performing the above-described operation and the operation described below is stored, and a processor for executing the stored program. At least one memory and one processor may be provided. When a plurality of memory and processors are provided, they may be integrated on one chip or physically separated.

In addition, the internal signal controller 241 and the external signal controller 242 may be implemented by the same processor and memory or by a separate processor and memory.

Figure 9:
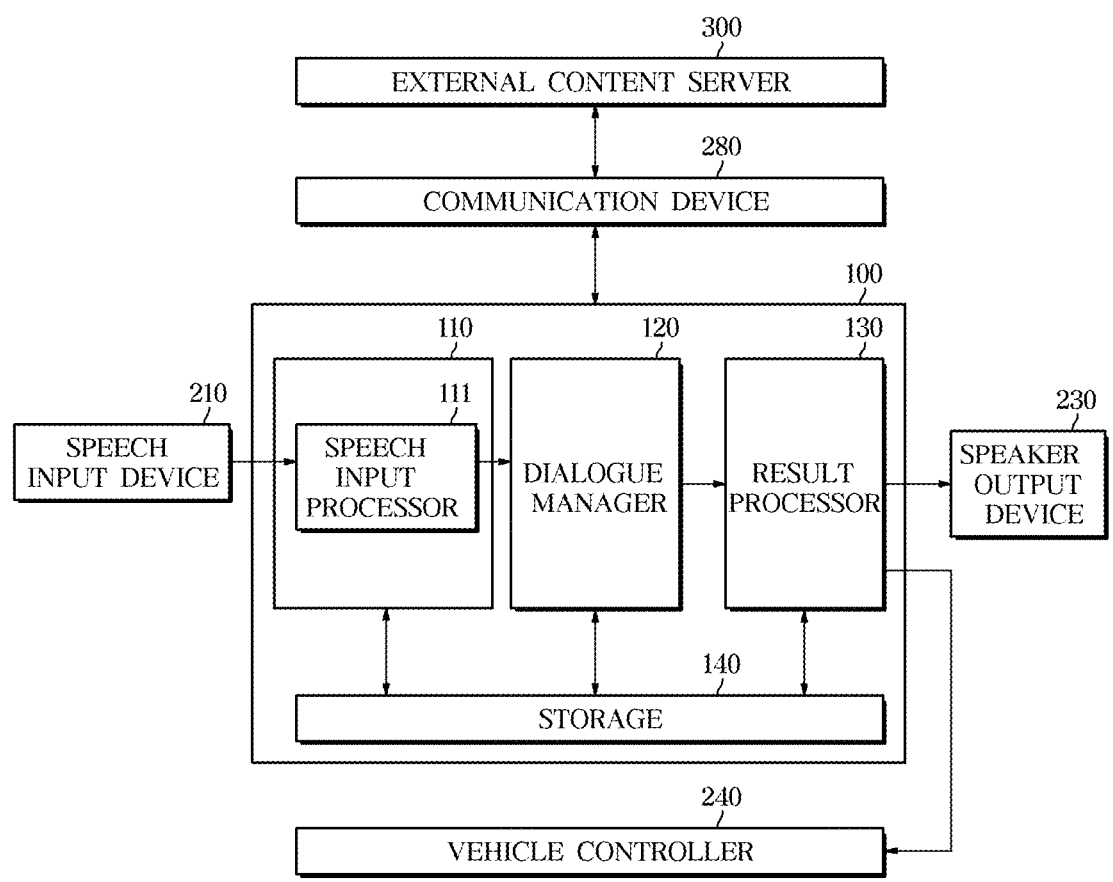
FIGS. 9 and 10 are control block diagrams schematically illustrating a connection between components of the dialogue system and the components of the vehicle.
Figure 10:
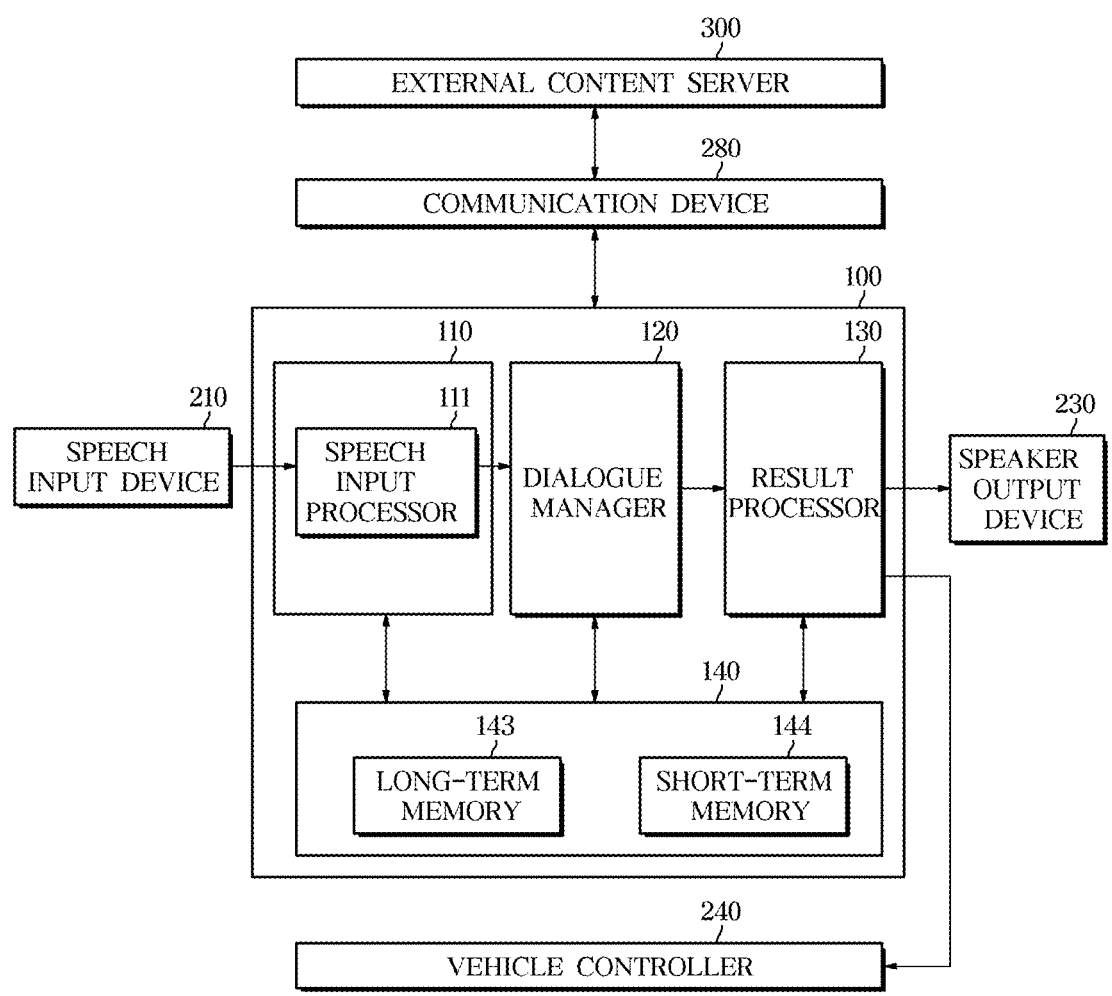

FIGS. 9 and 10 are control block diagrams schematically illustrating a connection between the dialogue system and the components of the vehicle.

As shown in FIG. 9, the user's speech transmitted from the speech input device 210 may be input to a speech input processor 111 provided in the input processor 110.

In addition, information that is input via the internal signal controller 241 or the external signal controller 242 is input to the input processor 110.

The status information input through the non-speech input includes the non-speech input device (not shown) and the vehicle status information, driving environment information, and user information input from the vehicle controller 240. The dialogue system 100 may identify the situation based on the situation information inputted through the non-speech input, more accurately identify the intention of the user or effectively search the service required for the current user.

A response output from the result processor 130 may input to the speaker output device 230 or the vehicle controller 240 to allow the vehicle 200 to provide the service needed for the user. In addition, the response may be transmitted to the external content server 300 to request the needed service.

The vehicle state information, the driving environment information and the user information transmitted from the vehicle controller 240 may be stored in the storage 140.

As shown in FIG. 10, the storage 140 may include a long-term memory 143 and a short-term memory 144. Data stored in the storage 140 may be classified into the short-term memory and the long-term memory according to the importance and the persistence of the data, and the designer's intent.

The short-term memory 144 may store the dialogue that is previously performed. The previous dialogue may be a dialogue performed within a reference time from the current. Alternatively, the dialogue may be continuously stored until the capacity of the utterance content between the user and the dialogue system 100 becomes a reference value.

For example, when it is time for meal, the vehicle 200 may output an utterance asking whether to guide to a restaurant, via the speaker 232. Whether it is time for a meal may be identified based on whether a current time is within a predetermined meal time range. When the user utters a content "let me know a restaurant near Gangnam Station" or a content "let me know a restaurant" and when the current position of the vehicle 200 is around Gangnam Station, the dialogue system 100 may search for restaurants near Gangnam Station through the external content server 300 and then provide information related to the searched restaurant near Gangnam Station to the user. An example of providing information, the dialogue system 100 may display a list of the restaurants on the display 231. When the user utters "first", the dialogue content related to the request of the restaurant to the selection of the restaurant may be stored in the short-term memory 144.

Alternatively, not only the entire dialogue contents are stored, but also specific information contained in the dialogue contents may be stored. For example, it is possible to store the first restaurant of the restaurant list in the short-term memory 144 or the long-term memory 143 as a restaurant selected by the user.

When the user asks: "How is the weather?" to the dialogue system 100 after the dialogue about the restaurant near Gangnam Station, the dialogue system 100 may assume that a user's interest location is Gangnam Station, from the dialogue stored in the short-term memory 144. The dialogue system 100 may then output a response "It is raining in Gangnam Station."

Next, when the user utters "Recommend a meal from the menu of the restaurant", the dialogue system 100 may assume that "the restaurant" represents a restaurant near Gangnam Station from the dialogue stored in the short-term memory. The dialogue system 100 may acquire information related to a recommended meal of the corresponding restaurant through the service provided from the external content server 300. Accordingly, the dialogue system 100 may output the response "Noodle is the best meal in the restaurant."

The long-term memory 143 may store data according to the presence of the persistence of the data. For example, the long-term memory 143 may determine that the persistence of the data such as position of interest (POI) information, e.g., family and friend telephone numbers and home or company, and user preferences for certain parameters is secured. The long-term memory 143 may then store the data therein. In contrast, when it is determined that the persistence of the data is not secured, the data may be stored in the short-term memory 144.

For example, the current location of the user may be a temporary data and thus stored in the short-term memory 144. The user's preference for the restaurant may be a persistent data which is available later and thus stored in the long-term memory 143.

When the user utters "Are there any restaurants around here?", the dialogue system 100 may recognize the current location of the user and figure out that the user prefers a Chinese restaurant, from the long-term memory 143. Therefore, the dialogue system 100 may recommend the list of user's favorite Chinese restaurants around the current location by using the external content.

In addition, the dialogue system 100 may proactively provide service and information to the user using the data stored in the long-term memory 143 and the short-term memory 144.

For example, information related to the user's house may be stored in the long-term memory 143. The dialogue system 100 may acquire the information related to the user's house from the external content server 300. The dialogue system 100 may then provide information indicating that "A water outage is expected this Friday due to the cleaning of the apartment."

Information indicating a vehicle battery state may be stored in the short-term memory 144. The dialogue system 100 may analyze the vehicle battery state stored in the short-term memory 144 and then provide information indicating that, for example, "The vehicle's battery is in bad condition. You should have it repaired before the start of winter."

Figure 11:
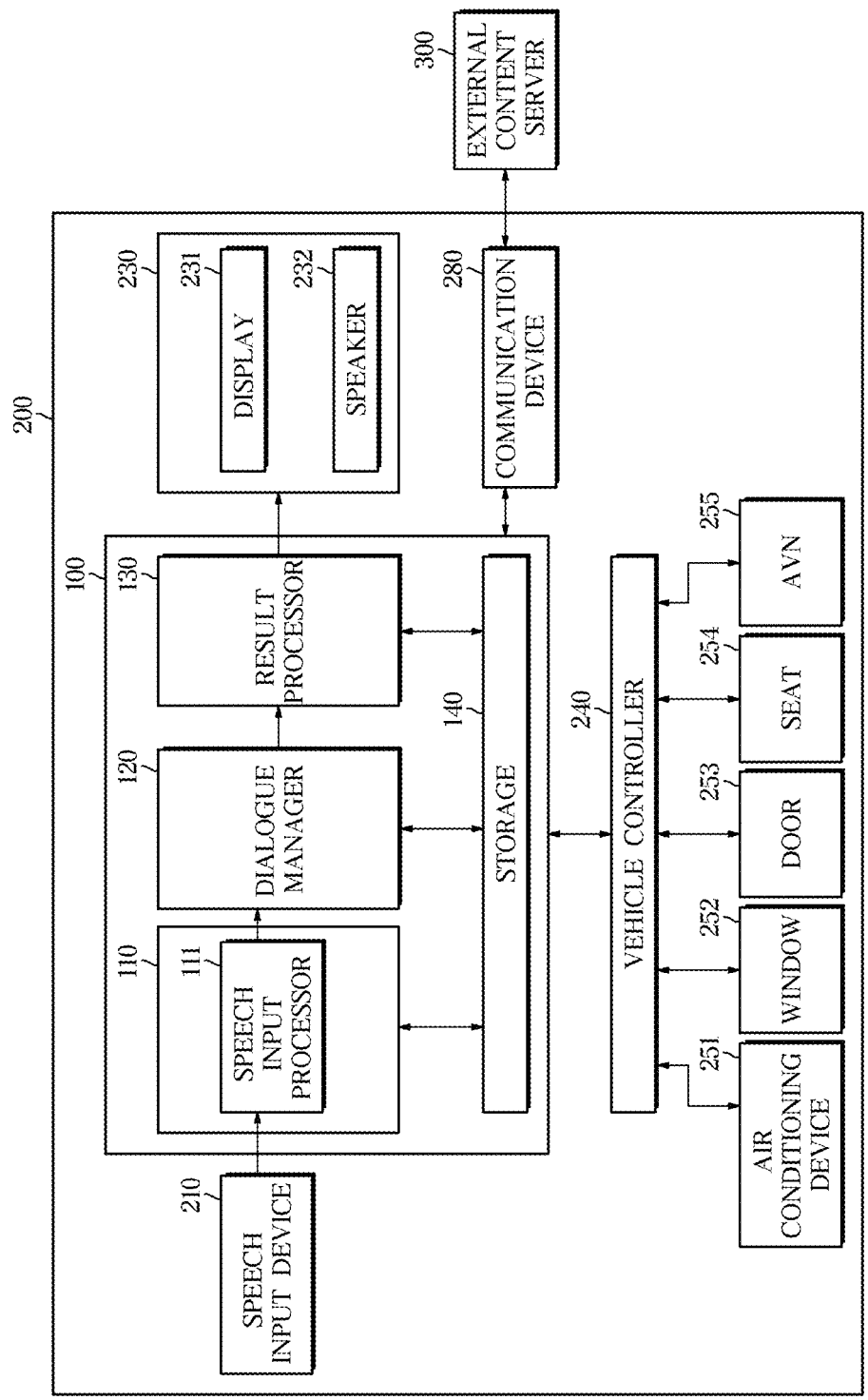
FIG. 11 is a control block diagram illustrating a vehicle independent method in which a dialogue system is provided in a vehicle.

FIG. 11 is a control block diagram illustrating a vehicle independent method in which a dialogue system is provided in a vehicle.

According to the vehicle independent method, the dialogue system 100 having the input processor 110, the dialogue manager 120, the result processor 130 and the storage 140 may be disposed in the vehicle 200, as illustrated in FIG. 11.

When the dialogue system 100 is disposed in the vehicle 200, the vehicle 200 may process a dialogue with a user, by itself and may provide a service needed for the user. However, the information needed for the dialogue processing and service provision may be brought from the external content server 300.

The vehicle state information or the driving environment information, e.g., remaining amount of fuel, amount of rain, rain speed, surrounding or in the vicinity of the vehicle obstacle information, speed, engine temperature, tire pressure, current position, and the like, which is detected by a detector (not shown) provided in the vehicle 200 may be input to the dialogue system 100 via the vehicle controller 240.

According to a response output from the dialogue system 100, the vehicle controller 240 may control the air conditioning device 251, the window 252, the door 253, the seat 254 or the AVN 255 provided in the vehicle 200.

For example, when the dialogue system 100 determines that the user's intent or the service needed for the user is to lower the temperature inside the vehicle 200 and then generates and outputs a corresponding command, the vehicle controller 240 may lower the temperature inside the vehicle 200 by controlling the air conditioner 251.

In another example, when the dialogue system 100 determines that the user's intent or the service needed for the user is to raise the driver's seat window 252*a* (shown in FIG. 2) and generates and outputs a corresponding command, the vehicle controller 240 may raise the driver's seat window 252*a* (shown in FIG. 2) by controlling the window 252.

For another example, when the dialogue system 100 determines that the user's intent or the service needed for the user is to guide a route to a certain destination and generates and outputs a corresponding command, the vehicle controller 240 may perform a route guidance by controlling the AVN 255. As needed, the communication device 280 may bring map data, and point of interest (POI) information from the external content server 300 and then use the information for the service provision.

Figure 12:
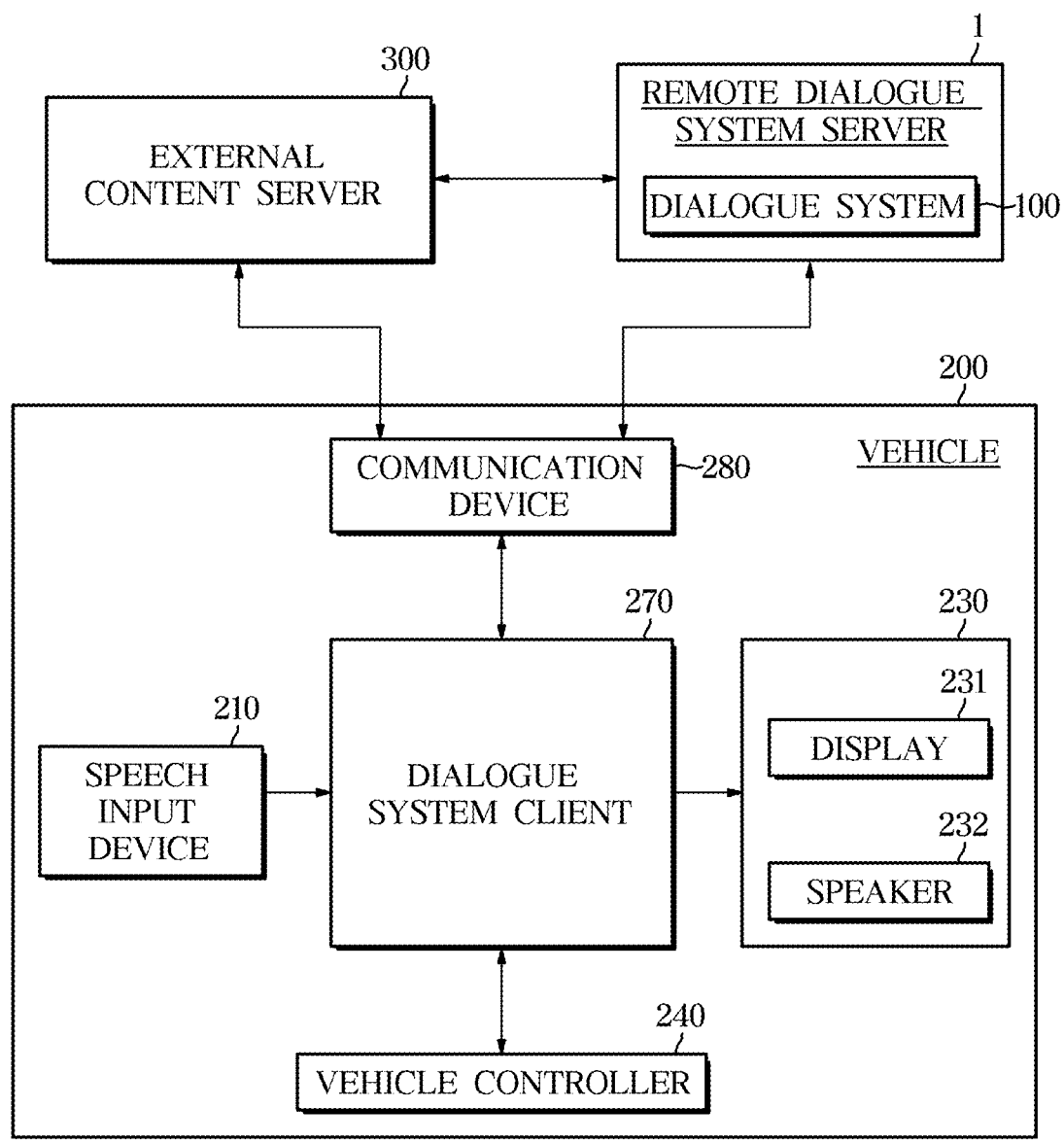
FIGS. 12 and 13 are control block diagrams illustrating a vehicle gateway in which a dialogue system is provided in a remote server and a vehicle acts as a gateway connecting a user to the dialogue system.
Figure 13:
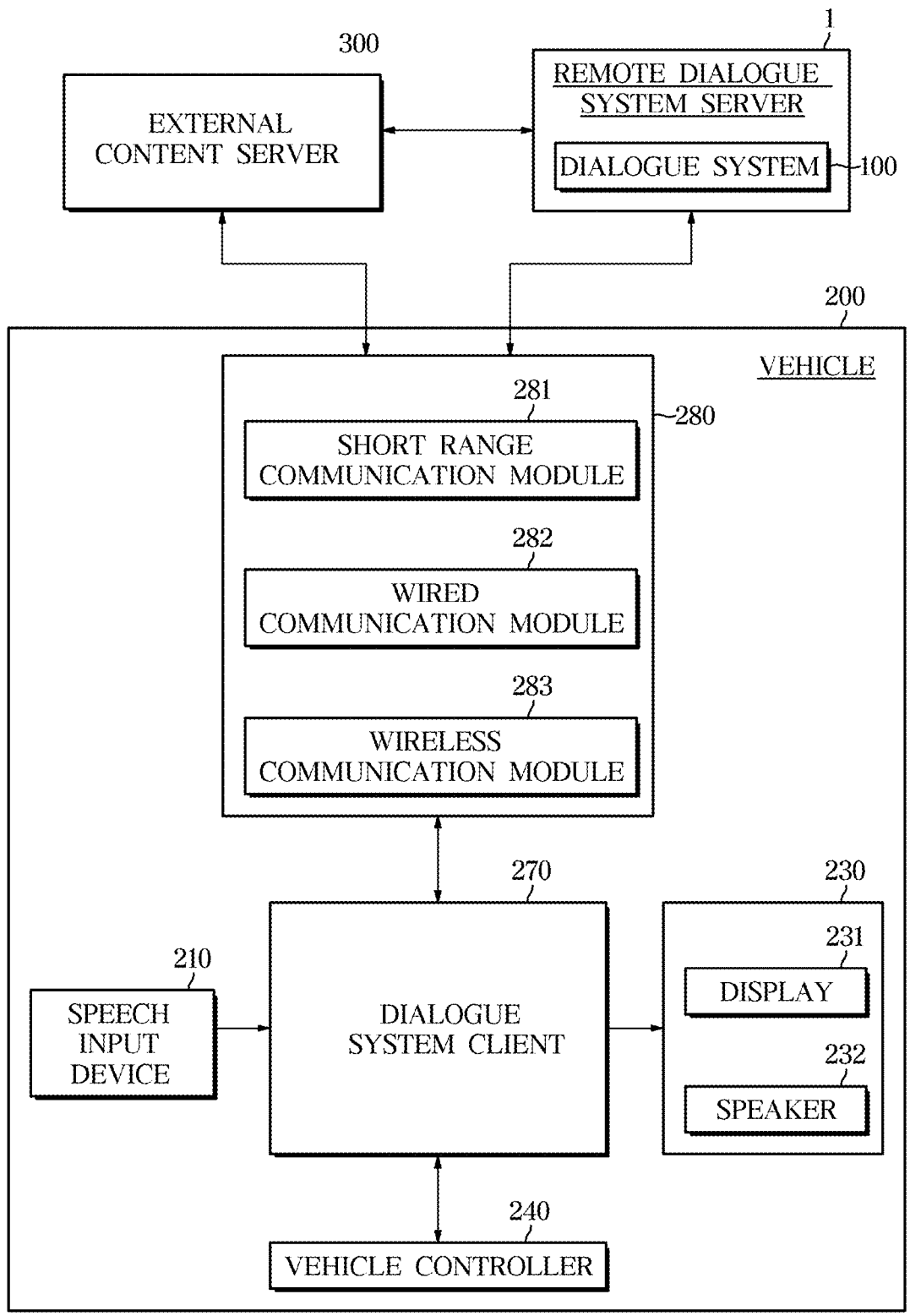

FIGS. 12 and 13 are control block diagrams illustrating a vehicle gateway in which a dialogue system is provided in a remote server and a vehicle acts as a 10*o* gateway connecting a user to the dialogue system.

According to the vehicle gateway method, as illustrated in FIG. 12, a remote dialogue system server 1 may be provided in the outside of the vehicle 200. A dialogue system client 270 connected via the remote dialogue system server 1 and the communication device 280 may be provided in the vehicle 200. The communication device 280 serves as a gateway for connecting the vehicle 200 and the remote dialogue system server 1.

The dialogue system client 270 may serve as an interface connected to an input/output device and may collect, send and receive data.

When the speech input device 210 and the non-speech input device (not shown) provided in the vehicle 200 receive a user's input and transmit the user input to the dialogue system client 270, the dialogue system client 270 may transmit the input data to the remote dialogue system server 1 via the communication device 280.

The vehicle controller 240 may also transmit data detected by the detector (not shown) provided in the vehicle 200 to the dialogue system client 270. The dialogue system client 270 may transmit the data detected by the detector (not shown) provided in the vehicle 200 to the remote dialogue system server 1 via the communication device 280.

Since the above-mentioned dialogue system 100 is provided in the remote dialogue system server 1, the remote dialogue system server 1 may perform all of the input data processing, the dialogue processing based on the result of the input data processing, and the result processing based on the result of the dialogue processing.

In addition, the remote dialogue system server 1 may bring information or content needed for the input data processing, the dialogue management, or the result processing, from the external content server 300.

According to a response transmitted from the remote dialogue system server 1, the vehicle 200 may bring information or content for the service needed for the user from the external content server 300.

As shown in FIG. 13, the communication device 280 may include at least one communication module configured to communicate with an external device. For example, the communication device 280 may include at least one of a short-range communication module 281, a wired communication module 282, or a wireless communication module 283.

The short-range communication module 281 may include a variety of short range communication modules, which are configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module 282 may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module 283 may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

In addition, the communication device 280 may further include an internal communication module for communication between electronic devices in the vehicle 200. The communication protocol of the vehicle 200 may use Controller Area Network (CAN), Local Interconnection Network (LIN), FlexRay, and Ethernet.

The dialogue system 100 may send and receive data to and from the external content server 300 or the remote dialogue system server 1 via the wireless communication module 283. The dialogue system 100 may perform the V2X communication using the wireless communication module 283. In addition, using the short-range communication module 281 or the wired communication module 282, the dialogue system 100 may send and receive data to and from a mobile device connected to the vehicle 200.

Figure 14:
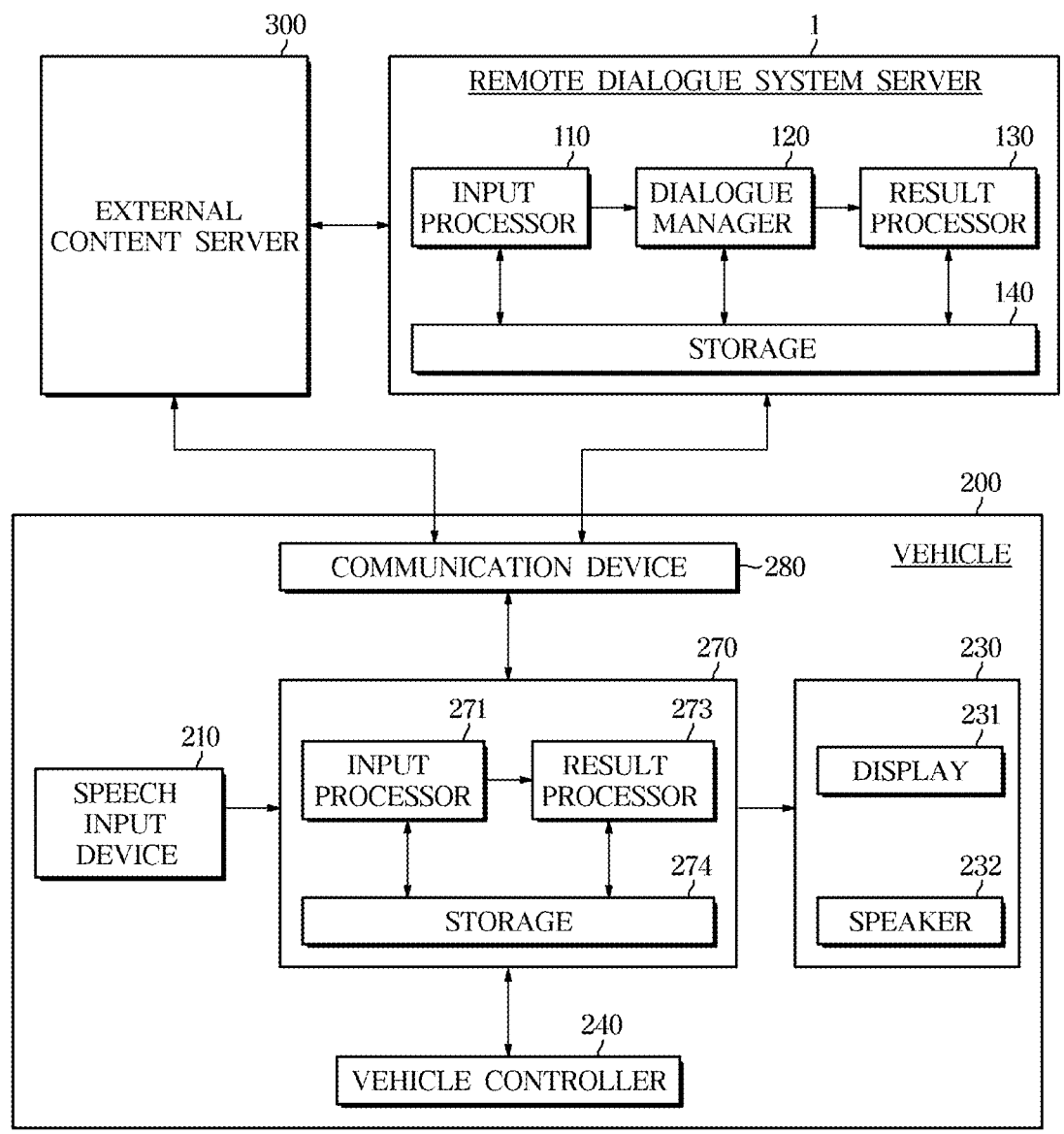
FIG. 14 is a control block diagram illustrating a case in which the vehicle may perform some input processing and output processing in the vehicle gateway method.

FIG. 14 is a control block diagram illustrating a case in which the vehicle may perform some input processing and output processing in the vehicle gateway method.

As mentioned above, the dialogue system client 270 of the vehicle 200 may only collect and send and receive the data but the dialogue system client 270 may process data input from the user or the vehicle or perform a processing related to the service provision that is determined to be needed to the user, since an input processor 271, a result processor 273 and a storage 274 are contained in the dialogue system client 270, as illustrated in FIG. 14. In other words, the operation of the input processor 110 and the result processor 130 may be performed by not only the remote dialogue system server 1 but also by the vehicle 200.

In this case, the dialogue system client 270 may perform all or some operation of the input processor 110. The dialogue system client 270 may perform all or some operation of the result processor 130.

The task sharing between the remote dialogue system server 1 and the dialogue system client 270 may be determined in consideration of the capacity of the data to be processed and the data processing speed.

Figure 15:
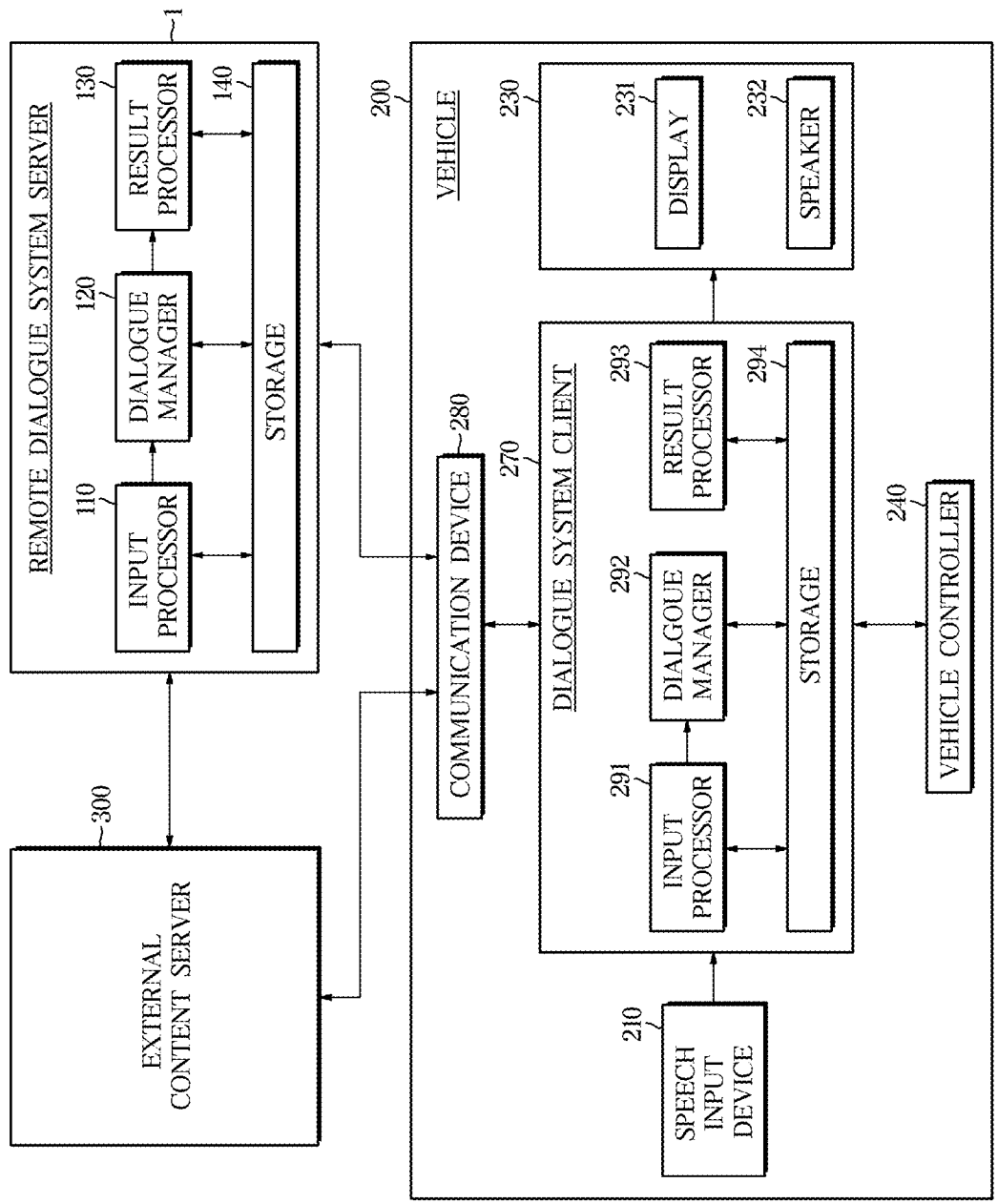
FIG. 15 is a control block diagram illustrating a hybrid in which both a remote dialogue system server and a vehicle perform dialogue processing.

FIG. 15 is a control block diagram illustrating a hybrid in which both a remote dialogue system server and a vehicle perform a dialogue processing.

According to the hybrid method, as illustrated in FIG. 15, since the input processor 110, the dialogue manager 120, the result processor 130 and the storage 140 are provided in the remote dialogue system server 1, the remote dialogue system server 1 may perform the dialogue processing. Since a terminal dialogue system 290 provided with an input processor 291, a dialogue manager 292, a result processor 293 and a storage 294 is provided in the vehicle 200, the vehicle 200 may perform the dialogue processing.

However, there may be difference between a processor and a memory provided in the vehicle 200 and a processor or a memory provided in the remote dialogue system server 1 in the capacity or performance. Accordingly, when the terminal dialogue system 290 is capable of outputting a result by processing all the input data and managing the dialogue, the terminal dialogue system 290 may perform the entire process. Otherwise, it may be possible to request the processing to be performed by the remote dialogue system server 1.

Before performing the dialogue processing, the terminal dialogue system 290 may determine whether it is possible to perform the dialogue processing based on the data type. The terminal dialogue system 290 may directly perform the processing or request the processing to the remote dialogue system server 1 based on the result of the determination.

Alternatively, when an event occurs in which the terminal dialogue system 290 does not perform the process during the performing the dialogue process, the terminal dialogue system 290 may request the processing to be performed by the remote dialogue system server 1 while transmitting a result that is processed by itself to the remote dialogue system server 1.

For example, when high-performance computing power or long-term data processing is needed, the remote dialogue system server 1 may perform the dialogue processing. When real time processing is needed, the terminal dialogue system 290 may perform the dialogue processing. For example, when an instant event requiring immediate processing occurs and the data needs to be processed before the synchronization, the terminal dialogue system 290 may be configured to process the data first.

In addition, when there is an unregistered talker in the vehicle and thus a user confirmation is required, the remote dialogue system server 1 may process the dialogue.

Further, when the terminal dialogue system 290 is unable to complete the dialogue processing by itself in a state in which the connection with the remote dialogue system server 1 via the communication device 280 is not allowed, it may be possible to inform a user that the dialogue processing may not be performed via the speaker output device 230.

Data stored in the terminal dialogue system 290 and data stored in the remote dialogue system server 1 may be determined according to the data type or the data capacity. For example, in the case of data having a risk of invasion of privacy because of personal identification, the data may be stored in the storage 294 of the terminal dialogue system 290. In addition, a large amount of data may be stored in the storage 140 of the remote dialogue system server 1. A small amount of data may be stored in the storage 294 of the terminal dialogue system 290. Alternatively, a small amount of data may be stored in both the storage 140 of the remote dialogue system server 1 and the storage 294 of the terminal dialogue system 290.

Figure 16:
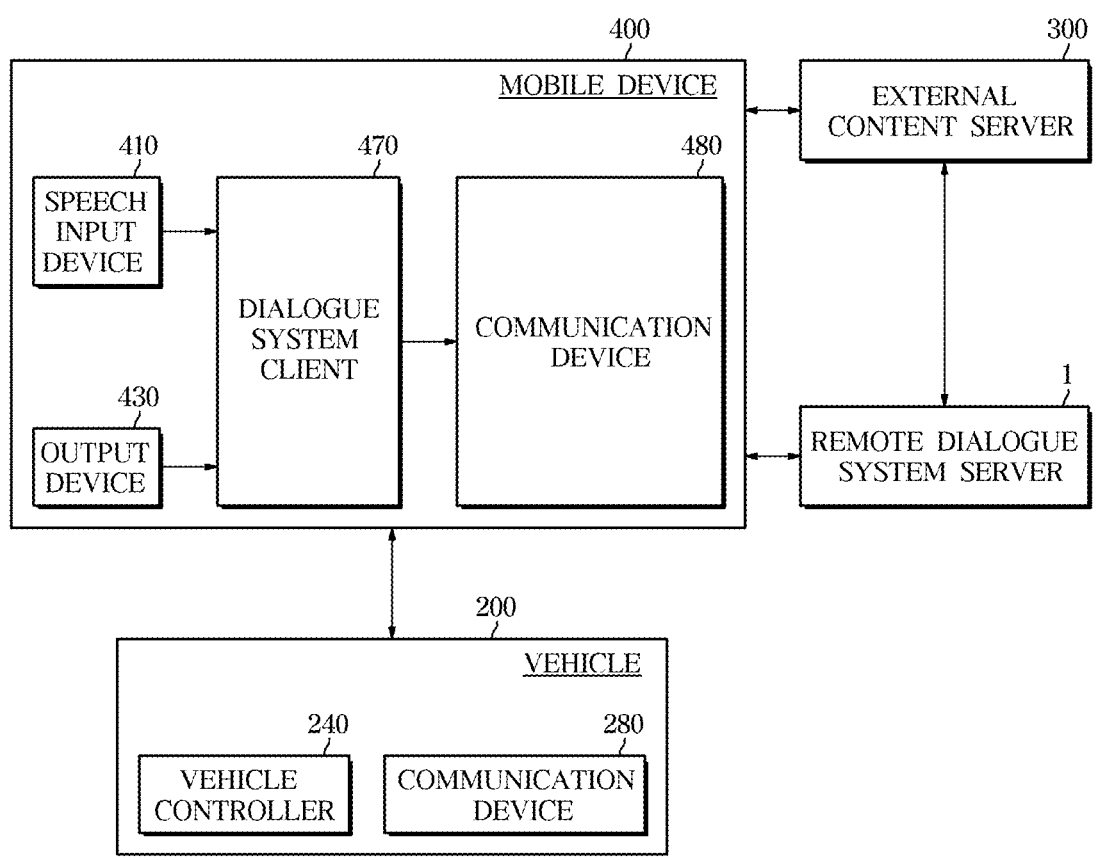
FIGS. 16 and 17 are control block diagrams illustrating a mobile gateway in which a mobile device connected to a vehicle connects a user to a remote dialogue system server.
Figure 17:
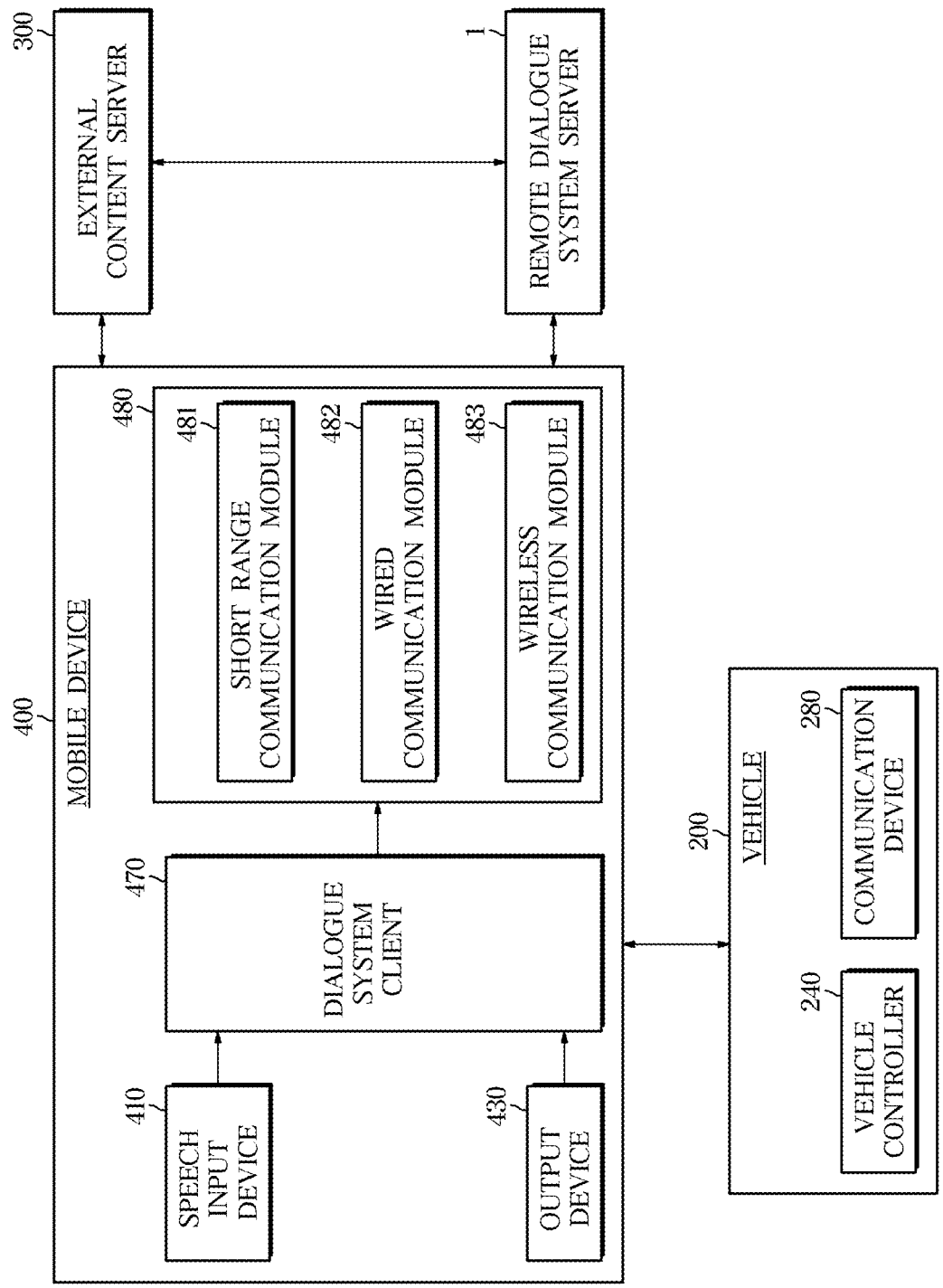

FIGS. 16 and 17 are control block diagrams illustrating a mobile gateway in which a mobile device connected to a vehicle connects a user to a remote dialogue system server.

According to the mobile gateway method, as illustrated in FIG. 16, the mobile device 400 may receive the vehicle state information and the driving environment information, etc. from the vehicle 200, and transmit the user input and the vehicle state information to the remote dialogue system server 1. In other words, the mobile device 400 may act as a gateway connecting a user to the remote dialogue system server 1 or connecting the vehicle 200 to the remote dialogue system server 1.

The mobile device 400 may represent an electronic device that is portable and capable of sending and receiving data to and from an external server and a vehicle by communicating with the external server and vehicle, wherein the mobile device 400 may include a smart phone, a smart watch, a smart glass, a PDA, and a tablet PC.

The mobile device 400 may include: a speech input device 410 configured to receive a user's speech; an input device (not shown) configured to receive an input other than the user's speech; an output device 430 configured to output a response in a visual, auditory or tactile manner, a communication device 480 configured to send and receive data to and from the remote dialogue system server 1 and the vehicle 200 through the communication device 480; and a dialogue system client 470 configured to collect input data from a user and to transmit the data to the remote dialogue system server 1 via the communication device 480.

The speech input device 410 may include a microphone to receive sound, to convert the sound into an electrical signal and to output the electrical signal.

The input device (not shown) may include an input button, a touch screen or a camera provided in the mobile device 400.

The output device 430 may include a display, a speaker or a vibrator provided in the mobile device 400.

The speech input device 410, the input device (not shown) and the output device 430 provided in the mobile device 400 may serve as an input and output interface for a user. In addition, the speech input device 210, the non-speech input device (not shown), the speaker output device 230 provided in the vehicle 200 may serve as an input and output interface for a user.

When the vehicle 200 transmits data detected by the detector (not shown) provided in the vehicle 200 and the user input to the mobile device 400, the dialogue system client 470 of the mobile device 400 may transmit the data and the user input to the remote dialogue system server 1.

The dialogue system client 470 may transmit a response or a command transmitted from the remote dialogue system server 1 to the vehicle 200. When the dialogue system client 470 uses the speaker output device 230 provided in the vehicle 200 as the input and output interface for the user, an utterance of the dialogue system 100 or a response to a user's utterance via may be output via the speaker output device 230. When the dialogue system client 470 uses the output device 430 that is provided in the mobile device 400, an utterance of the dialogue system 100 or a response to a user's utterance may be output via the output device 430.

The command for the vehicle control may be transmitted to the vehicle 200 and the vehicle controller 240 may perform a control corresponding to the transmitted command, thereby providing the service needed for the user.

The dialogue system client 470 may collect the input data and transmit the input data to the remote dialogue system server 1. The dialogue system client 470 may also perform all or some function of the input processor 110 and the result processor 130 of the dialogue system 100.

As shown in FIG. 17, the communication device 480 of the mobile device 400 may include at least one communication module configured to communicate with an external device. For example, the communication device 480 may include at least one of a short range communication module 481, a wired communication module 482, or a wireless communication module 483.

The short-range communication module 481 may include a variety of short range communication modules, which is configured to transmit and receive a signal using a wireless communication module in the short range, e.g., Bluetooth module, Infrared communication module, Radio Frequency Identification (RFID) communication module, Wireless Local Access Network (WLAN) communication module, NFC communications module, and ZigBee communication module.

The wired communication module 482 may include a variety of wired communication module, e.g., Local Area Network (LAN) module, Wide Area Network (WAN) module, or Value Added Network (VAN) module and a variety of cable communication module, e.g., Universal Serial Bus (USB), High Definition Multimedia Interface (HDMI), Digital Visual Interface (DVI), recommended standard 232 (RS-232), power line communication or plain old telephone service (POTS).

The wireless communication module 483 may include a wireless communication module supporting a variety of wireless communication methods, e.g., Wifi module, Wireless broadband module, global System for Mobile (GSM) Communication, Code Division Multiple Access (CDMA), Wideband Code Division Multiple Access (WCDMA), Time Division Multiple Access (TDMA), Long Term Evolution (LTE), 4G and 5G.

For example, the mobile device 400 may be connected to the vehicle 200 via the short-range communication module 481 or the wired communication module 482. The mobile device 400 may be connected to the remote dialogue system server 1 or the external content server 300 via the wireless communication module 483.

Figure 18:
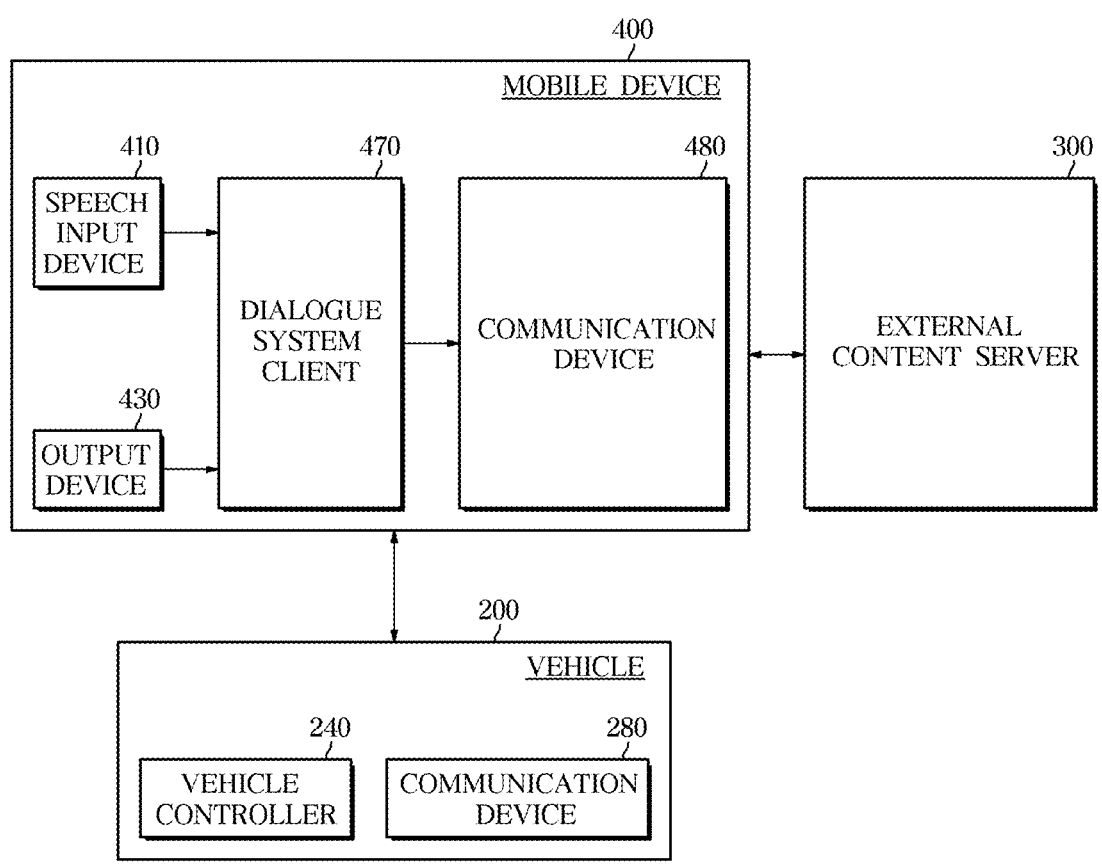
FIG. 18 is a control block diagram illustrating a mobile independent method in which a dialogue system is provided in a mobile device.

FIG. 18 is a control block diagram illustrating a mobile independent method in which a dialogue system is provided in a mobile device.

According to the mobile independent method, as illustrated in FIG. 18, the dialogue system 100 may be provided in the mobile device 400.

Therefore, without being connected to the remote dialogue system server 1 for the dialogue processing, the mobile device 400 may process dialogue with a user and provide a service needed for the user, by itself. However, the mobile device 400 may bring one piece of the information for the dialogue processing and service provision from the external content server 300.

According to any method of the above-mentioned methods, components forming the dialogue system 100 may be physically separated from each other or some of the components may be omitted. For example, even when the dialogue system 100 is provided in the remote dialogue system server 1, some of components forming the dialogue system 100 may be provided in a separate server or in the vehicle. An operator or a manager of the separate server may be the same as or different from that of the remote dialogue system server 1. For example, a speech recognizer or a natural language understanding portion described below may be provided in the separate server. The dialogue system 100 may receive a result of speech recognition or a result of natural language understanding about a user's utterance, from the separate server. Alternatively, the storage 140 may be provided in the separate server.

A description of the detailed configuration and detailed operation of each component of the dialogue system 100 is described in detail below. According to embodiments of the present disclosure described below, for convenience of explanation, it is assumed that the dialogue system 100 is provided in the vehicle 200. Specific components of the dialogue system 100 described below may be classified according to an operation thereof. There may be no limitation on whether the components are implemented by the same processor and memory or not. Additionally, there may be no limitation on a physical position of the processor memory.

Figure 19:
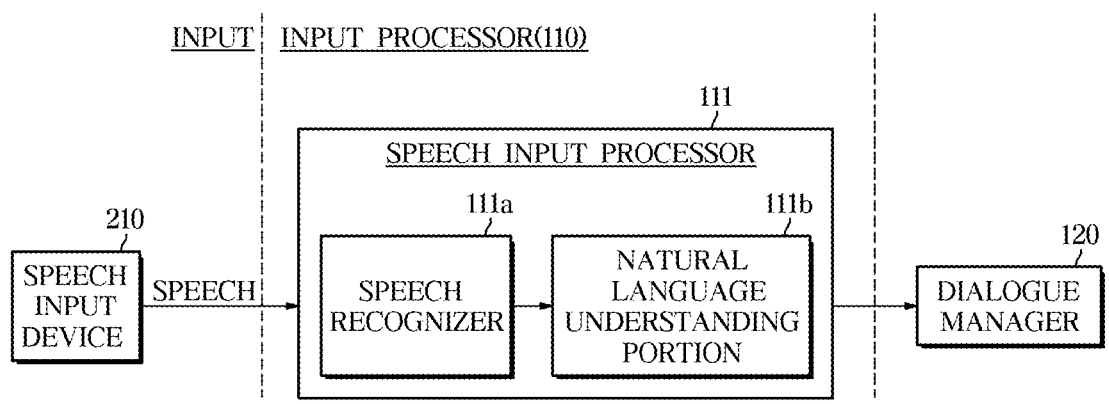
FIGS. 19, 20A and 20B are control block diagrams illustrating a configuration of an input processor in the configuration of the dialogue system in detail.
Figure 20A:
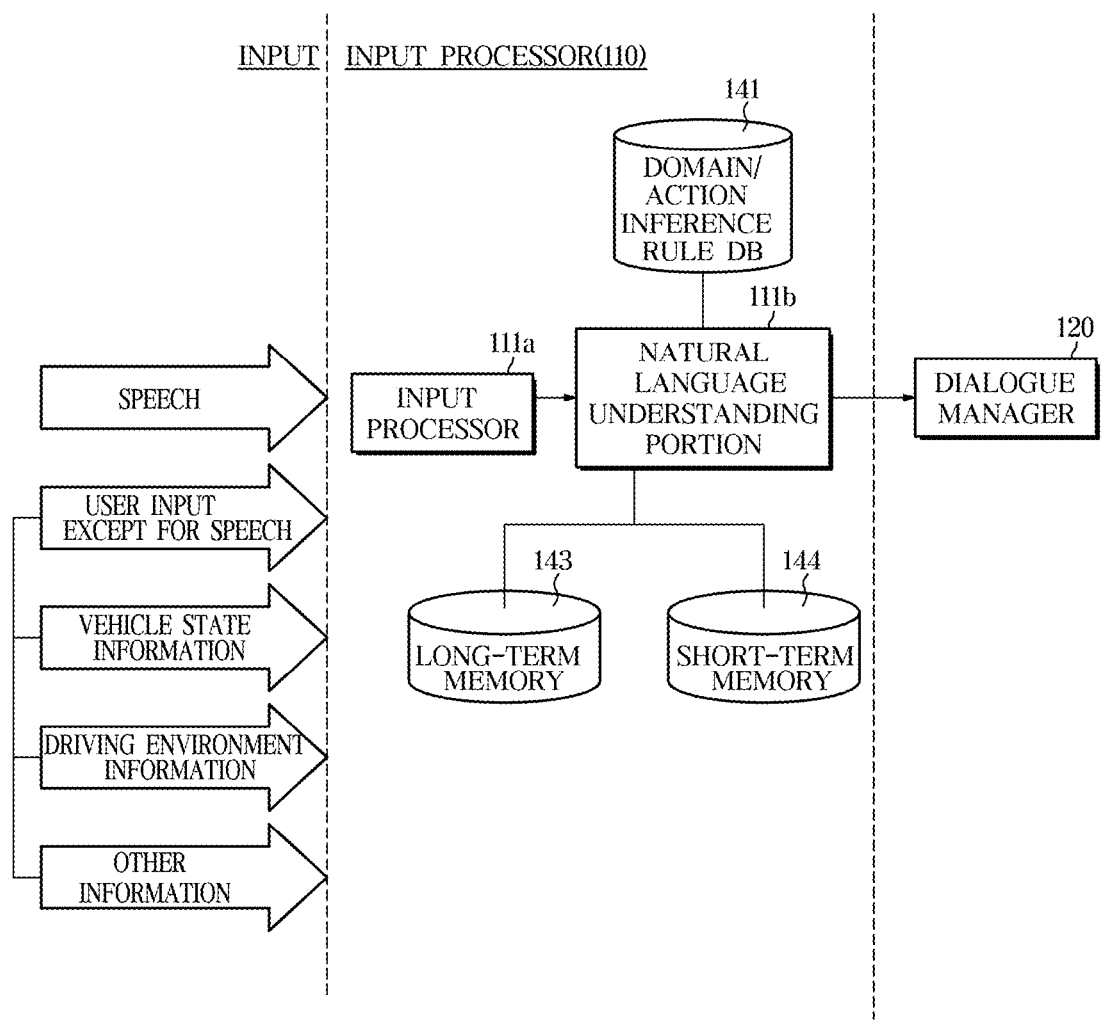
Figure 20B:
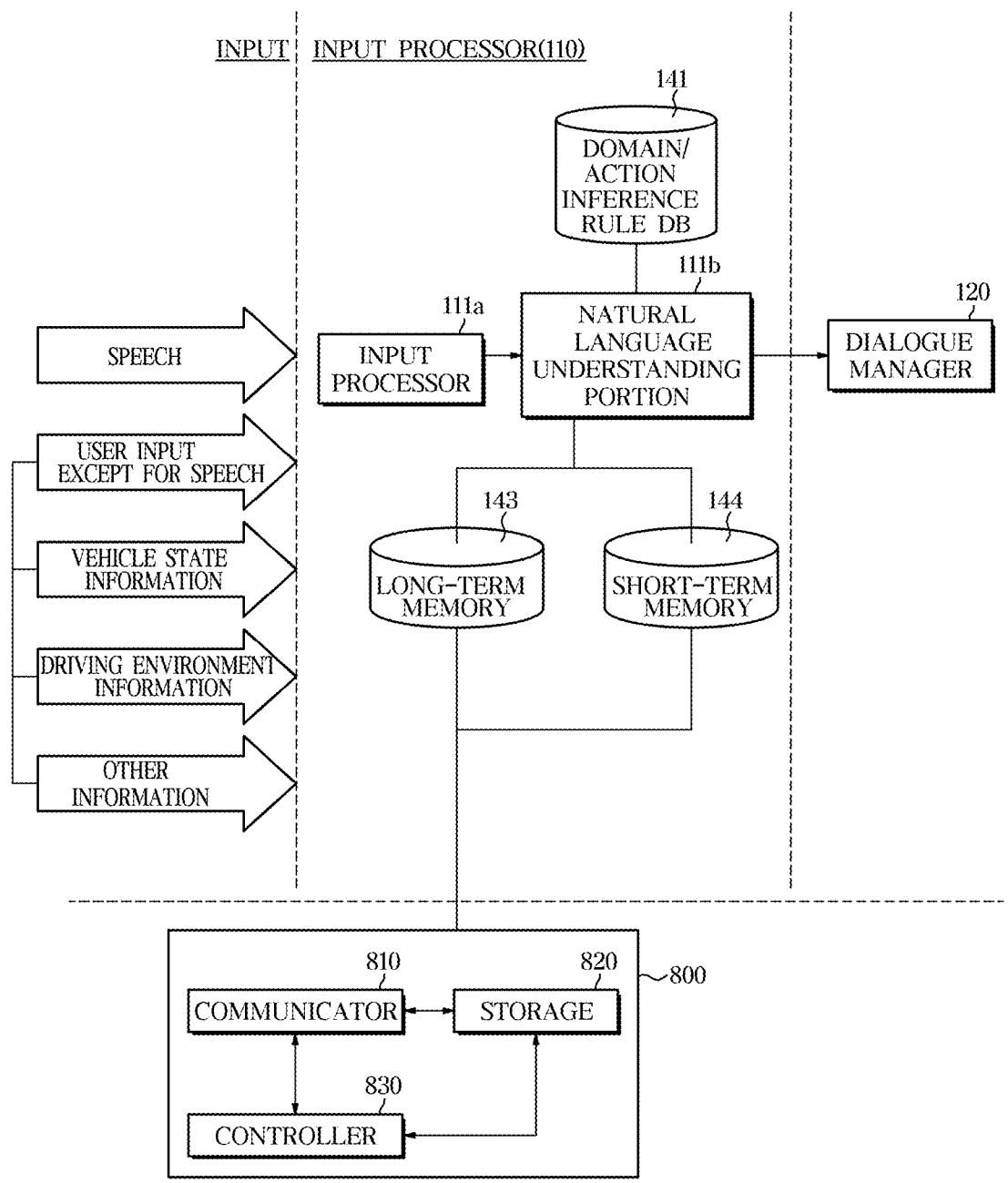

FIGS. 19, 20A, and 20B are control block diagrams illustrating a configuration of an input processor of the dialogue system in detail according to an embodiment.

As shown in FIG. 19, the input processor 110 may include the speech input processor 111 configured to process the speech input. The user's speech input may be transmitted through the speech input device 210 to the speech input processor 111.

The speech input processor 111 may include an speech recognizer 111a configured to output an utterance in the text type by recognizing the input user's speech. The speech input processor 111 may further include a natural language understanding portion 111b configured to identify the user's intent contained in the utterance by applying natural language understanding technology to the user utterance. The natural language understanding portion 111b further configured to transmit a result of the natural language understanding and the context information to the dialogue manager 120. Alternatively, the speech input processor 111 may also include a dialogue input manager (not shown) configured to transmit the context the result of the natural language understanding and the context information to the dialogue manager 120.

The speech recognizer 111a may include a speech recognition engine and the speech recognition engine may recognize a speech uttered by a user by applying a speech recognition algorithm to the input speech and generate a recognition result.

Since the input speech is converted into a more useful form for the speech recognition, the speech recognizer 111a may detect an actual speech section included in the speech by detecting a start point and an end point from the speech signal. This is called End Point Detection (EPD).

The speech recognizer 111a may extract the feature vector of the input speech from the detected section by applying the feature vector extraction technique, e.g., Cepstrum, Linear Predictive Coefficient: (LPC), Mel Frequency Cepstral Coefficient (MFCC) or Filter Bank Energy.

The speech recognizer 111a may acquire the results of recognition by comparing the extracted feature vector with a trained reference pattern. At this time, the speech recognizer 111a may use an acoustic model of modeling and comparing the signal features of a speech, and a language model of modeling a linguistic order relation of a word or a syllable corresponding to a recognition vocabulary. For this, the storage 140 may store the acoustic model and language model DB.

The acoustic model may be classified into a direct comparison method of setting a recognition target to a feature vector model and comparing the feature vector model to a feature vector of a speech signal, and a statistical method of statistically processing a feature vector of a recognition target.

The direct comparison method includes setting a unit, such as a word or a phoneme, which is a recognition target, to a feature vector model, and comparing a received speech to the feature vector model to determine similarity between them. An example of the direct comparison method is vector quantization. Vector quantization includes mapping feature vectors of a received speech signal to a codebook that is a reference model to code the results of the mapping to representative values and includes comparing the representative values to each other.

The statistical model method includes configuring units of a recognition target as state sequences and using a relationship between the state sequences. Each state sequence may be configured with a plurality of nodes. The method of using the relationship between the state sequences may be classified into Dynamic Time Warping (DTW), Hidden Markov Model (HMM), and a method of using a neural network.

The DTW is a method of compensating for differences in the time axis through comparison to a reference model in consideration of the dynamic feature of speech that the length of a signal varies over time even when the same person utters the same pronunciation. The HMM is a recognition method of assuming a speech as a Markov process having state transition probability and observation probability of nodes (output symbols) in each state. Then, state transition probability and observation probability of nodes based on learning data are estimated, and the probability at which a received speech is to be generated from an estimated model is calculated.

The language model of modeling a linguistic order relation of a word, a syllable, etc. may reduce acoustic ambiguity and recognition errors by applying an order relation between units configuring a language to units acquired through speech recognition. The language model may include a statistical language model, and a model based on Finite State Automata (FSA). The statistical language model uses chain probability of a word, such as Unigram, Bigram, and Trigram.

The speech recognizer 111a may use any one of the above-described methods for the speech recognition. For example, the speech recognizer 111a may use an acoustic model to which the HMM is applied, or a N-best search method in which an acoustic model is combined with a speech model. The N-best search method may improve recognition performance by selecting N recognition result candidates or less using an acoustic model and a language model and then re-estimating an order of the recognition result candidates.

The speech recognizer 111a may calculate a confidence value to ensure reliability of a recognition result. A confidence value may be criteria representing how a speech recognition result is reliable. For example, the confidence value may be defined, with respect to a phoneme or a word that is a recognized result, as a relative value of probability at which the corresponding phoneme or word has been uttered from different phonemes or words. Accordingly, a confidence value may be expressed as a value between 0 and 1 or between 0 and 100.

When the confidence value is greater than a predetermined threshold value, the speech recognizer 111a may output the recognition result to allow an operation corresponding to the recognition result to be performed. When the confidence value is equal to or less than the threshold value, the speech recognizer 111a may reject the recognition result.

The utterance in the form of text that is the recognition result of the speech recognizer 111a may be input to the natural language understanding portion 111b.

The natural language understanding portion 111b may identify an intent of user's utterance included in an utterance language by applying the natural language understanding technology. Therefore, the user may input a control command through a natural dialogue. The dialogue system 100 may also induce the input of the control command and provide a service needed the user via the dialogue.

The natural language understanding portion 111b may perform morphological analysis on the utterance in the form of text. A morpheme is the smallest unit of meaning and represents the smallest semantic element that may no longer be subdivided. Thus, the morphological analysis is a first step in natural language understanding and transforms the input string into the morpheme string.

The natural language understanding portion 111b may extract a domain from the utterance based on the morphological analysis result. The domain may be used to identify a subject of a user utterance language and the domain indicating a variety of subjects, e.g., route guidance, weather search, traffic search, schedule management, fuel management and air conditioning control, may be stored as a database.

The natural language understanding portion 111b may recognize an entity name from the utterance. The entity name may be a proper noun, e.g., people names, place names, organization names, time, date, and currency. The entity name recognition may be configured to identify an entity name in a sentence and determine the type of the identified entity name. The natural language understanding portion 111b may extract important keywords from the sentence using the entity name recognition and recognize the meaning of the sentence.

The natural language understanding portion 111b may analyze a speech act contained in the utterance. The speech act analysis may be configured to identify the intent of the user utterance, e.g., whether a user asks a question, whether a user asks a request, whether a user responds or whether a user simply expresses an emotion.

The natural language understanding portion 111b extracts an action corresponding to the intent of the user's utterance. The natural language understanding portion 111b may identify the intent of the user's utterance based on the information, e.g., domain, entity name, and speech act and extract an action corresponding to the utterance. The action may be defined by an object and an operator.

The natural language understanding portion 111b may extract a parameter related to the action execution. The parameter related to the action execution may be an effective parameter that is directly required for the action execution, or an ineffective parameter that is used to extract the effective parameter.

For example, when a user's utterance is: "Lets go to the Seoul station.", the natural language understanding portion 111b may extract "navigation" as a domain corresponding to the utterance, and "route guidance" as an action. In this embodiment, a speech act corresponds to "request".

The entity name "Seoul station" may correspond to [parameter destination] related to the action execution. However, a specific exit number of the station or GPS information may be required to practically guide a route via the navigation system. In this case, [parameter destination: Seoul station] extracted by the natural language understanding portion 111b may be a destination parameter for searching "Seoul station" that is actually desired by the user among a plurality of Seoul station POI.

The natural language understanding portion 111b may extract a tool configured to express a relationship between words or between sentences, e.g., a parse-tree.

The morphological analysis result, the domain information, the action information, the speech act information, the extracted parameter information, the entity name information and the parse-tree, which is the processing result of the natural language understanding portion 111b may be transmitted to the dialogue input manager 120.

The input processor 110 may include a memory in which a program for performing the above-described operation and the operation described below is stored. The input processor 110 may further include a processor for executing the stored program. At least one memory and one processor may be provided. When a plurality of memory and processors are provided, they may be integrated on one chip or physically separated.

The speech input processor 111 in the input processor 110 may be implemented by the same processor and memory or a separate processor and memory.

Hereinafter, a method in which components of the input processor 110 process the input data using information stored in the storage 140 is described below in detail with reference to FIGS. 20A and 20B.

As shown in FIG. 20A, the natural language understanding portion 111b may use the domain/action inference rule DB 141 for the domain extraction, entity recognition, the speech act analysis and the action extraction.

In the domain/action inference rule DB 141, domain extraction rules, speech act analysis rules, entity name conversion rules, action extraction rules may be stored.

Other information such as the user input other than the speech, the vehicle state information, the driving environment information and the user information may be stored in the long-term memory 143 or the short-term memory 144.

For example, in the short-term memory 144 and long-term memory 143, data that is meaningful to the user may be stored. In this embodiment, the data may include the current user state, the user's preference and orientation or data for determining the user's preference and orientation.

As described above, information that ensures the persistence and that is usable in the long term, may be stored in the long-term memory 143. In this embodiment, the information may include the user's phone book, schedule, preferences, educational history, personality, job, and information related to family. Information that does not ensure the persistence or has uncertainties and thus is usable in the short term may be stored in the short-term memory 144. In this embodiment, the information may include the current and previous position, today's schedule, the previous dialogue content, dialogue participants, circumstances, domains, and driver state. According to the data type, there may be data stored in at least two storages among the short-term memory 144 and the long-term memory 143 in duplicate.

In addition, among the information stored in the short-term memory 144, data which is determined to ensure the persistence, may be transmitted to the long-term memory 143.

It may be possible to acquire information to be stored in the long-term memory 143 using information stored in the short-term memory 144. For example, the user's preference may be acquired by analyzing destination information that is stored for certain duration or the dialogue content. The acquired user's preference may be stored in the long-term memory 143.

By using information stored in the short-term memory 144, information may be obtained to be stored in the long-term memory 143 in the dialogue system 100, or in an additional external system.

It may possible to perform the former case in the memory manager 135 (shown in FIG. 24) of the result processor 130. In this case, among the data stored in the short-term memory 144, data used to acquire meaningful information, e.g., the user's preference or orientation or persistent information may be stored in the long-term memory 143 in the log file type.

The memory manager 135 may acquire persistent data by analyzing data that is stored for more than a certain duration and may re-store the data in the long-term memory 143. In the long-term memory 143, a location in which the persistent data is stored may be different from a location in which the data stored in the log file type is stored.

The memory manager 135 may determine persistent data among data stored in the short-term memory 144 and move and store the determined data to and in the long-term memory 143.

A data management system 800 including the communicator 810, the storage 820, and the controller 830 may be used as shown in FIG. 20B.

The communicator 810 may receive data stored in the short-term memory 144. All data stored may be transmitted to the communicator 810 or the data used to acquire meaningful information, e.g., the user's preference or orientation or persistent information may be selected and then transmitted. The received data may be stored in the storage 820.

The controller 830 may acquire the persistent data by analyzing the stored data and then may transmit the acquired data to the dialogue system 100 via the communicator 810. The transmitted data may be stored in the long-term memory 143 of the dialogue system 100.

Figure 21:
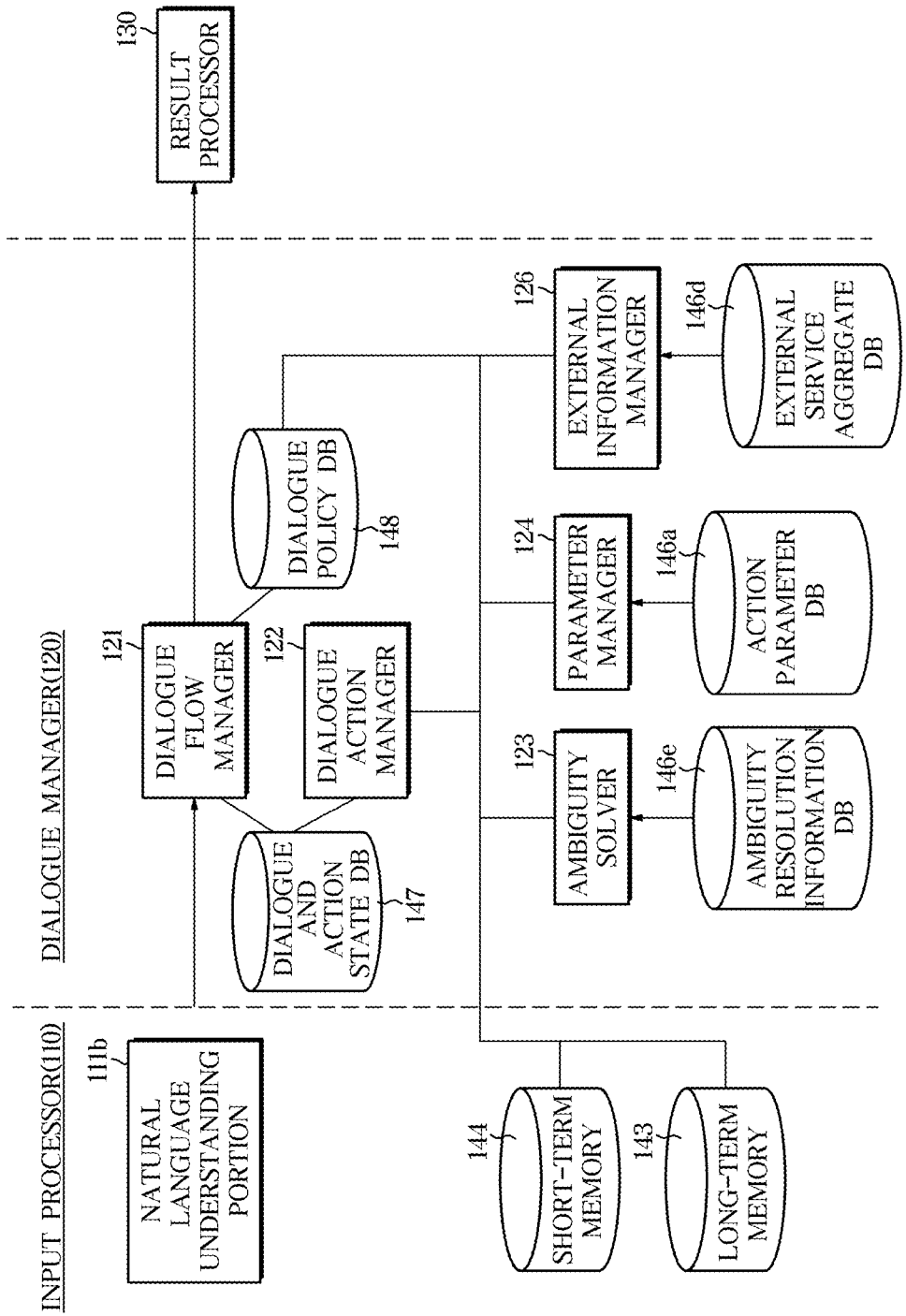
FIG. 21 is a control block diagram illustrating a configuration of a dialogue manager in detail.
Figure 22:
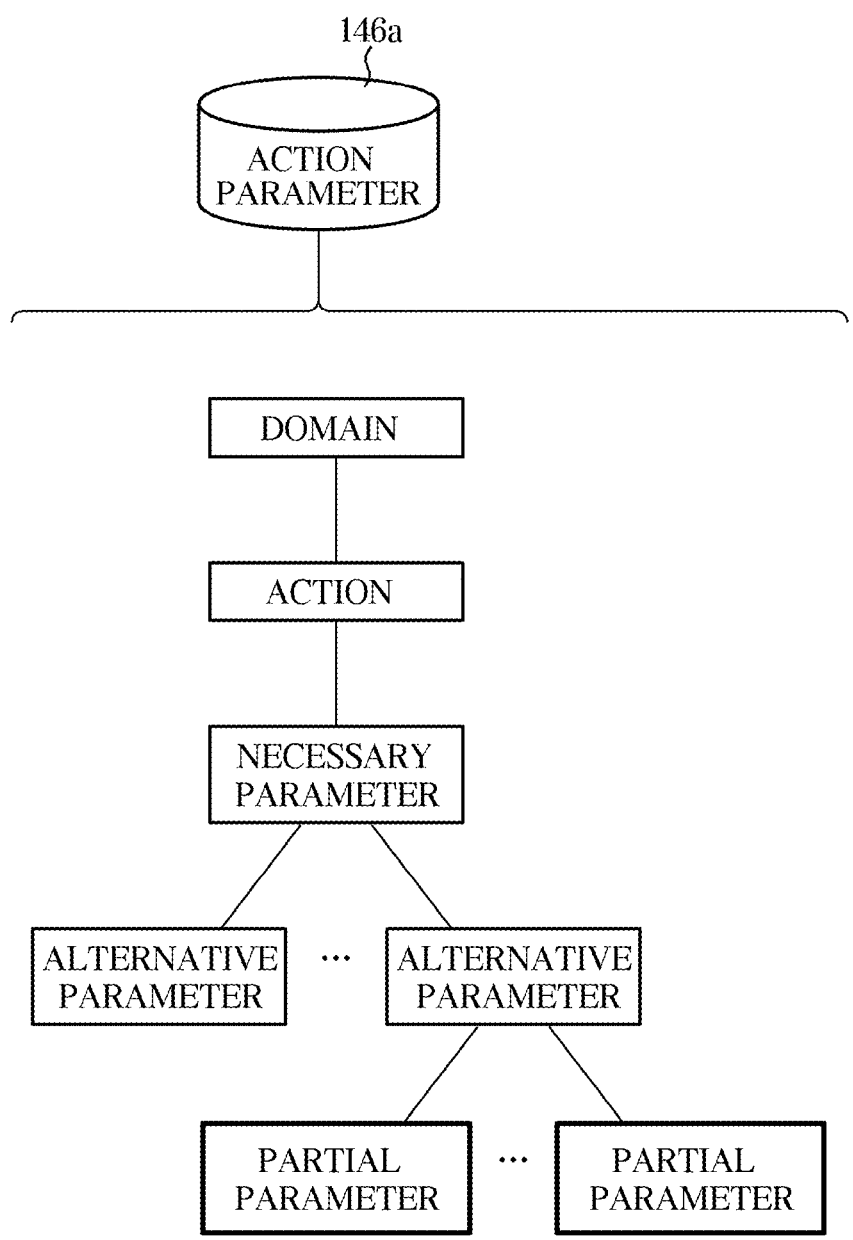
FIG. 22 is a view illustrating an example of information stored in an action parameter DB.
Figure 23A:
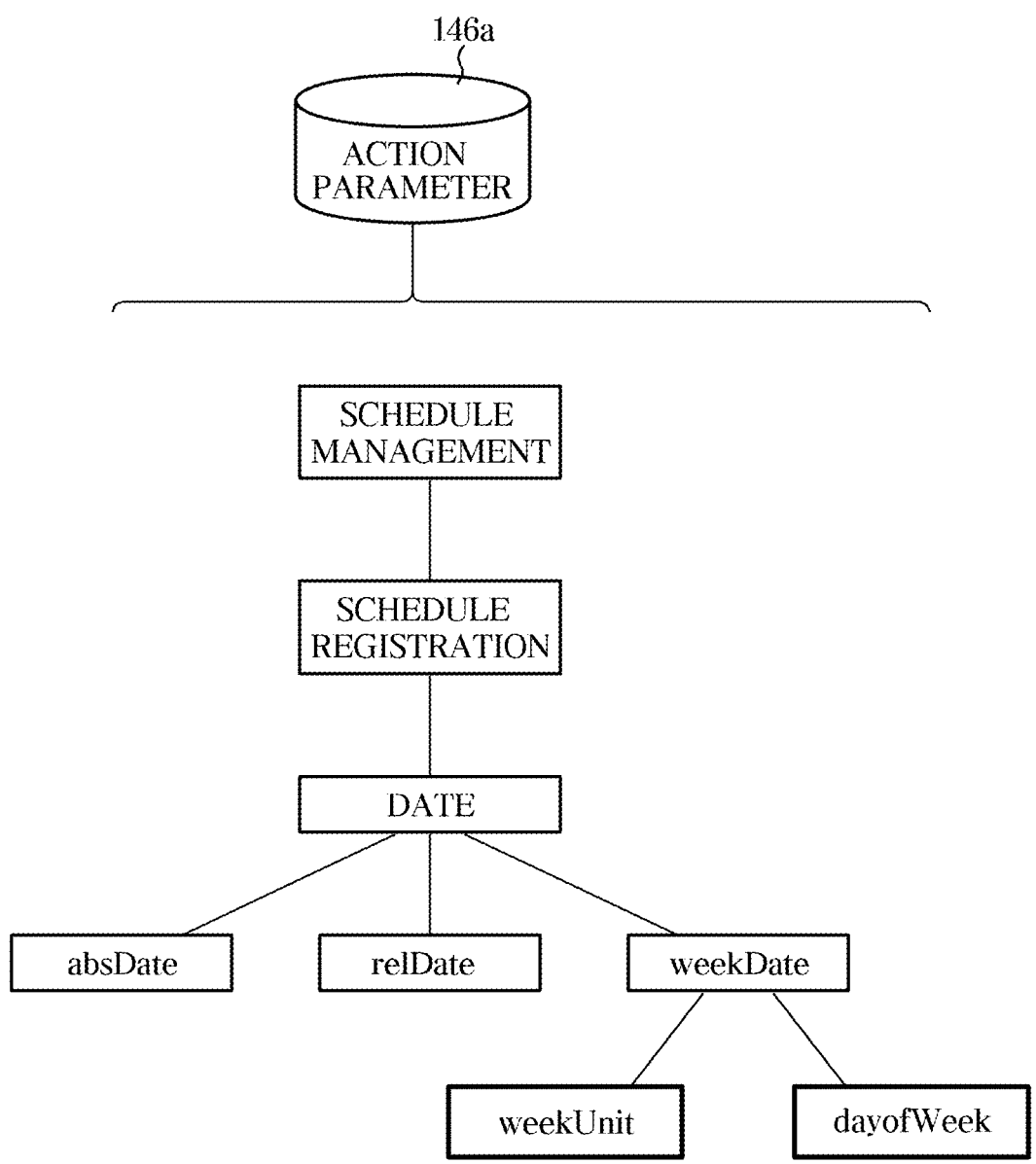
FIGS. 23A, 23B, and 23C are views illustrating an example of information stored in an action parameter DB.
Figure 23B:
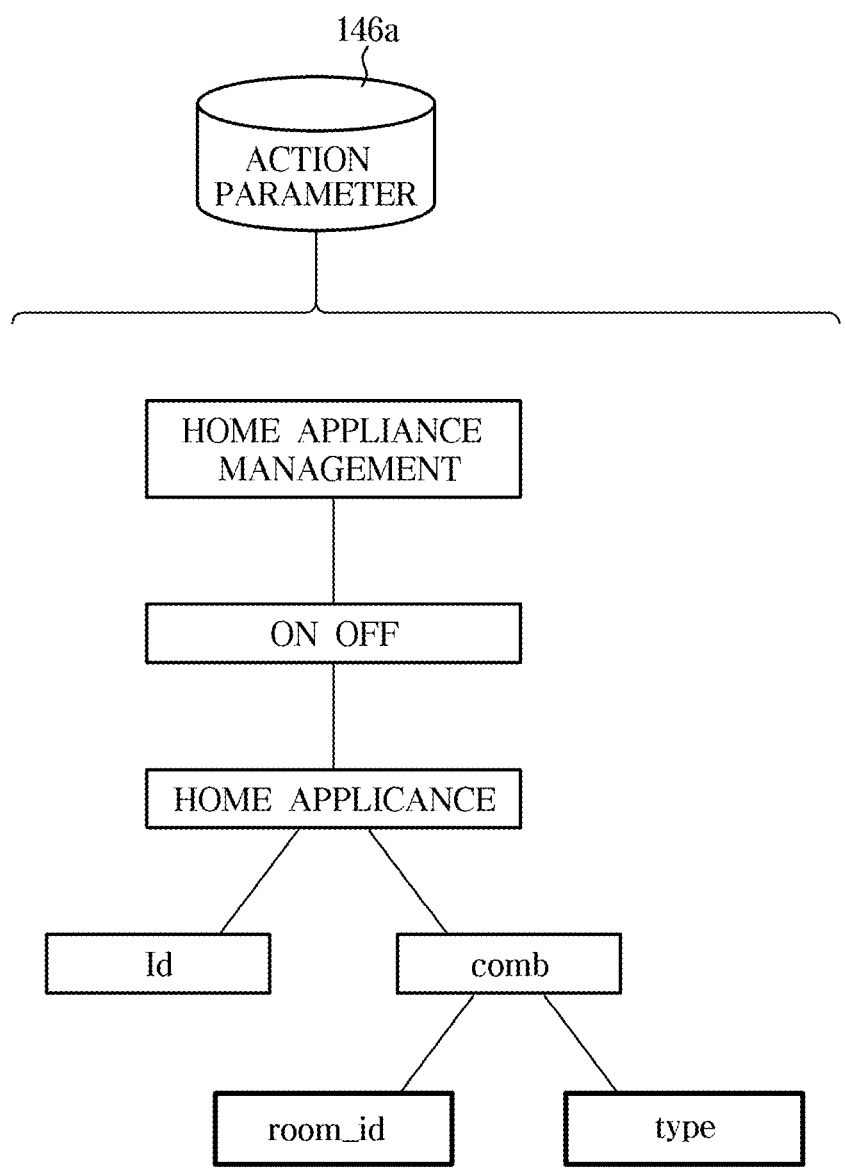
Figure 23C:
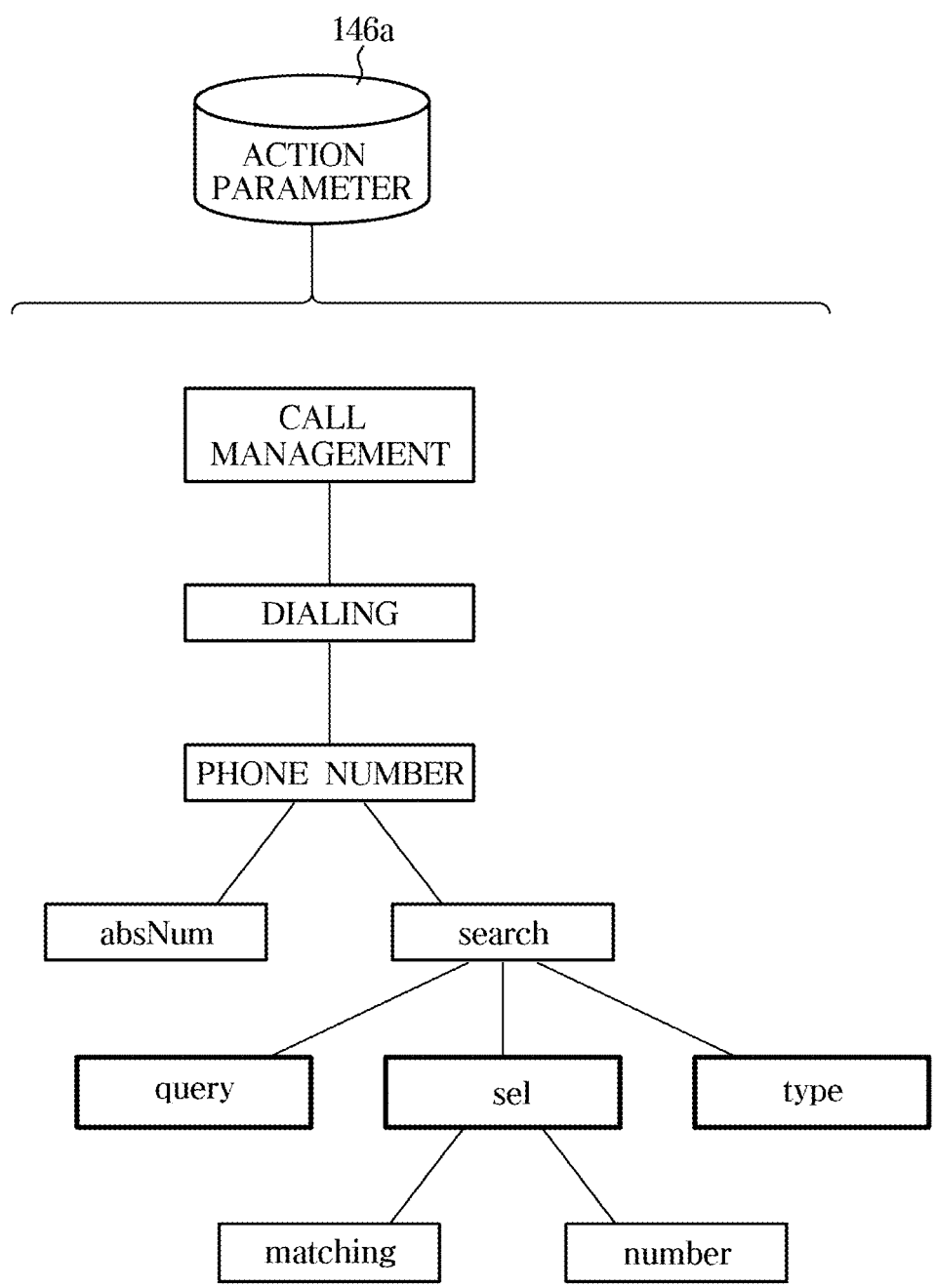

FIG. 21 is a control block diagram illustrating a configuration of a dialogue manager in detail. FIG. 22 is a view illustrating an example of information stored in an action parameter DB. FIGS. 23A, 23B and 23C are views illustrating an example of information stored in an action parameter DB.

As shown in FIG. 21, the dialogue manager 120 may include a dialogue flow manager 121 configured to request generating, deleting, and updating a dialogue or an action. The dialogue manager 120 may further include a dialogue action manager 122 configured to generate, delete, and update the dialogue or the action according to the request of the dialogue flow manager 121. The dialogue manager 120 also includes an ambiguity solver 123 configured to clarify a user's intent by resolving an ambiguity of context and an ambiguity of dialogue. The dialogue manager 120 further includes a parameter manager 124 configured to manage parameters needed for the action execution. The dialogue manager also includes an external information manager 126 configured to manage an external content list and related information and to manage parameter information for an external content query.

The dialogue manager 120 may include a memory in which a program for performing the above-described operation and the operation described below is stored, and a processor for executing the stored program. At least one memory and one processor may be provided. When a plurality of memory and processors are provided, they may be integrated on one chip or physically separated.

Each component contained in the dialogue manager 120 may be implemented by the same processor or by a separate processor.

In addition, the dialogue manager 120 and the input processor 110 may be implemented by the same processor or by a separate processor.

When the user utterance is input or when the user utterance matched with the pre-utterance context is transmitted to the natural language understanding portion 111b, the dialogue input manager (not shown) may transmit the result of the natural language understanding (the output of the natural language understanding portion) to the dialogue flow manager 121.

The output of the natural language understanding portion 111b may include information which is related to the user's utterance content, e.g., a morphological analysis result, as well as other information, e.g., a domain and an action.

The dialogue flow manager 121 may search for whether a dialogue task or an action task corresponding to the input by the dialogue input manager (not shown) is present in the dialogue and action state DB 147.

The dialogue and action state DB 147 may be a storage space for managing the dialogue state and the action state. Thus, the dialogue and action state DB 147 may store currently progressing dialogue and action, and dialogue state and action state indicating preliminary actions to be processed. For example, the dialogue and action state DB 147 may store states related to completed dialogue and action, stopped dialogue and action, progressing dialogue and action, and dialogue and action to be processed.

The dialogue and action state DB 147 may store last output state related to whether to switch and to nest an action, switched action index, action change time, and screen/voice/command.

For example, in a case in which the domain and the action corresponding to a user utterance is extracted, when the dialogue and the action corresponding to the corresponding domain and action are present in the most recently stored dialogue, the dialogue and action state DB 147 may determine it as the dialogue task or action task corresponding to the input from the dialogue input manager (not shown).

When the domain and the action corresponding to a user utterance is not extracted, the dialogue and action state DB 147 may generate a random task or may request that the dialogue action manager 122 refers to the most recently stored task.

When the dialogue task or action task corresponding to the input of the input processor 110 is not present in the dialogue and the action state DB 147, the dialogue flow manager 121 may request that the dialogue action manager 122 generates a new dialogue task or an action task.

When the dialogue flow manager 121 manages the dialogue flow, the dialogue flow manager 121 may refer to a dialogue policy DB 148. The dialogue policy DB 148 may store a policy to continue the dialogue, wherein the policy may represent a policy for selecting, starting, suggesting, stopping and terminating the dialogue.

In addition, the dialogue policy DB 148 may store a point of time in which a system outputs a response, and a policy about a methodology. The dialogue policy DB 148 may store a policy for generating a response by linking multiple services and a policy for deleting previous action and replacing the action with another action.

For example, two policies may be allowed. The two polices may include a policy in which a response for two actions is generated at once, e.g., "Is there a need to perform action B after performing action A?" and a policy in which a separate response for another action is generated after a response for an action is generated, e.g., "Action A has been executed."→"Do you want to execute action B.".

The dialogue action manager 122 may designate a storage space to the dialogue and the action state DB 147 and may generate dialogue task and action task corresponding to the output of the input processor 110.

When it is impossible to extract a domain and an action from the user's utterance, the dialogue action manager 122 may generate a random dialogue state. In this case, as mentioned later, the ambiguity solver 123 may identify the user's intent based on the content of the user's utterance, the environment condition, the vehicle state, and the user information, and may determine an action appropriate for the user's intent.

When the dialogue task or action task corresponding to the output of the input processor 110 is present in the dialogue and the action state DB 147, the dialogue flow manager 121 may request that the dialogue action manager 122 refers to the corresponding dialogue task or action task.

The parameter manager 124 may retrieve a parameter (hereinafter referred to as an action parameter) used to perform at least one action in the action parameter DB 146a.

As shown in FIG. 22, the action parameter DB 146a may include at least one action for each domain, and each of at least one action may include a parameter used to perform the action.

These parameters may form a tree structure and may be stored in the action parameter DB 146a in the form of a parameter tree.

A parameter tree may be expressed as a hierarchical structure consisting of nodes and relations. The parameter tree may contain at least one parameter node represented by a tree structure. Each parameter node may be divided into an upper parameter node and a lower parameter node according to the hierarchy of the corresponding parameter node. In this case, a parameter node in the same hierarchy may mean a parameter node located in the same row.

The at least one parameter may form a tree structure in which each parameter node is filled with a parameter value corresponding thereto and may be stored in the action parameter DB 146a.

The relationship in the parameter tree may include an alternative relation and a partial relation. Specifically, the relationship between a plurality of parameter nodes located in the same hierarchy of the parameter tree may be an alternative relationship or a partial relationship. Hereinafter, the relationship of the parameters located at each parameter node is described below.

A parameter in an alternative relation (hereinafter, referred to as an "alternative parameter") means a parameter that expresses an upper parameter in various ways. When at least one of the alternative parameters located in the same hierarchy is filled, a parameter located in an upper hierarchy of the corresponding hierarchy may be designated. In other words, even when there is a plurality of alternative parameters located in the same hierarchy, a parameter value for a parameter located in an upper hierarchy of the hierarchy may be determined when a parameter value for one alternative parameter is obtained.

A parameter in a partial relation (hereinafter referred to as a partial parameter) means a parameter in a relation constituting an upper parameter. A parameter located in the same hierarchy may not specify a parameter located in an upper hierarchy of the corresponding hierarchy even if at least one of the parameters is filled in. If all the partial parameters are filled, a parameter located in an upper hierarchy of the hierarchy may be designated. In other words, when a plurality of partial parameters is located in the same hierarchy, a parameter value for a parameter located in an upper hierarchy of the hierarchy may be determined by acquiring a parameter value for all the plurality of partial parameters.

Each of the at least one action that constructs the parameter tree may contain the essential parameters, which are the parameters that are essential to perform the action. Essential parameters may include at least one of an alternative parameter or a partial parameter. An alternative parameter or a partial parameter constituting such an essential parameter may be located at a lower hierarchy in the parameter tree.

These parameter trees may have various forms with a hierarchical structure. For example, as shown in FIG. 23A, a 'schedule registration' action may be included in a 'schedule management' domain, and an essential parameter used to perform a 'schedule registration' action may include a 'date'.

The essential parameter 'date' is an alternative parameter in the alternative relationship that may include 'absolute date(absDate)', 'relative date(relDate)', and 'weekDate'. 'WeekDate' may contain 'weekUnit' and 'dayofWeek' as partial parameters that are partially related to the lower hierarchy. Hereinafter, the parameter indicated by the bold line in the parameter tree is a partial parameter.

In another example, as shown in FIG. 23B, the 'home appliance management' domain may include an 'on-off' action and a required parameter used to perform an 'on-off' action may include a 'home appliance'.

Essential parameters 'home appliances' may include 'identification' ('id')' and 'combination information (comb)' as alternative parameters in an alternative relationship. 'Comb' may include 'space_id' and 'type' as partial parameters that are partially related to the lower hierarchy.

As described above, the alternative parameter may include a partial parameter located in a lower hierarchy. In addition, the partial parameter may be placed in the upper layer of the alternative parameter. The partial parameter may include the alternative parameter. In this case, the alternative parameter included in the partial parameter may again include an alternative parameter or a partial parameter in the lower hierarchy.

For example, as shown in FIG. 23C, the 'call management' domain may include a 'dialing' action, and the essential parameters used to perform the 'dialing' action may include a 'phone number'. The 'phone number' may include 'number information ('absNum')' and 'search' ('search') as alternative parameters in an alternative relationship. 'Search' may include 'query', 'select', 'type' as partial parameters that are partially related to the lower hierarchy.

'Select' of partial parameters of 'search' include 'matching' and 'number' as alternative parameters in a lower hierarchy.

The parameter manager 124 may retrieve the parameter tree corresponding to the user's utterance in the action parameter DB 146a and obtain the parameter value of the parameter constituting the parameter tree based on the input user's utterance.

At this time, the parameter manager 124 may obtain a parameter value for a parameter constituting the parameter tree based on the non-speech input information stored in at least one of the long-term memory 143 or the short-term memory 144. In addition, the location at which the parameter value may be obtained may be at least one of the dialogue and action state DB 147 or the external content server 300.

The parameter manager 124 may bring the parameter value from the external content server 300 via the external information manager 126. The external information manager 126 may determine from which information is brought, by referring to the external service aggregate DB 146d.

The external service aggregate DB 146d may store information related to the external content server 300 connected to the dialogue system 100. For example, the external service aggregate DB 146d may store external service name, explanation about an external service, the type of information provided from an external service, external service using method, and a subject of providing the external service.

The initial value acquired by the parameter manager 124 may be transmitted to the dialogue action manager 122. The dialogue action manager 122 may update the dialogue and the action state DB 147 by adding the initial value according to the candidate action to the action state.

In other words, the dialogue action manager 122 may match the parameter values of the parameters constituting the parameter tree and may store the parameter tree matched with the parameter values in the dialogue and action state DB 147.

Alternatively, the parameter manager 124 may match the obtained parameter values to the parameters constituting the parameter tree and store the parameter tree including the matched parameter values in the action parameter 146a.

The parameter manager 124 may determine the information needed to perform the action based on the stored parameter tree.

Specifically, the parameter manager 124 may identify a parameter for which the parameter value is not matched, i.e., a parameter for which the parameter value is not filled, among the parameters constituting the parameter tree.

For this purpose, the parameter manager 124 may check whether the parameter values correspond to the parameters included in the parameter tree for each hierarchy and may check whether or not the hierarchy is filled based on the types of the parameters located in the respective hierarchies.

The parameter manager 124 may check whether at least one parameter located in a specific hierarchy of the parameter tree is an alternative parameter or a partial parameter and may confirm whether the hierarchy is filled based on the confirmation result.

Specifically, if a parameter value corresponding to at least one of the alternative parameters located in the same hierarchy of the parameter tree exists, the parameter manager 124 may confirm that the parameter value is filled in the corresponding hierarchy. On the other hand, if there is no parameter value corresponding to all the alternative parameters located in the same hierarchy of the parameter tree, the parameter manager 124 may confirm that the parameter value is not filled in the corresponding hierarchy.

In addition, the parameter manager 124 may confirm that the parameter values are filled in the corresponding hierarchy if parameter values corresponding to all the partial parameters located in the same hierarchy of the parameter tree exist. Alternatively, if there is no parameter value corresponding to at least one partial parameter among the partial parameters located in the same hierarchy of the parameter tree, the parameter manager 124 may confirm that the parameter value is not filled in the corresponding hierarchy.

Also, if the parameter manager 124 confirms that the parameter value is filled in the specific hierarchy, it is possible to identify the hierarchy in which the parameter value is not filled by repeating the above-described process for the parameter located in the upper hierarchy of the corresponding hierarchy.

In addition, the parameter manager 124 may determine a parameter located in the hierarchy in which the parameter value is not satisfied, as a parameter requiring additional information. At this time, the additional information refers to information for mapping parameter values. The parameter manager 124 may determine at least one parameter that does not correspond to a parameter value among the parameters located in the unfilled hierarchy as a parameter that requires additional information.

The parameter manager 124 may transmit the information on the parameter requiring the parameter value to the dialogue flow manager 121. The dialogue flow manager 121 may transmit the information about the parameter requiring the parameter value to the result processor 130 so that the parameter value may output the information request for the parameter required. Alternatively, the parameter manager 121 may transmit information about a parameter requiring a parameter value directly to the result processor 130.

When the ambiguity is not present in the dialogue and the context, the parameter manager 124 and the external information manager 126 may obtain necessary information and may manage dialogs and actions. However, when there is ambiguity in the conversation and it is difficult to obtain the parameter value from the user's utterance, it is difficult to provide the appropriate service to the user only by the operation of the parameter manager 124 and the external information manager 126.

In this case, the ambiguity solver 123 may deal with the ambiguity in the dialogue or in the context. For example, when anaphora, e.g., the person, that place on yesterday, father, mother, grandmother, and daughter-in-law, is contained in the dialogue, there may be ambiguity because it is not clear that the anaphora represents whom or which. In this case, the ambiguity solver 123 may resolve the ambiguity by referring to the long-term memory 143 or the short-term memory 144 or provide a guidance to resolve the ambiguity.

For example, an ambiguous word contained in "next Wednesday", "the day after tomorrow" may correspond to a parameter value of the action parameter or a parameter value of the condition determination parameter. However, in this case, it is impossible to perform a real action or to determine an action execution condition by using the corresponding word, due to the ambiguity of the word.

The ambiguity solver 123 may convert parameter values for a particular parameter into usable information based on the information stored in the long-term memory 143 or the short-term memory 144. In this embodiment, the usable information refers to information of a predetermined format in which the dialogue system 100 may output a response corresponding to the action.

For example, by taking information about the reference date (current date) from the external content server 300, it is possible to convert "next Wednesday" into information usable as the date of the schedule registration action. That is, if the current date is Oct. 23, 2018, ambiguity solver 123 may convert "next Wednesday" to Oct. 31, 2018.

For example, the ambiguity solver 123 may search for a place where a user went yesterday by referring to the short-term memory 144, to convert "that place on yesterday" into information that is available as a destination for the route guidance action. The ambiguity solver 123 may search for a user's house address by referring to the long-term memory 143 and bring location information related to a market near the user's house address, from the external content server 300. Therefore, the ambiguity solver 123 may convert "A market near house" into information that is available as a destination for the route guidance action.

When an action (object and operator) is not clearly extracted by the input processor 110 or when the user' intent is not clear, the ambiguity solver 123 may identify the user's intent by referring to an ambiguity resolution information DB 146e, and determine an action corresponding to the identified intent.

The ambiguity resolution information DB 146e may match and store the utterance and the corresponding action based on the vehicle status information and the surrounding situation information. The utterance statement stored in an ambiguity resolution information DB 146e may be a utterance which may not extract action through natural language understanding. The ambiguity resolution information DB 146e may be provided separately or in the long-term memory 143.

The information related to the action determined by the ambiguity solver 123 may be transmitted to the dialogue action manager 122. The dialogue action manager 122 may update the dialogue and action state DB 147 based on the transmitted information.

The dialogue action manager 122 sends a signal to the dialogue flow manager 121 when all the values of the parameter values used to perform each action and the obtainable values through dialogue are obtained. The dialogue flow manager 121 passes the information about the action and the dialogue state to the result processor 130. It is also possible to convey information about a plurality of actions according to a dialogue policy.

On the other hand, when the parameter values necessary for performing the action or determining the condition are not present in the dialogue/action DB 147, the external content server 300, the long term memory 143, and the short term memory 144, it is also possible for the result processor 130 to generate a dialogue response for querying the parameter value to the user if it may only be obtained through the user.

Figure 24:
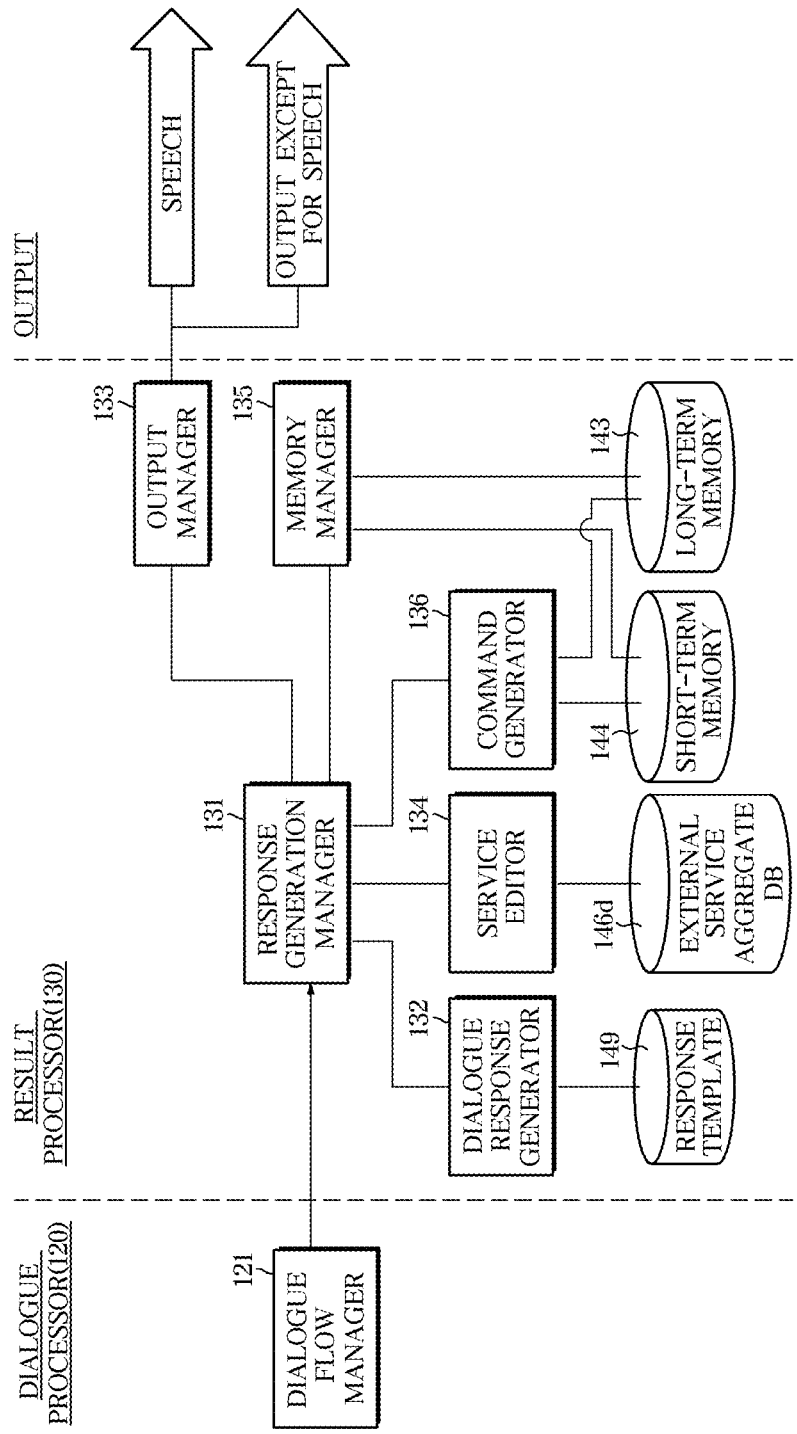
FIG. 24 is a control block diagram illustrating a configuration of the result processor in detail.

FIG. 24 is a control block diagram illustrating a configuration of the result processor in details.

As shown in FIG. 24, the result processor 130 may include: a response generation manager 131 to manage generation of a response needed for executing an action input from the dialogue manager 120; a dialogue response generator 132 to generate a response in text, image or audio type according to the request of the response generation manager 131; a command generator 136 to generate a command for the vehicle control or the provision of service using an external content according to a request of the response generation manager 131; an output manager 133 to output the generated text type response, image type response, or audio type response, to output the command generated by the command generator 136, or to determine an order of the output when the output is plural; and a memory manager 135 to manage the long-term memory 143 and the short-term memory 144 based on the output of the response generation manager 131 and the output manager 133.

The result processor 130 may include a memory in which a program for performing the above-described operation and the operation described below is stored, and a processor for executing the stored program. At least one memory and one processor may be provided. When a plurality of memory and processors are provided, they may be integrated on a single chip or physically separated.

Each component contained in the result processor 130 may be implemented by the same processor or by a separate processor.

In addition, the result processor 130, the dialogue manager 120 and the input processor 110 may be implemented by the same processor or by a separate processor.

The response that is output by corresponding to the user's utterance or context may include the dialogue response, the vehicle control, and the external content provision. The dialogue response may include an initial dialogue, a question, and an answer including information. The dialogue response may be stored as a database in a response template 149.

The response generation manager 131 may request that the dialogue response generator 132 and the command generator 136 generate a response that is needed to execute an action, which is determined by the dialogue manager 120. For this, the response generation manager 131 may transmit information related to the action to be executed, to the dialogue response generator 132 and the command generator 136. The information related to the action to be executed may include an action name and a parameter value. When generating a response, the dialogue response generator 132 and the command generator 136 may refer to the current dialogue state and action state.

The dialogue response generator 132 may extract a dialogue response template by searching the response template 149 and may generate the dialogue response by filling the extracted dialogue response template with the parameter value. The generated dialogue response may be transmitted to the response generation manager 131. When the parameter value needed to generate the dialogue response is not transmitted from the dialogue manager 120 or when an introduction of using the external content is transmitted, the dialogue response generator 132 may receive the parameter value from the external content server 300 or search the long-term memory 143 or the short-term memory 144.

For example, when the action determined by the dialogue manager 120 corresponds to the route guidance, the dialogue response generator 132 may search the response template 149 and then extract a dialogue response template "[duration:-] will be taken from [current position:-] to [destination:-]. Start the guidance?"

[Current position] and [destination] among parameters which are needed to be filled in the dialogue response template may be transmitted from the dialogue manager 120. A parameter value for [duration] may be not transmitted. In this case, the dialogue response generator 132 may request a duration that is taken from [current position] to [destination], to the external content server 300.

When the response to the user utterance or context includes the vehicle control or the external content provision, the command generator 136 may generate a command to execute the vehicle control or the external content provision. For example, when the action determined by the dialogue manager 120 is the control of the air conditioning device, window and AVN, the command generator 136 may generate a command to execute the control and then transmit the command to the response generation manager 131.

Alternatively, when the action determined by the dialogue manager 120 needs the external content provision, the command generator 136 may generate a command to receive the corresponding content from the external content server 300 and then transmit the command to the response generation manager 131.

When a plurality of commands is provided by the command generator 136, the service editor 134 may determine a method and an order to execute the plurality of commands and transmit the method and order to the response generation manager 131.

The response generation manager 131 may transmit the response, which is transmitted from the dialogue response generator 132, the command generator 136, or the service editor 134, to the output manager 133.

The output manager 133 may determine an output timing, an output sequence and an output position of the dialogue response generated by the dialogue response generator 132 and the command generated by the command generator 136.

The output manager 133 may output a response by transmitting the dialogue response generated by the dialogue response generator 132 and the command generated by the command generator 136 to an appropriate output position at an appropriate order with an appropriate timing. The output manager 133 may output a Text to Speech (TTS) response via the speaker 232 and a text response via the display 231. When outputting the dialogue response in the TTS type, the output manager 133 may use a TTS module provided in the vehicle 200 or alternatively the output manager 133 may include a TTS module.

According to the control target, the command may be transmitted to the vehicle controller 240 or the communication device 280 for communicating with the external content server 300.

The response generation manager 131 may also transmit the response transmitted from the dialogue response generator 132, the command generator 136, or the service editor 134 to the memory manager 135.

The output manager 133 may transmit a response that is output by itself to the memory manager 135.

The memory manager 135 may manage the long-term memory 143 or the short-term memory 144 based on the content transmitted from the response generation manager 131 and the output manager 133. For example, the memory manager 135 may update the short-term memory 144 by storing the dialogue content between the user and the system, based on the generated and output dialogue response. The memory manager 135 may update the long-term memory 143 by storing information related to the user that is acquired by the dialogue with the user.

In the information stored in the short-term memory 144, the persistent information, e.g., user's preference or orientation, or information which is used to acquire the persistent information, may be stored in the long-term memory 143.

Based on the vehicle control and the external content request corresponding to the generated and output command, the user preference or the vehicle control history stored in the long-term memory 143 may be updated.

The response generation manager 131 may transmit the dialogue response transmitted from the dialogue response generator 132, to the output manager 133.

The output manager 133 may output the dialogue response generated by the dialogue response generator 132 via the speaker 232.

The dialogue response generator 132 may perform the operation of the parameter manager 124 described above.

The dialogue response generator 132 may determine the information needed to perform the action based on the stored parameter tree. Specifically, the dialogue response generator 132 may identify a parameter for which a parameter value is not matched, in other words, a parameter for which a parameter value is not filled, among the parameters constituting the parameter tree.

To this end, the dialogue response generator 132 may check whether the parameter values correspond to the parameters included in the parameter tree for each hierarchy. The dialogue response generator 132 may check whether or not the hierarchy is filled based on the types of the parameters located in the hierarchy. A detailed description thereof is the same as that of the parameter manager 124.

When the dialogue response generator 132 performs an operation of determining a parameter requiring additional information, the parameter manager 124 may obtain a parameter value for a parameter constituting a parameter tree corresponding to the inputted user's utterance. The dialogue action manager 122 or the parameter manager 124 may match the parameter values obtained by the parameter manager 124 to at least one parameter constituting the parameter tree and store it in the dialogue/action state DB 147. The dialogue response generator 132 may determine parameters that require additional information based on the stored parameter tree.

The dialogue response generator 132 may determine parameters that require additional information based on the stored parameter tree.

Figure 25:
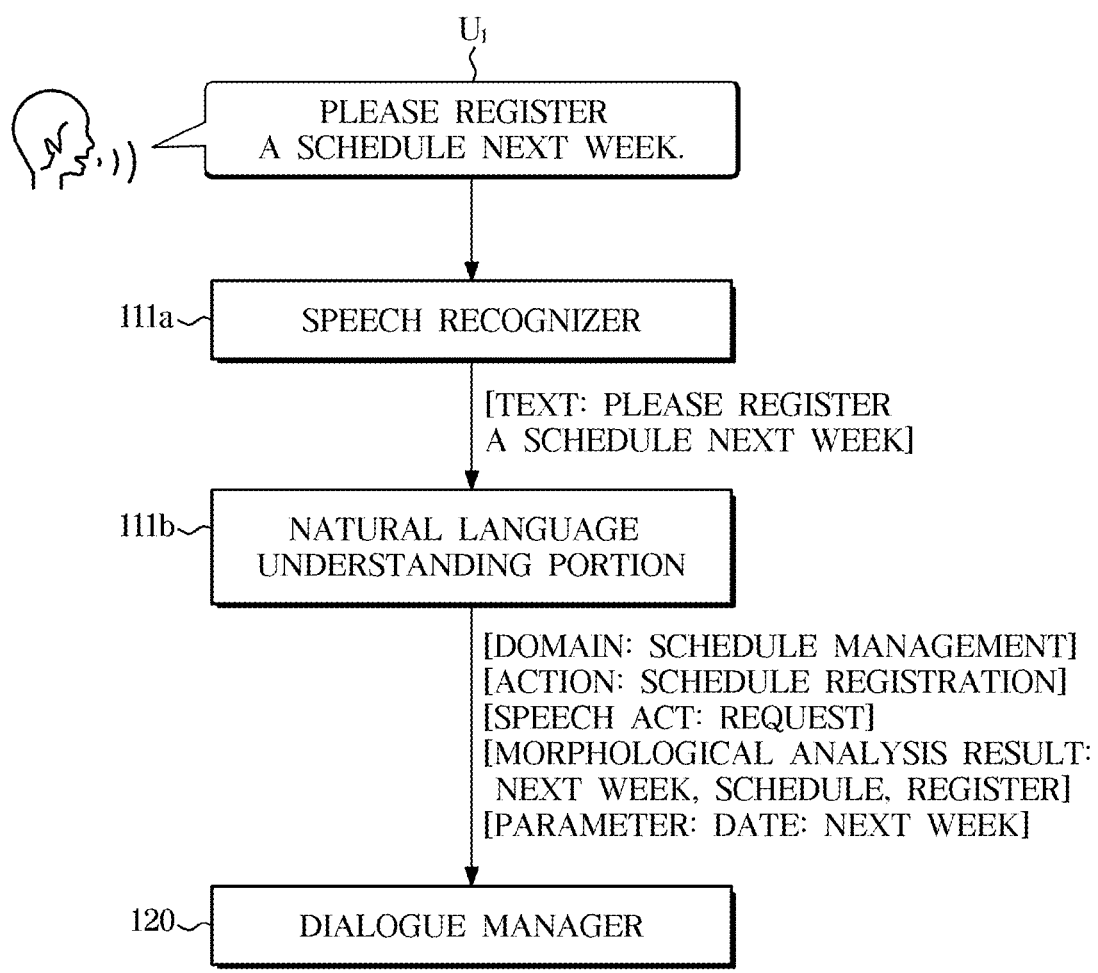
FIGS. 25-30 are views illustrating an example in which the dialogue system processes an input, manages a dialogue, and outputs a result when a user inputs an utterance related to a schedule management.

FIGS. 25-30 are views illustrating an example in which the dialogue system processes an input, manages a dialogue, and outputs a result when a user inputs an utterance related to a schedule management. As shown in FIG. 25, when the user inputs a speech: "Register a schedule next week.", the speech recognizer 111*a* outputs the speech of the user as a text-based speech statement (register a schedule next week).

The natural language understanding portion 111*b* analyzes the morpheme and refers to the domain/action inference rule DB 141 to extract [domain: schedule management], [action: schedule registration], [speech act: request], and [parameter: SMU date: next week] and input them to the dialogue manager 120.

Figure 26:
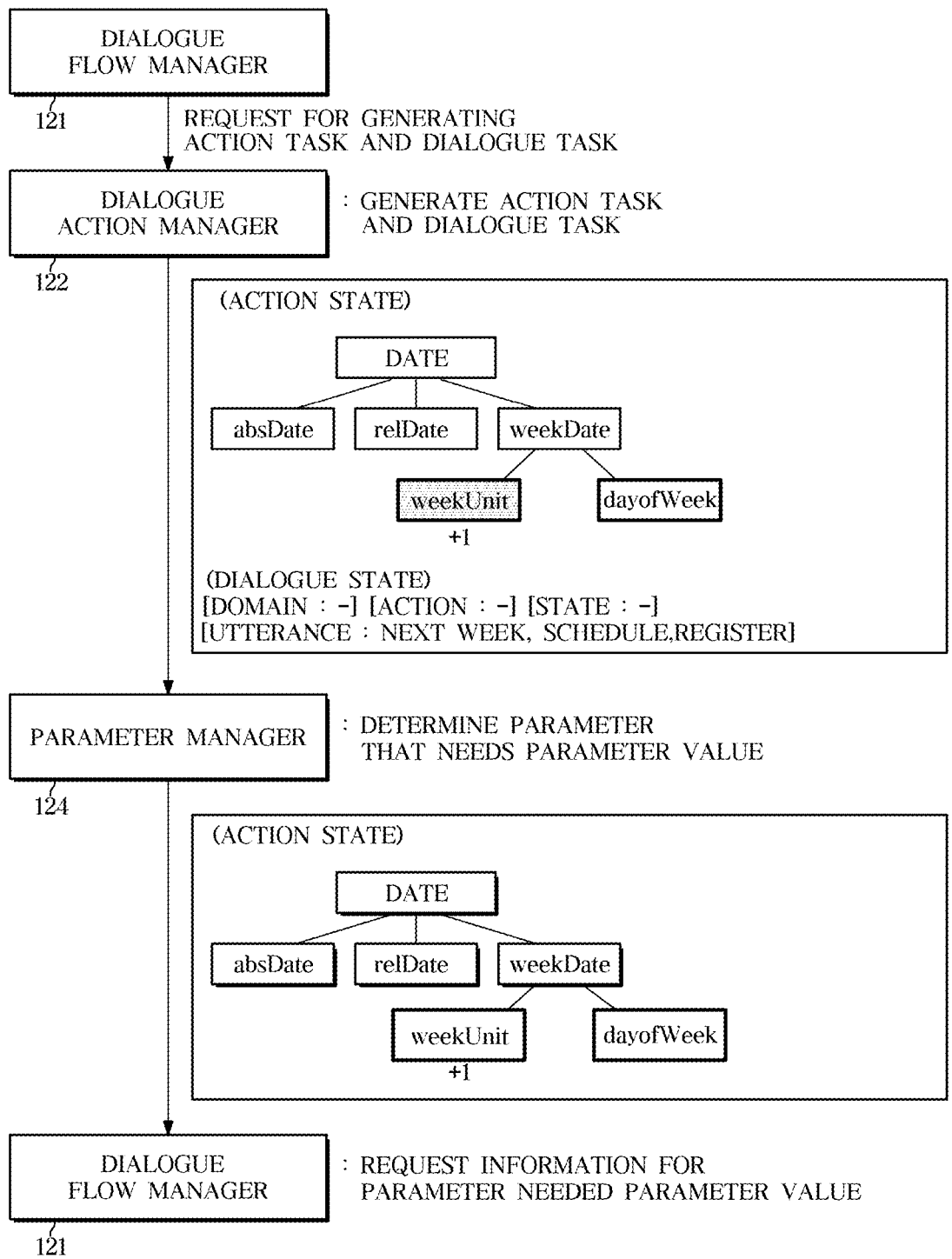

Referring to FIG. 26, the dialogue flow manager 121 searches the dialogue/action state DB 147 to determine whether there is a dialogue task or an action task in progress. At this time, the dialogue policy DB 148 may be referred to. In this example, it is assumed that there is no dialogue task or action task in progress. The dialogue flow manager 121 requests the dialogue action manager 122 to create an action task and a dialogue task corresponding to the output of the input processor 110. Creating action tasks and dialogue tasks means allocating storage space for storing and managing information about action states and dialogue states. Accordingly, the dialogue action manager 122 allocates storage space in the dialogue/action state DB 147 to store information about the action state and information about the dialogue state. At this time, an action task may be created in the form of a parameter tree in which a parameter is constructed with a hierarchy structure.

The dialogue action manager 122 requests the parameter manager 124 to extract a parameter tree associated with the schedule registration, which is an action associated with the schedule management. The parameter manager 124 extracts a date from the action parameter 146*a* as a required parameter used to perform a certain registration action and extracts a parameter tree corresponding to the date. The parameter tree extracted by the parameter manager 124 may be generated as an action task by the dialogue action manager 122. At this time, the required parameter 'date' may be placed in the top hierarchy of the parameter tree. The date may include the alternative parameters 'absolute date (absDate)', 'relative date (relDate)', and 'weekDate'. The 'weekDate' parameter may contain the partial parameters 'weekUnit' and 'dayofWeek'.

The parameter manager 124 may obtain a parameter value of a parameter constituting the parameter tree based on the speech recognition result transmitted from the input manager 111. The parameter manager 124 may match a parameter value of '+1' to the 'weekUnit', which is a partial parameter of 'weekDate'.

The dialogue action manager 122 may update the parameter tree in which the parameter value '+1' obtained by the parameter manager 124 matches the parameter value of the 'weekUnit', and the updated parameter tree may be stored in the dialogue/action state DB 147 as an action state.

The parameter manager 124 may identify a parameter for which the parameter value of the parameter tree stored in the dialogue/action state DB 147 is not matched, i.e., a parameter for which the parameter value is not filled.

The parameter manager 124 may identify parameters that are not filled with parameter values starting from the lowest hierarchy. It may be confirmed that there is no parameter value corresponding to 'dayofWeek' and 'weekUnit' which are partial parameters. Since all the partial parameters must be filled with the parameter values, the parameter manager 124 may determine the lowest hierarchy as a non-filled hierarchy and determine the parameter that requires the parameter value as 'dayofWeek'. The parameter manager 124 may transmit to the dialogue flow manager 121 information about the parameter 'day of the week' ('dayofWeek'), and the dialogue flow manager 121 may request the result processor 130 for information about parameters that require a parameter value.

Figure 27:
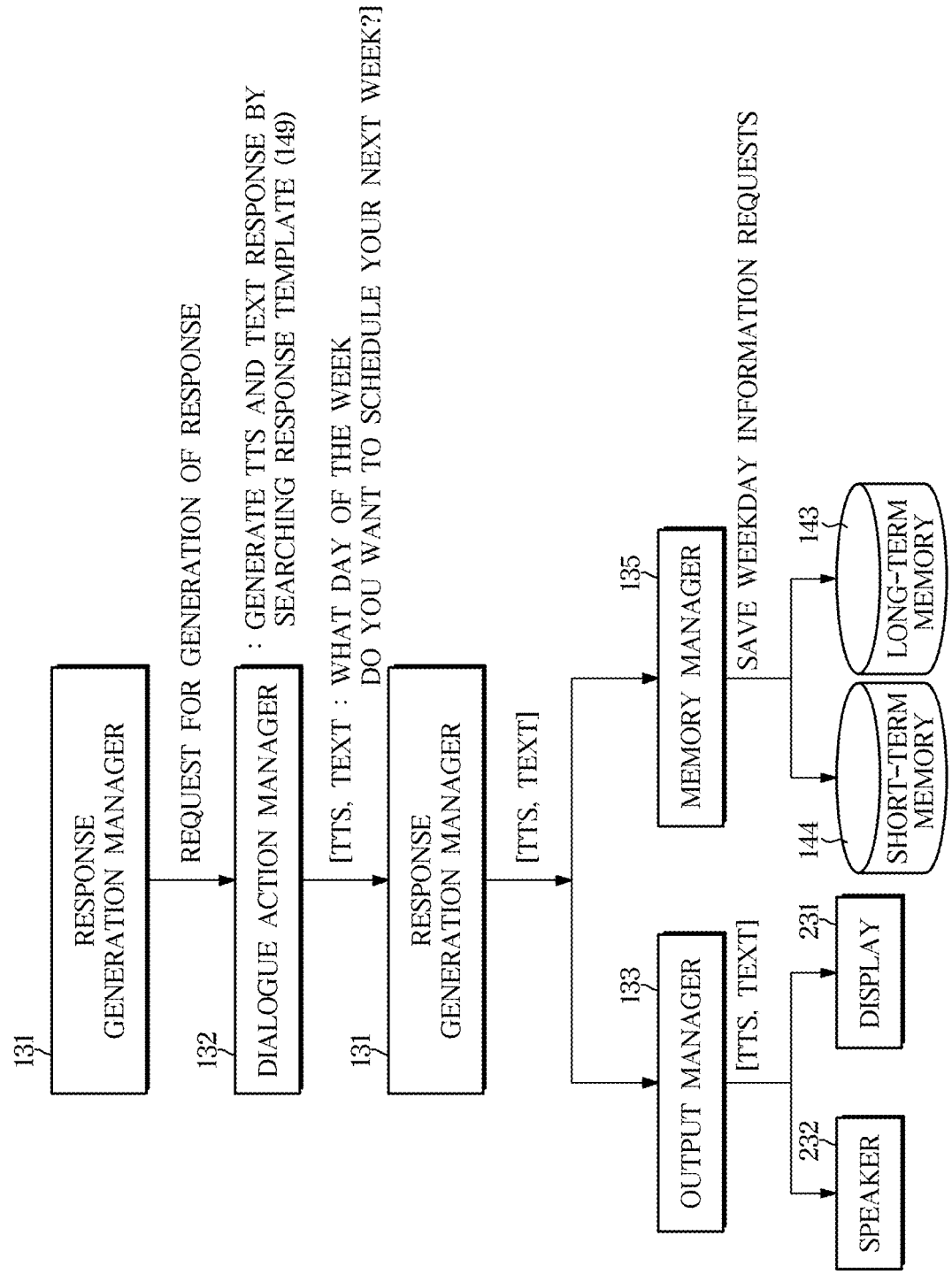

Referring to FIG. 27, the response generation manager 131 may request a dialogue response generator 132 to generate a response in response to a request from the dialogue flow manager 121. The dialogue response generator 132 retrieves the response template 149 to generate a TTS response, a text response. For example, the dialogue response generator 132 may create a dialogue response that will output TTS and text as "What day of the week do you want to register a schedule?"

The response generation manager 131 may transmit TTS response and text response generated by the dialogue response generator 132 to the output manager 133 and the memory manager 135. The output manager 133 may transmit the TTS response to the speaker 232 and transmit the text response to the display 231. The output manager 133 may transmit the TTS response to the speaker 232 after passing thorough the TTS module configured to combine the text to the speech.

The memory manager 135 may store that a user requests the route guidance, in the short-term memory 144 or the long-term memory 143. The memory manager 135 may store in the short-term memory 144 or in the long-term memory 143 that the dialogue system 100 has requested the user for the day of the week information.

Figure 28:
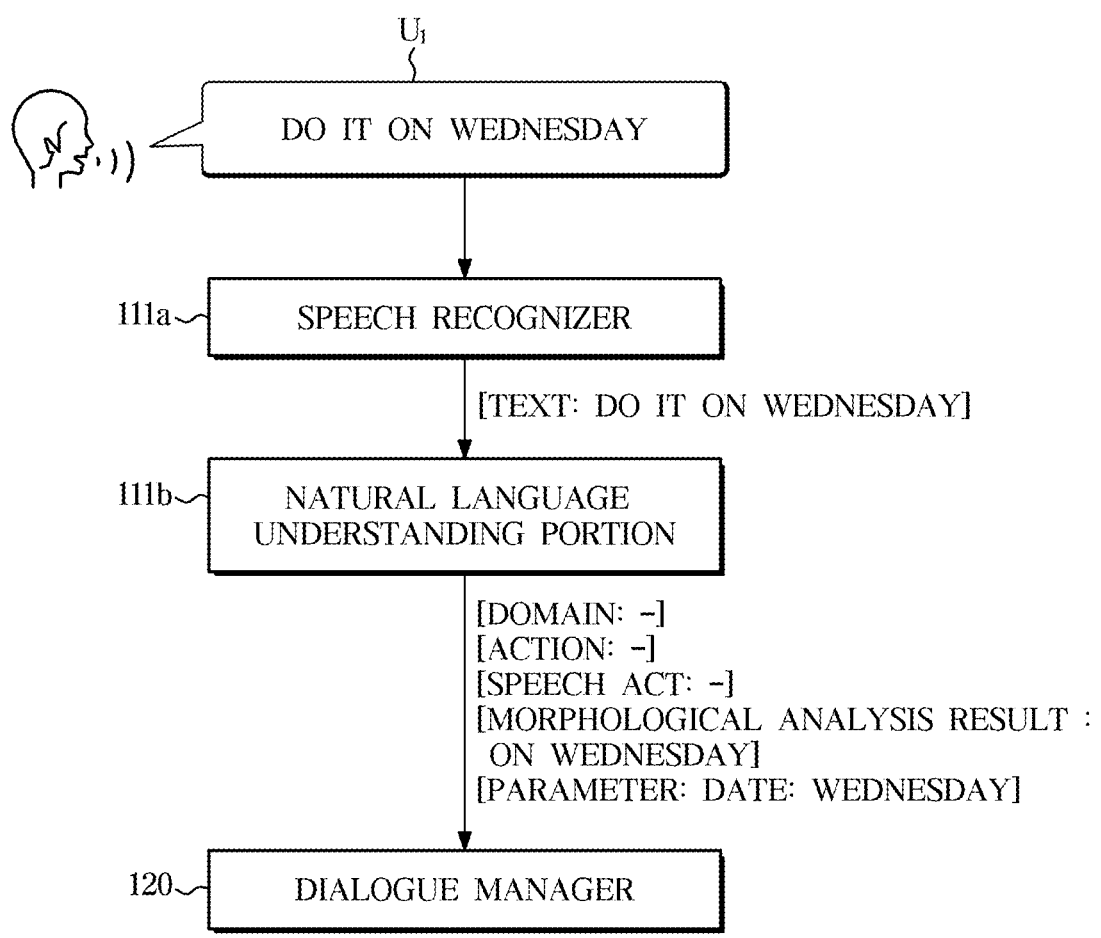
Figure 29:
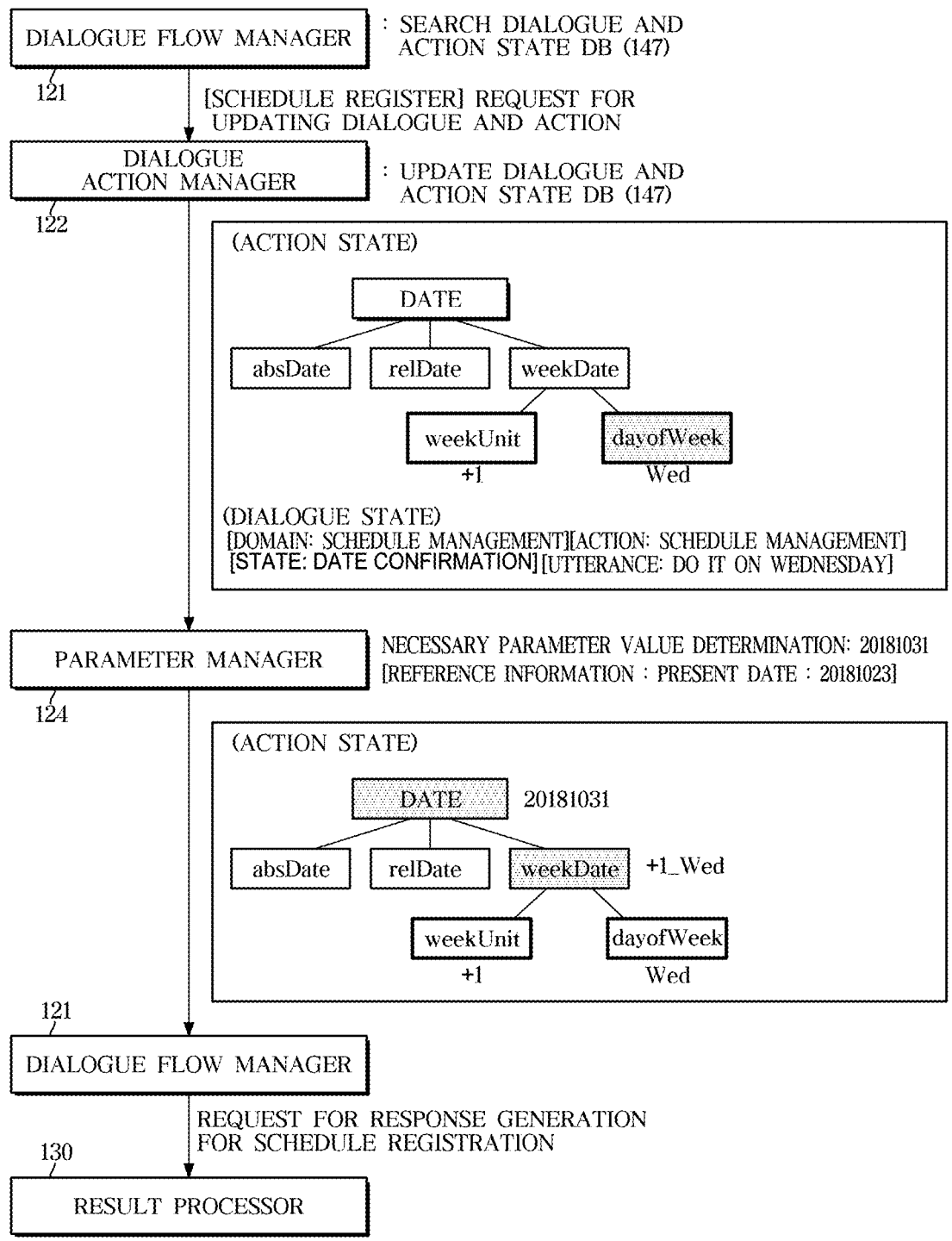

A dialogue response is displayed through the display 231 and the speaker 232 asking, "What day of the week do you want to register a schedule?" As shown in FIG. 28, when the user utters "Wednesday", the utterance of the user is input to the voice recognizer 111a and output as [text: Wednesday], and the natural language understanding portion 111b outputs [domain: -], [action: -], [speech: -], [morphological analysis result: Wednesday], and [parameter date: Wednesday] from the utterance of the user. The result of the natural language understanding is transmitted to the dialogue manager 120. Referring to FIG. 29, the dialogue flow manager 121 searches the dialogue/action status DB 147 to analyze the status of the previous dialogue and requests the dialogue action manager 122 to update an ongoing [schedule registration] related dialogue/action.

Referring to FIG. 29, the dialogue flow manager 121 searches the dialogue/action state DB 147 to analyze the previous dialogue state and requests the dialogue action manager 122 to update the ongoing [schedule registration] related dialogue/action.

The dialogue action manager 122 updates the dialogue state to [state: date check and updates it by adding a parameter value of 'Wed' to the 'dayofWeek' parameter that constitutes the date parameter tree as an action state. At this time, the parameter value 'Wednesday' (Wed) may be obtained by the parameter manager 124.

The parameter manager 124 sets the parameter value 'Wed' matched to the parameter value '+1' matched to the 'weekUnit' parameter and to the parameter 'dayofWeek', and therefore may obtain parameter values for the upper parameter 'weekDate' of these partial parameters ('weekUnit' and 'dayofWeek'). Parameter manager 124 may obtain '+1_Wed' as a parameter value for the 'weekDate' and determine the parameter value of the upper parameter 'date' of the alternative parameter 'weekDate'.

The ambiguity solver 123 retrieves reference information (current date) for solving the ambiguity in the long-term memory 143 and the short-term memory 144 or retrieves reference information (current date) through the external information manager 126. When the reference information (current date: 20181023) is obtained, the ambiguity resolver 123 may determine the parameter value of the top parameter 'date' to be '20181031'.

The parameter manager 124 receives the output result from the ambiguity solver 123 and may obtain '20181031' as a parameter value for the necessary parameter 'date' which is the highest parameter constituting the parameter tree. At this time, the parameter value '20181031' may be matched with 'date'. The dialogue action manager 122 may update the action state by adding the parameter value '20181031' to the necessary parameter 'date'.

Once the parameter value for the required parameter is obtained, the dialogue flow manager 121 may request the result processor 130 to generate a response for the schedule registration.

Figure 30:
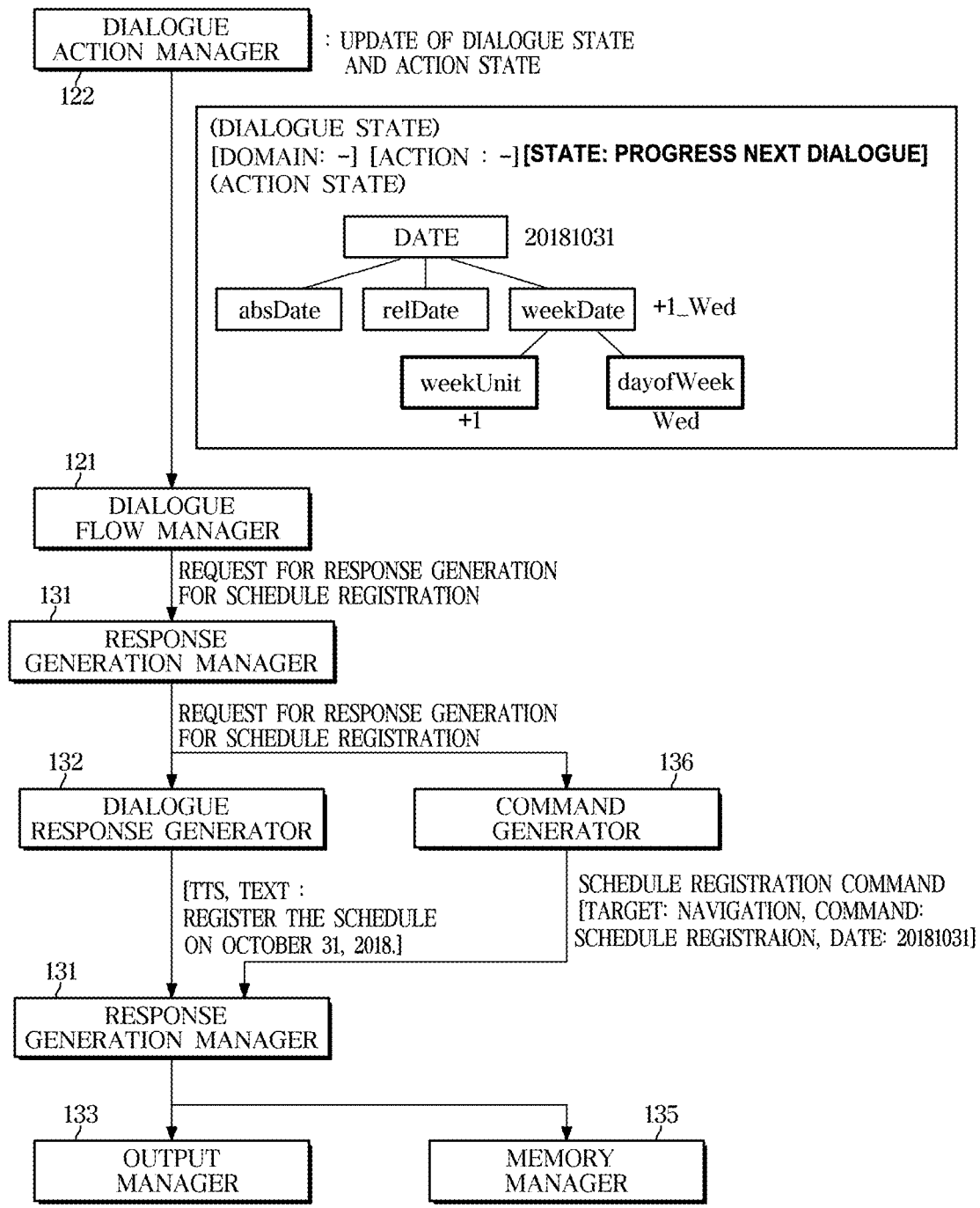

Referring to FIG. 30, the dialogue action manager 122 updates the dialogue state to [state: proceed to the next dialogue], and the dialogue flow manager 121 requests the response generation manager 131 to generate a response for schedule registration.

The response generator 132 may generate a dialogue response that may output the text "TTS has registered the schedule on Oct. 31, 2018" and transmit it to the response generation manager 131.

The response generator 132 may generate a dialogue response that may output the text and TTS has "registered the schedule on Oct. 31, 2018" and transmit it to the response generation manager 131.

The command generator 136 may generate a command (target: navigation, command: schedule registration, date: 20181031) for performing schedule registration and transmit it to the response generation manager 131.

The response generation manager 131 may transmit the generated dialogue response and command to the output manager 133. The output manager 133 may output the dialogue response via the display 231 and the speaker 232. The output manager 133 may transmit the route guidance command to the AVN 255 of the vehicle 200 via the vehicle controller 240 or to the external content server 300 providing the navigation service.

Thereafter, the dialogue flow manager 121 checks whether there is a dialogue that may be processed next. When the dialogue to be sequentially continued, is not present, the dialogue flow manager 121 may update the dialogue state to [state: IDLE] and wait for the user's input.

The above-mentioned flow of the data processing is merely an example applied to the dialogue system 100. Therefore, the order of processing data by each component of the dialogue system 100 is not limited to the above-mentioned example. Thus, the plurality of components may process the data at the same time, or the plurality of components may process the data in an order that is different from the above-mentioned example.

Hereinafter, according to embodiments of the present disclosure, a dialogue processing method is described below. The dialogue processing method may be applied to the above-mentioned dialogue system 100 or the vehicle 200 provided with the dialogue system 100. Therefore, the description of FIGS. 1 to 30 will be applied to the dialogue processing method in the same manner.

Figure 31:
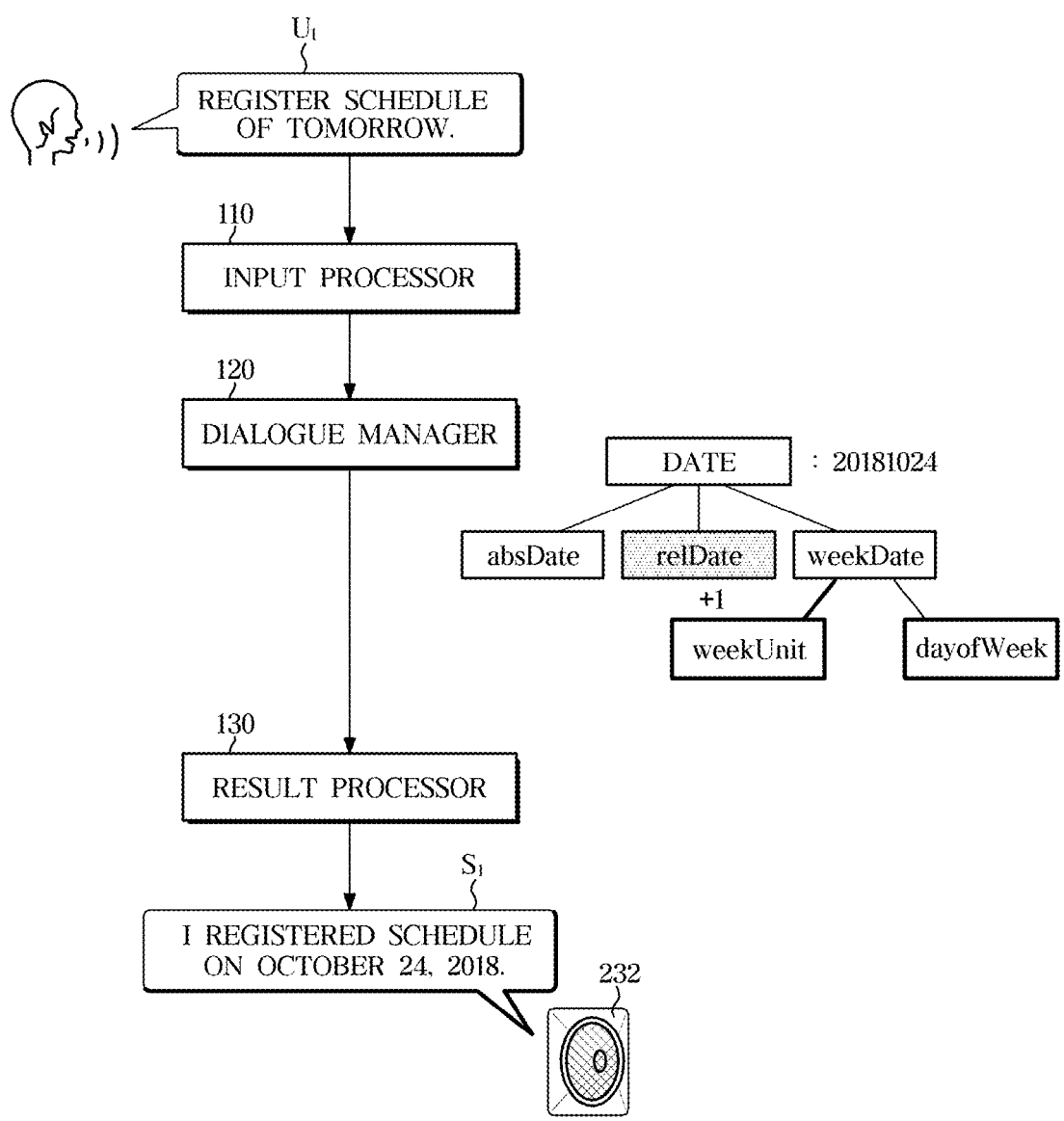
FIG. 31 is a flowchart illustrating a method of processing dialogue in accordance with embodiments of the present disclosure.

FIG. 31 is a flowchart illustrating a method of processing dialogue in accordance with embodiments of the present disclosure.

Referring to FIG. 31, when a user inputs a utterance (U1: "schedule registration tomorrow") requesting a schedule registration request, the input processor 110 outputs the speech recognition result of the user's utterance and transmits the result to the dialogue manager 120.

The dialogue manager 120 searches the action parameter 146a for a parameter tree for a necessary parameter (date) for performing a schedule registration with reference to the speech recognition result. The alternative parameter 'RelDate' located in the lower hierarchy of the necessary parameter may be filled with the parameter value '+1'.

The dialogue manager 120 sets the 'relDate' of the alternative parameter 'absDate', 'relDate', and 'weekDate'. ' relDate' is filled in and it may be confirmed that the hierarchy in which these alternative parameters are located is filled.

The dialogue manager 120 may obtain the parameter value 20181024 for the parameter 'date' located in the upper hierarchy based on the parameter value '+1' of the relative parameter 'relDate'. At this time, the parameter value '20181024' is acquired based on the reference information (current date 20181023) received from the storage 140 or the external content server 300 and the parameter value '+1' of the 'relative date (relDate)'.

When the parameter value '20181023' for the necessary parameter 'date' is obtained, the result processor 130 transmits a schedule registration command to the navigation system and transmits a message indicating that schedule registration has been performed and outputs (S1: "registered the schedule on Oct. 24, 2018").

Figure 32A:
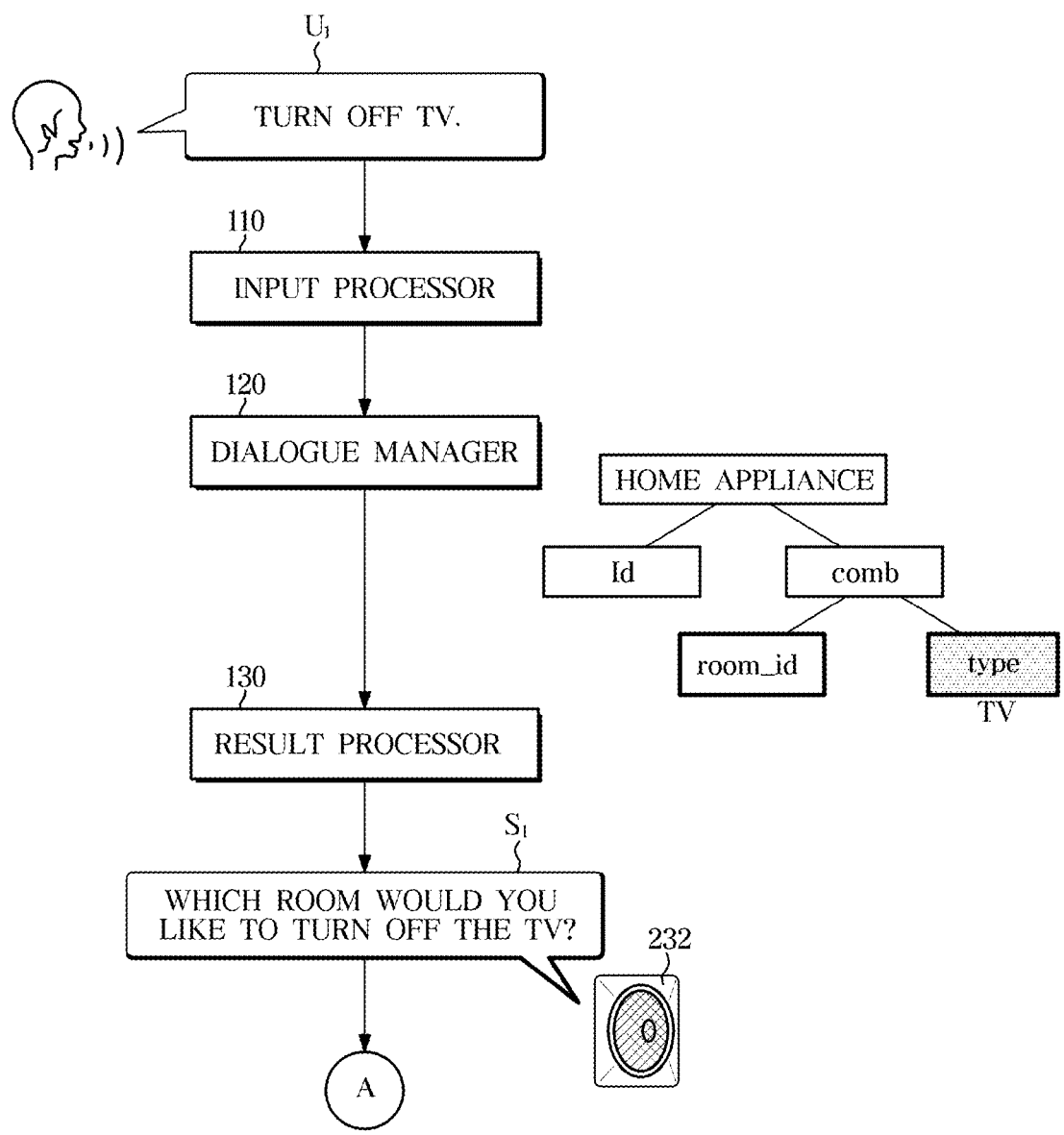
FIGS. 32A and 32B is a flowchart illustrating a method of processing dialogue in accordance with embodiments of the present disclosure.
Figure 32B:
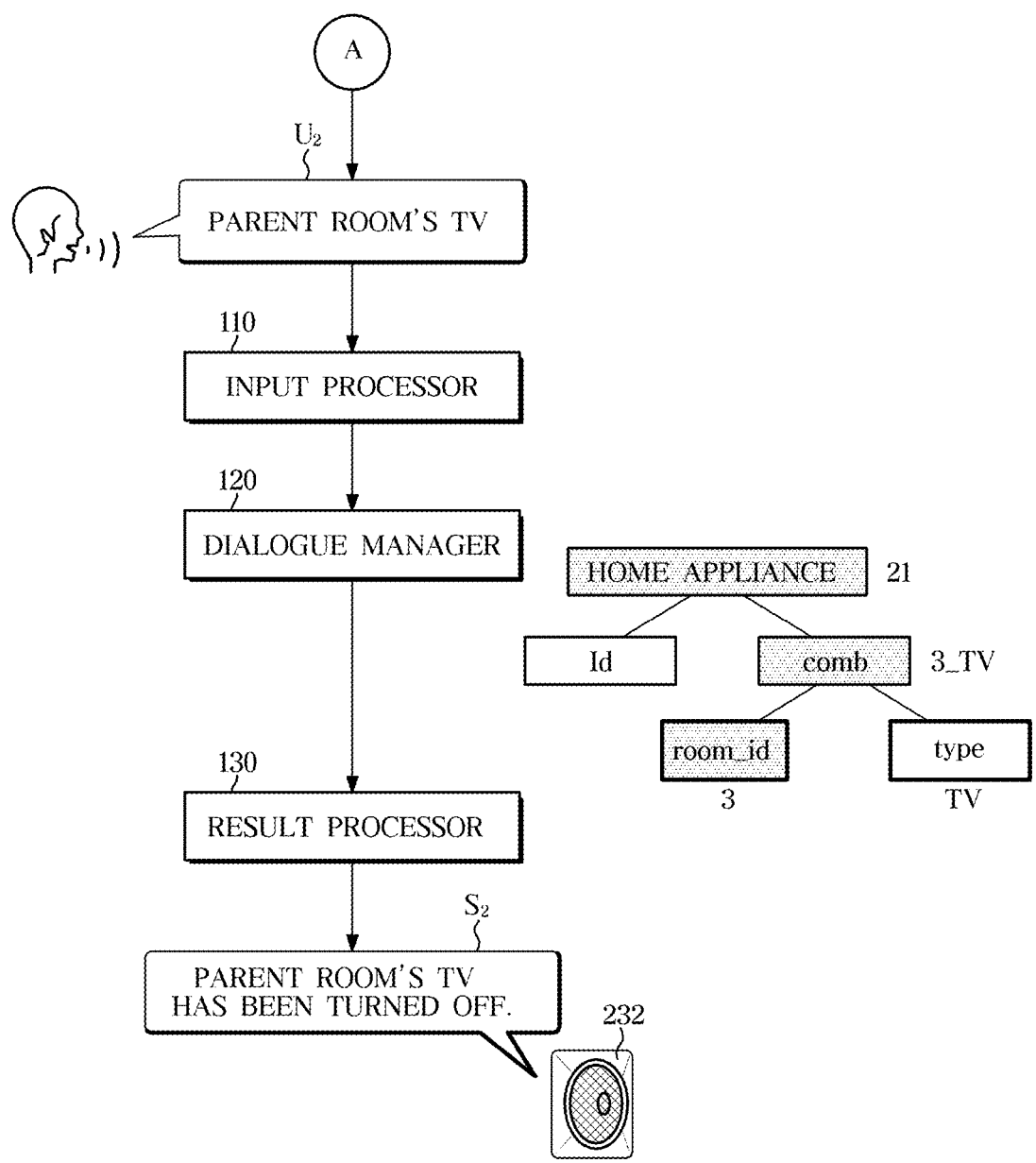

FIGS. 32A and 32B are flowcharts illustrating a method of processing dialogue in accordance with embodiments of the present disclosure.

Referring to FIG. 32A, when a user inputs an utterance (U1: "Turn off TV.") for requesting a home appliance control, the input processor 110 outputs a voice recognition result corresponding to the users utterance.

The dialogue manager 120 searches the action parameter 146a for the parameter tree for the necessary parameter (home appliance) for performing the home appliance control with reference to the speech recognition result. The parameter value 'TV' may be filled in the sub-parameter 'type' contained in the alternative parameter 'combination information(comb)' in the lower hierarchy of the necessary parameter.

Since the parameter values are only filled in the 'parameter' of the partial parameter 'room_id' and 'type' of the 'comb' information, the dialogue manager 120 may confirm that the hierarchy in which the partial parameter 'room_id' and 'type' are located is not filled.

The dialogue manager 120 may determine the remaining partial parameter 'room_id' as a parameter whose parameter value is not filled. The dialogue manager 120 may transmit the information indicating that the parameter requiring the parameter value is 'room_id' to the result processor 130.

The result processor 130 outputs an ignition requesting information on 'room_id' (S1: "Which room do you want to turn off the TV?"), the result processor 130 may request information for acquiring a parameter value for 'room_id' to the user.

Hereinafter, as shown in FIG. 32B, when a user inputs a utterance (U2: "The parent room's TV.") that provides information on 'room_id', based on the speech recognition result of the input processor 110, the dialogue manager 120 may fill the parameter value '3' with respect to 'room_id'.

If parameter values for both the partial parameters 'room_id' and 'type' are filled, the dialogue manager 120 may obtain the parameter value for the 'comb' information, which is an upper parameter of 'space_id' and 'type', as '3_TV'.

The dialogue manager 120 may obtain the parameter value '21' for the parameter 'household appliance' located in the upper hierarchy based on the parameter value '3_TV' of the alternative parameter 'comb'. At this time, the parameter value '21' may be acquired based on the reference information (identification information of the parent room's TV) received from the storage 140 or the external content server 300.

When the parameter value '21' for the necessary parameter 'home appliance' is obtained, the result processor 130 transmits the home appliance control command to the navigation system and transmits an utterance (S1: "Parent room's TV has been turned off.").

Figure 33A:
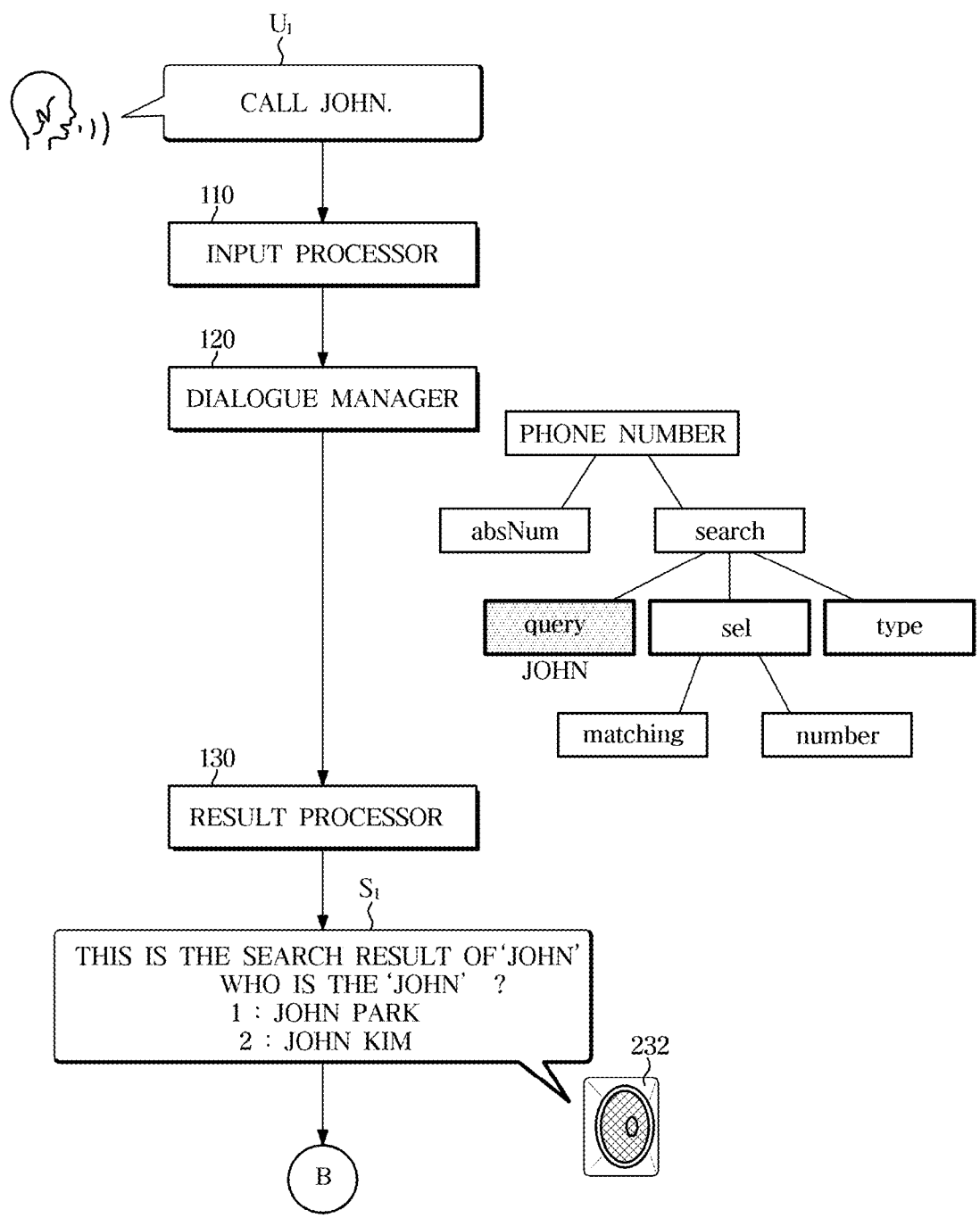
FIG. 33A-33C are flowcharts illustrating a method of processing dialogue in accordance with embodiments of the present disclosure.
Figure 33B:
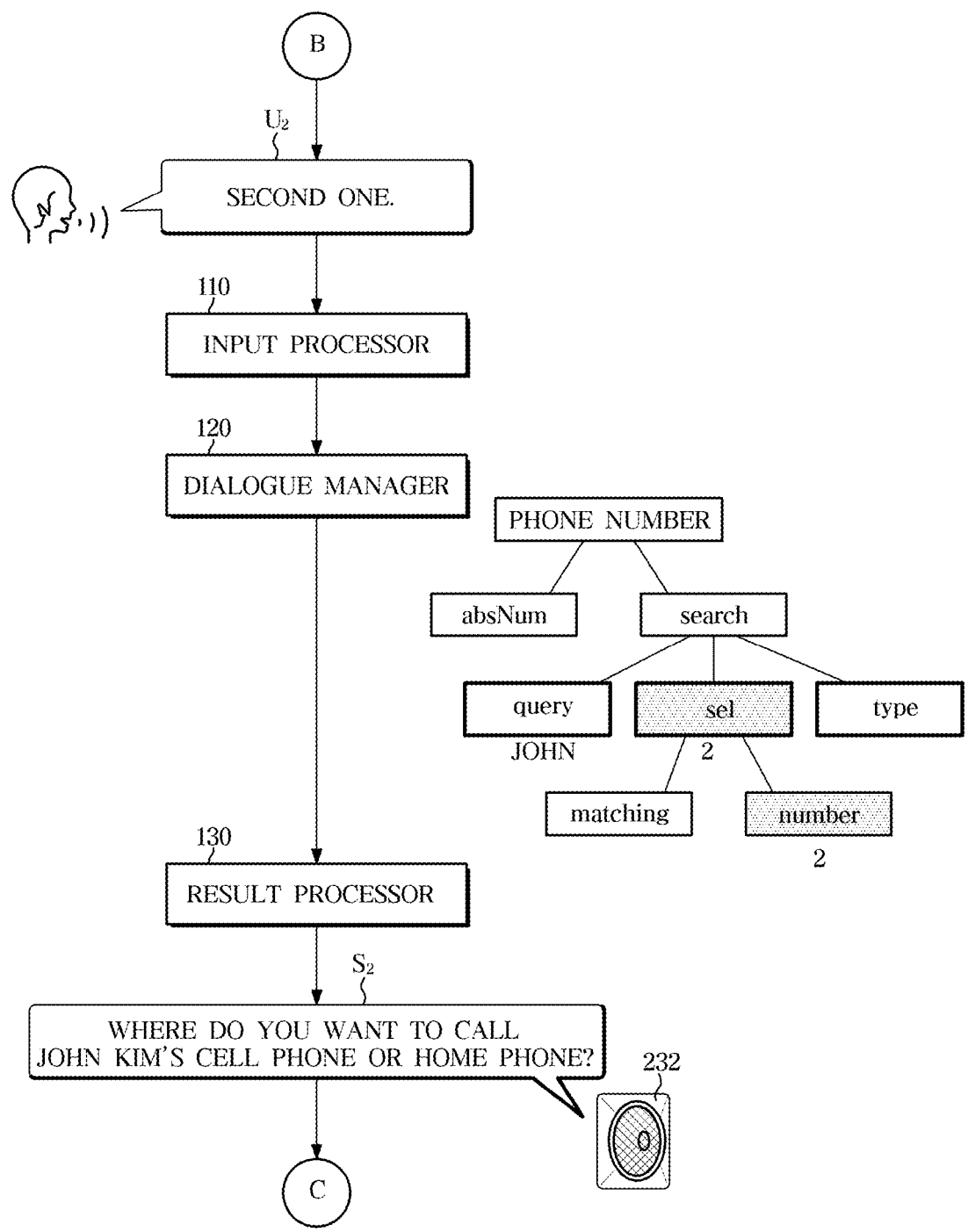
Figure 33C:
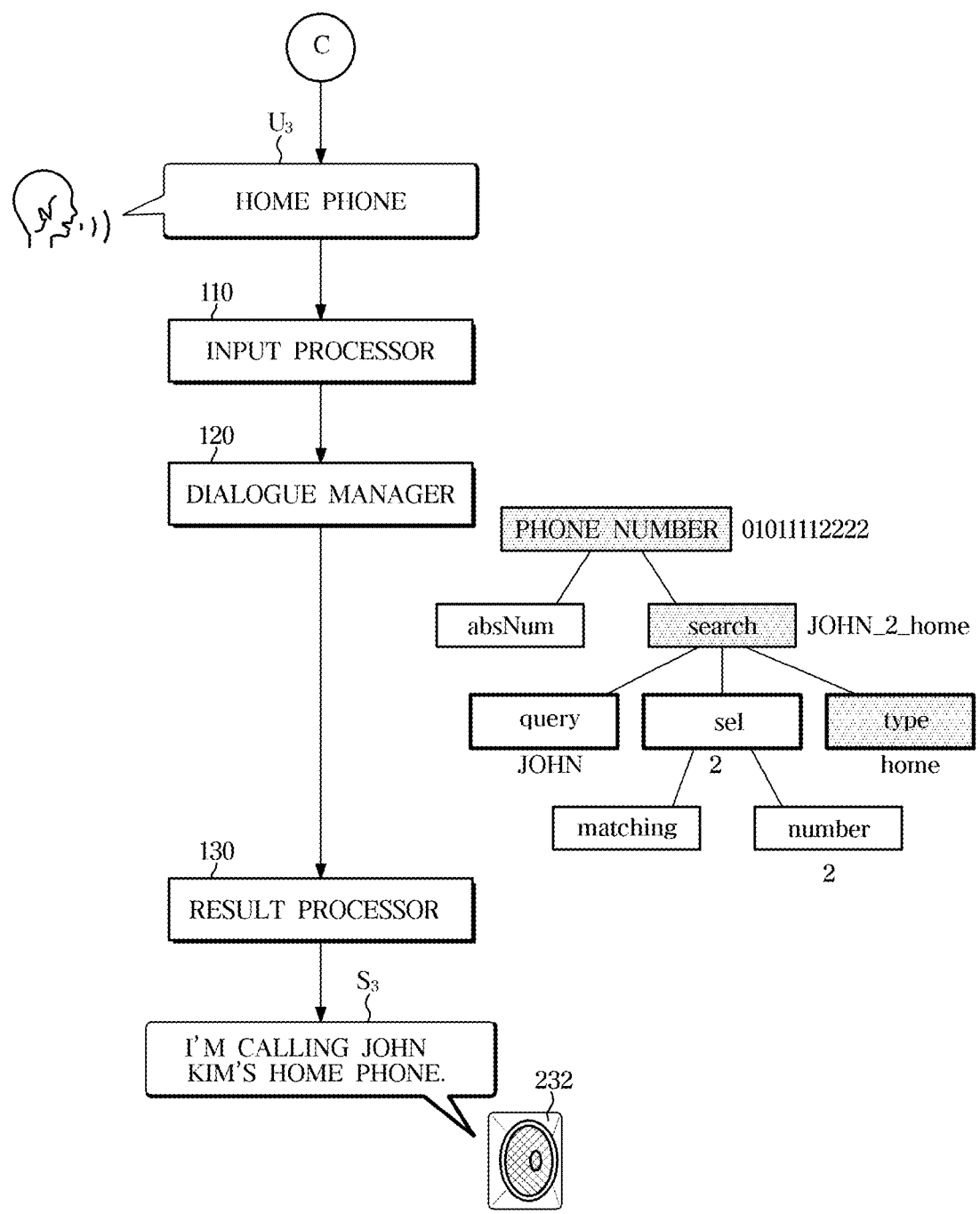

FIGS. 33A-33C are flowcharts illustrating a method of processing dialogue in accordance with embodiments of the present disclosure.

Referring to FIG. 33A, when a user inputs an utterance (U1: "Call John") for making a telephone call request, the input processor 110 outputs a speech recognition result on the user's utterance and transmits it to the dialogue manager 120).

The dialogue manager 120 searches the action parameter 146a for a parameter tree for necessary parameters (telephone numbers) for performing home appliances control by referring to the speech recognition result, and an alternative parameter, 'search', located in the lower hierarchy of the required parameter (phone number), the parameter value 'John' may be filled in the 'query' among the partial parameters 'query', 'select', and 'type'.

The parameter value is filled only for 'query' among 'query', 'select', and 'type'. The dialogue manager 120 may determine the partial parameter 'select' as a parameter whose parameter value is not filled and transmit 'select' 'that requires a parameter value to the result processor 130.

The partial parameter 'type' may also be determined as a parameter requiring a parameter value. However, a case where a parameter 'select' is determined as a parameter is explained as an example. On the other hand, the parameter tree may arrange the partial parameters located in the same hierarchy in a predetermined order and the dialogue manager 120 may determine the parameters that require parameter values based on the arrangement order.

The result processor 130 may generate an instruction to search for a telephone number of 'John' based on a parameter value 'John' for 'query'.

The result processor 130 outputs an inquiry requesting information on 'select' (S1: 'John' search result: Who is 'John'? 1: John Park 2: John Kim), the result processor 130 may request information for acquiring a parameter value for 'select'.

Subsequently, as shown in FIG. 33B, when the user inputs a utterance (U2: "Second one") providing information on the 'select', it is based on the speech recognition result of the input processor 110 and the dialogue manager 120 may fill in the parameter value '2' for 'select'.

The parameter value is filled only for 'query' and 'select' among 'query', 'select', and 'type' parameters. The dialogue manager 120 may determine the partial parameter 'type' as a parameter whose parameter value is not filled and the transmit 'type' that requires a parameter value to the result processor 130.

The result processor 130 may filter the search result based on the parameter values '2' for parameter value 'Select' and 'John' for 'query'. At the same time, the result processor 130 outputs a parameter value for 'type' to the user by outputting an utterance (S1: "Where do you want to call John Kim's? At the home phone or at the cell phone?") to request information on 'type'. The result processor 130 may request information for acquisition.

Hereinafter, Referring to FIG. 33C, when a user inputs an utterance (U3: "home phone") for providing information on a 'type', a dialogue is generated based on the speech recognition result of the input processor 110. The dialogue manager 120 may fill in the parameter value 'home' for 'type' based on the result.

If the parameter values for all the partial parameters 'query', 'select', and 'type' are filled, the dialogue manager 120 may obtain the parameter value for 'search', which is an upper parameter of 'query', 'select', and 'type', as 'John_2_home'.

The dialogue manager 120 may obtain the parameter value '01011112222' for the parameter 'phone number' located in the upper hierarchy based on the parameter value 'John_2_home' of the alternative parameter 'search'.

At this time, the parameter value '01011112222' may be acquired based on the reference information (telephone directory information) received from the storage 140 or the external contents server 300.

When the parameter value '01011112222' for the necessary parameter 'phone number' is obtained, the result processor 130 transmits a telephone dialing command to the communication device 280, and outputs S3: "I'm calling John Kim's Home Phone.").

In this way, the action parameter is obtained based on the parameter tree constructed with the hierarchy structure so that the user may grasp and request necessary information even when the user utters various natural language expressions or provides only partial information. Therefore, the intention of the user may be grasped more accurately.

The flow of data processing described above is merely an example applied to the dialogue system 100. Therefore, the order in which data is processed by each component of the dialogue system 100 is not limited to the above-described example, and a plurality of components may process data at the same time.

Figure 34:
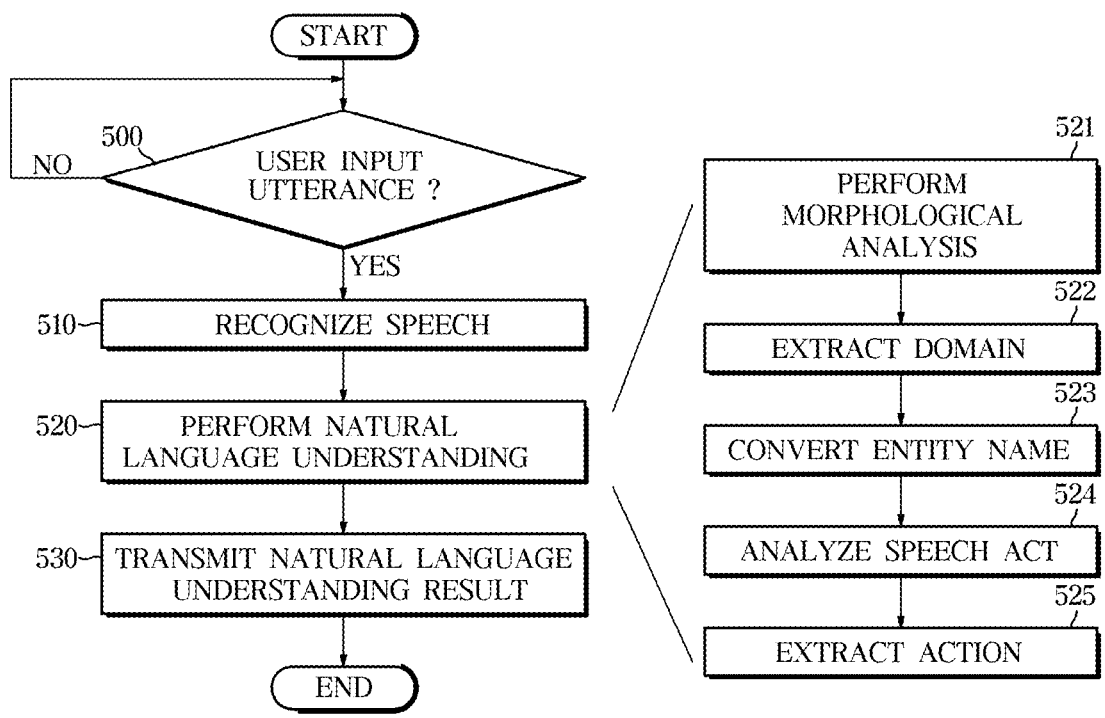
FIG. 34 is a flowchart illustrating a method of processing a user's input in a dialogue processing method in accordance with embodiments of the present disclosure.

FIG. 34 is a flowchart illustrating a method of processing a user's input in a dialogue processing method in accordance with embodiments of the present disclosure. The method of processing the user's input may be performed in the input processor 110 of the dialogue system 100.

As shown in FIG. 34, when a user's utterance is input (YES in 500), the speech recognizer 111a may recognize the input user's utterance (510). The user's utterance may be input to the speech input device 210 provided in the vehicle 200 or the speech input device 410 provided in the mobile device 400.

The speech recognizer 111a may recognize the input user's utterance and output an utterance in the text form.

The natural language understanding portion 111b may apply the natural language understanding technology to the utterance in the text form (520) and may output a result of the natural language understanding.

Particularly, the natural language understanding process (520) may include performing morphological analysis on the utterance in the form of text (521), extracting a domain from the utterance based on the morphological analysis result (522), recognizing an entity name (523), analyzing a speech act (524) and extracting an action (525).

The extraction of the domain, the recognition of the entity name and the extraction of the action may be performed by referring to the domain/action inference rule DB 141.

The output of the natural language understanding portion 111b, i.e., the result of the natural language understanding, may include a domain, an action, a speech act, and a result of the morphological analysis corresponding to the user's utterance.

The natural language understanding portion 111b may transmit the natural language understanding result to the dialogue manager 120 (530). In addition to the natural language understanding result, various context information input through the non-speech input may be transmitted to the dialogue manager 120 by the input processor 110.

Figure 35:
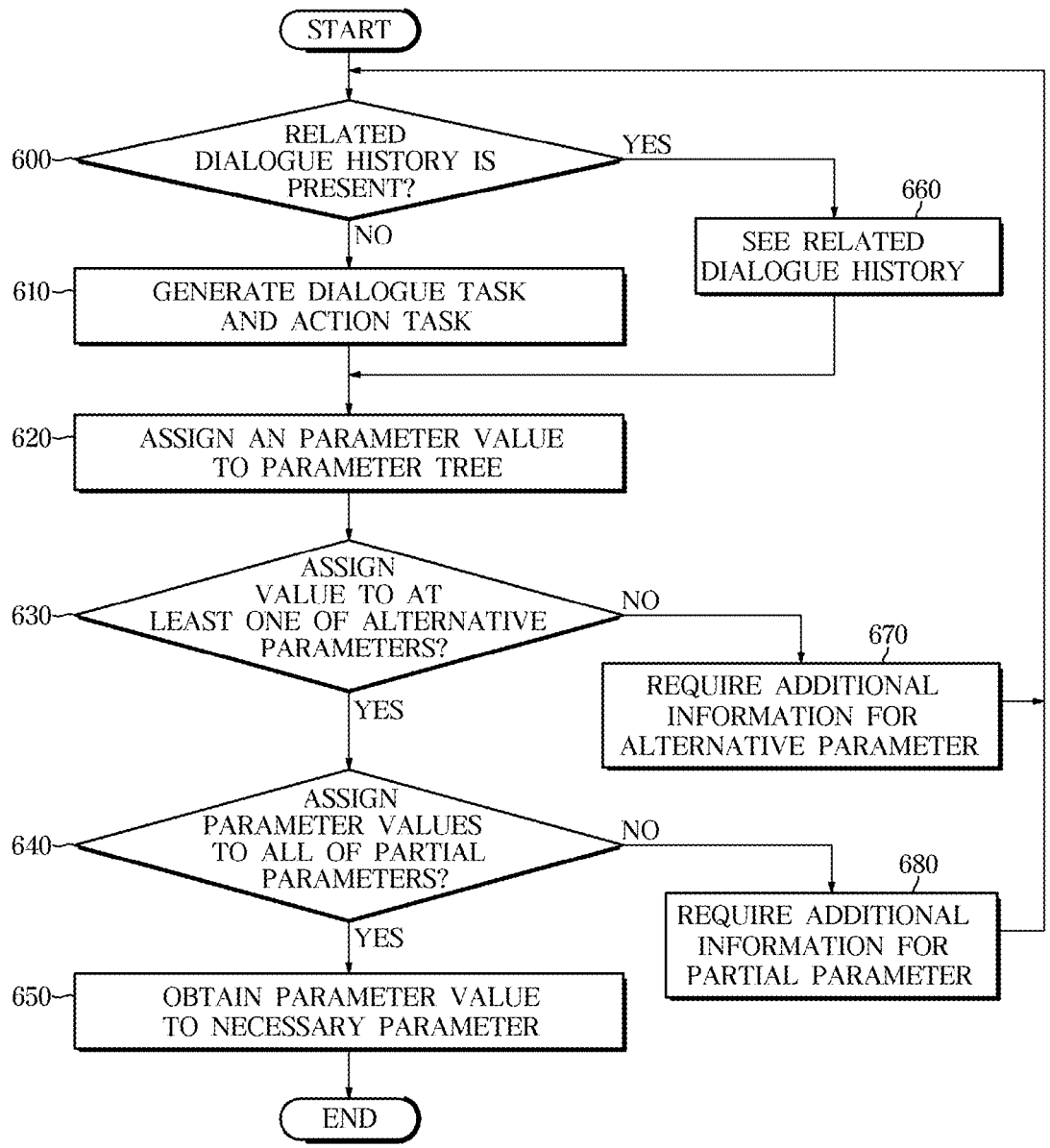
FIG. 35 is a flowchart illustrating a method of managing the dialogue using the output of the input processor in the dialogue processing method in accordance with embodiments of the present disclosure.

FIG. 35 is a flowchart illustrating a method of managing the dialogue using the output of the input processor in the dialogue processing method in accordance with embodiments of the present disclosure. A method for managing a dialogue may be performed in the dialogue manager 120 of the dialogue system 100.

Referring to FIG. 35, the dialogue flow manager 121 searches for a dialogue history in the dialogue/action status DB 147 (600).

If there is a related dialogue history (Yes in 600), refer to it (660) and if not (No in 600), create a new dialogue task and action task (610). The parameter manager 124 may search the action parameter DB 146a for a parameter tree corresponding to the user utterance based on the natural language understanding result. The parameter manager 124 may obtain a parameter value for a parameter constituting the parameter tree based on the natural language understanding result and assign a parameter value to the parameter tree 620.

In this example, a parameter tree is described where necessary parameters are located in the top hierarchy, alternative parameters are located in the lower hierarchy of the necessary parameters, and partial parameters are located in one of the alternative hierarchies.

After assigning a parameter value to the parameter tree, the parameter manager 124 may check whether a parameter value is assigned to at least one of the alternative parameters located in the same hierarchy (630).

If a parameter value is not assigned to at least one of the alternative parameters located in the same hierarchy (No in 630), an alternative parameter to which no parameter value is assigned may be determined as a parameter requiring additional information. the parameter manager 124 may transmit the information of the alternative parameter to which the parameter value is not allocated to the result processor 130. The result processor 130 may request additional information about the alternative parameter to which the parameter value is not allocated to the user (670).

In another example, if at least one of the alternative parameters is assigned a parameter value (e.g., 630), the parameter manager 124 may verify that the hierarchy in which the alternative parameter is located is filled and that the parameter value is located in the lower hierarchy of the filled alternative parameter whether parameter values are assigned to all of the partial parameters (640).

If parameter values are not assigned to all of the partial parameters (NO in 640). the parameter manager 124 may determine the partial parameter to which the parameter value is not assigned as a parameter requiring additional information. The parameter manager 124 may transmit the information of the partial parameter to which the parameter value is not assigned to the result processor 130 and the result processor 130 may request additional information about the alternative parameter to which the parameter value is not allocated to the user (680).

If parameter values are assigned to all of the partial parameters (e.g., 640). the parameter manager 124 may confirm that the hierarchy in which the partial parameter is filled and may obtain the parameter value of the necessary parameter located in the highest hierarchy of the parameter tree based on the parameter value filled in the parameter of each hierarchy 650.

In this case, if the user's utterance is ambiguous to obtain a parameter value for performing a specific action, the ambiguity solver 123 may determine the parameter value of the necessary parameter located in the highest hierarchy based on the reference information retrieved from the long term memory 143, the short term memory 144, or via the external information manager 126. The parameter manager 124 receives the output result from the ambiguity solver 123 and obtains a parameter value for a necessary parameter that is the highest parameter constituting the parameter tree (650).

It is also possible to retrieve the parameter values of the action parameters by searching the long-term memory 143, the short-term memory 144, or the dialogue/action status DB 147. When a parameter value of an action parameter is to be provided through an external service, a parameter value required from the external content server 300 may be provided through the external information manager 126.

In addition, when a situation or an utterance is ambiguous and necessary parameter values may not be obtained, ambiguity may be solved through the ambiguity solver 123 to obtain a necessary parameter value.

Also, even when the obtained parameter is an invalid parameter that is difficult to be used in performing an action, the ambiguity solver 123 may obtain a valid parameter from an invalid parameter.

The dialogue state and the action state managed by the dialogue action manager 122 may be updated each time the state is changed while the above-described steps are performed.

In the above-described example, it is described that the step 640 is performed after the step 630, but the steps 630 and 640 may be performed simultaneously or the steps of the step 630 and the step 640 may be changed depending on the configuration of the parameter tree.

In the case of determining action parameter based on the parameter tree in which the necessary parameter is located in the top hierarchy and the partial parameter is located in the lower hierarchy of the necessary parameter, and an alternative parameter is located in a lower hierarchy of one of the partial parameters, Step 640 may be followed by step 630.

FIG. 36 is a flowchart illustrating a result processing method for generating a response corresponding to a result of the dialogue management in the dialogue processing method in accordance with embodiments of the present disclosure. The result processing method may be performed by the result processor 130 of the dialogue system 100.

As shown in FIG. 36, when the generation of the dialogue response is needed (YES in 700), the dialogue response generator 132 may search the response template 149 (710). The dialogue response generator 132 may extract a dialogue response template corresponding to the current dialogue state and action state and may fill the response template with the needed parameter value to generate the dialogue response (720).

When the parameter value needed for the generation of the dialogue response is not transmitted from the dialogue manager 120, or when an introduction of using the external content, is transmitted, the needed parameter value may be provided from the external content server 300 or searched in the long-term memory 143, or the short-term memory 144.

When the generation of the command is needed (760), the command generator 136 may generate the command for the vehicle control or the external content (770).

The generated dialogue response or command may be input to the output manager 133. The output manager 133 may determine the output order between the dialogue response and the command or the output order among the plurality of the 10o commands (730).

The memory may be updated based on the generated dialogue response or command (740). The memory manager 135 may update the short-term memory 144 by storing the dialogue content between the user and the system based on the generated dialogue response or command. The memory manager 135 may update the long-term memory 143 by storing the information related to the user acquired through the dialogue with the user. The memory manager 135 may update the user's preference and the vehicle control history stored in the long-term memory 143 based on the generated and output vehicle control and external content request.

The output manager 133 may output the response by transmitting the dialogue response and command to an appropriate output position (750). TTS response may be output via the speaker 232 and the text response may be output on the display 231. The command may be transmitted to the vehicle controller 240 according to the control target, or to the external content server 300. In addition, the command may be transmitted to the communication device 280 configured to communicate with the external content server 300.

The dialogue processing method according to embodiments of the present disclosure is not limited the order in the above-mentioned flowchart. The flow according to the flowchart of FIGS. 31-36 may be merely an example applied to the dialogue processing method. Therefore, the plurality of steps may be performed at the same time it may be also possible to change the order of each step.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions that may be decoded by a computer are stored. For example, it may be a ROM (Read Only Memory), a RAM (Random Access Memory), a magnetic tape, a magnetic disk, a flash memory, an optical data storage device, or the like.

The foregoing description is merely illustrative of the technical idea of the present disclosure. Various modifications, alterations, and permutations thereof may be made without departing from the essential characteristics of the present disclosure.

Therefore, the embodiments and the accompanying drawings described above are intended to illustrate and not limit the technical idea. The scope of the technical idea is not limited by these embodiments and the accompanying drawings. The scope of which is to be construed in accordance with the following claims, and all technical ideas which are within the scope of the same shall be construed as being included in the scope of the right.

According to the dialogue system described above, the vehicle including the vehicle, and the dialogue processing method, the dialogue processing technique specialized for the vehicle environment may be used to provide the optimum service that meets the user's intention or the user.

According to the dialogue system described above, the vehicle including the vehicle, and the dialogue processing method, the dialogue processing technique specialized for the vehicle environment may be used to provide the optimum service that meets the user's intention or the user.

In particular, since the action parameter is obtained based on the parameter tree constructed with the hierarchy structure, the user may grasp and request necessary information even when the user utters various natural language expressions or provides only partial information. Therefore, the intention of the user may be grasped more accurately.

It may be possible to provide the service that is appropriate for the user's intent or that is needed for the user by precisely recognizing the user's intent based on a variety of information such as dialogue with the user and vehicle state information, driving environment information, and user information during the vehicle drives.

It may be possible to provide a dialogue system capable of providing a service in accordance with a user's real intent or services necessary for the user by precisely recognizing the user's intent based on a variety of information such as dialogue with the user during driving.

What is claimed is:

1. A dialogue system comprising:
    a storage configured to store a parameter tree including at least one parameter used for performing an action;
    a speech input device configured to receive speech from a user;
    an input processor configured to apply a natural language understanding algorithm to the received speech to generate a speech recognition result;
    a dialogue manager configured to determine an action corresponding to the received speech based on the speech recognition result, retrieve a parameter tree corresponding to the action from the storage, and determine additional information needed to perform the action based on the retrieved parameter tree; and
    a result processor configured to generate a dialogue response for requesting the additional information,
    wherein the dialogue manager determines whether a first hierarchy is filled based on whether a first parameter is an alternative parameter or a partial parameter when a parameter value for the first parameter located in the first hierarchy of the parameter tree is obtained, and determines information on a parameter that is not filled with the parameter value among parameters located in the first hierarchy as the additional information when the first hierarchy is not filled.

2. The dialogue system of claim 1, wherein
    the dialogue manager obtains a parameter value for at least one parameter included in the parameter tree from the speech recognition result, fills at least one parameter included in the parameter tree based on the obtained parameter value, and determines information on a parameter that is not filled with the parameter value as the additional information.

3. The dialogue system of claim 1, wherein
    the dialogue manager determines information on a partial parameter that is not filled with the parameter value of the partial parameter located in the first hierarchy as the additional information when the first parameter is the partial parameter.

4. The dialogue system of claim 3, wherein
    the dialogue manager confirms that the first hierarchy is filled when a parameter value for all partial parameters located in the first hierarchy is obtained and acquires a parameter value of an upper parameter of the first parameter based on a parameter value of all partial parameters located in the first hierarchy.

5. The dialogue system of claim 1, wherein
    the dialogue manager confirms that the first hierarchy is filled when the first parameter is the alternative parameter and acquires a parameter value of an upper parameter of the first parameter based on a parameter value of the first parameter.

6. The dialogue system of claim 5, wherein
    the dialogue manager determines information on a partial parameter that is not filled with the parameter value among the partial parameters located in the upper hierarchy of the first hierarchy as the additional information when the upper parameter of the first parameter is a partial parameter.

7. The dialogue system of claim 2, wherein
    the dialogue manager transmits the obtained parameter value to the result processor when the parameter value for the highest-order parameter of the parameter tree is obtained, and wherein
    the result processor generates an interactive response for performing an action corresponding to the received speech based on a parameter value for the highest parameter.

8. The dialogue system of claim 7, wherein
    the storage stores status information including at least one of vehicle status information related to the status of the vehicle, user information related to the driver of the vehicle, or driving environment information related to the driving environment of the vehicle, and wherein
    the dialogue manager converts the parameter value of the highest parameter into information of a predetermined format based on the context information.

9. The dialogue system of claim 7, wherein
    the dialogue manager obtains the parameter value of at least one parameter included in the parameter tree based on the status information.

10. A dialogue processing method having a dialogue system including a storage configured to store a parameter tree including at least one parameter used for performing an action, the dialogue processing method comprising:
    receiving speech from a user;
    generating a speech recognition result by applying a natural language understanding algorithm;
    determining the action corresponding to the received speech based on the speech recognition result, retrieving the parameter tree corresponding to the action from the storage, and determining additional information needed to perform the action based on the retrieved parameter tree; and
    generating a dialogue response for requesting the additional information,
    wherein determining additional information needed to perform the action comprises, determining whether a first hierarchy is filled based on whether a first parameter is an alternative parameter or a partial parameter when a parameter value for the first parameter located in the first hierarchy of the parameter tree is obtained, and determining information on a parameter that is not filled with the parameter value among parameters located in the first hierarchy as the additional information when the first hierarchy is not filled.

11. The dialogue processing method of claim 10, wherein determining additional information needed to perform the action comprises, obtaining a parameter value for at least one parameter included in the parameter tree from the speech recognition result, filling at least one parameter included in the parameter tree based on the obtained parameter value, and determining information on a parameter that is not filled with the parameter value as the additional information.

12. The dialogue processing method of claim 10, wherein determining additional information needed to perform the action comprises, determining information on a partial parameter that is not filled with the parameter value of the partial parameter located in the first hierarchy as the additional information when the first parameter is the partial parameter.

13. The dialogue processing method of claim 12, wherein determining additional information needed to perform the action comprises, confirming that the first hierarchy is filled when a parameter value for all partial parameters located in the first hierarchy is obtained, and obtaining a parameter value of an upper parameter of the first parameter based on a parameter value of all partial parameters located in the first hierarchy.

14. The dialogue processing method of claim 10, wherein determining additional information needed to perform the action comprises, confirming that the first hierarchy is filled when the first parameter is the alternative parameter, and obtaining a parameter value of an upper parameter of the first parameter based on a parameter value of the first parameter.

15. The dialogue processing method of claim 14, wherein determining additional information needed to perform the action comprises, determining information on a partial parameter that is not filled with the parameter value among the partial parameters located in the upper hierarchy of the first hierarchy as the additional information when the upper parameter of the first parameter is a partial parameter.

16. The dialogue processing method of claim 11, further comprising:
when the parameter value for a highest-order parameter of the parameter tree is obtained, generating a speech response for performing an action corresponding to the received speech based on the obtained parameter value.

17. The dialogue processing method of claim 16, wherein the storage stores status information including at least one of vehicle status information related to the status of the vehicle, user information related to the driver of the vehicle, or driving environment information related to the driving environment of the vehicle, and wherein
generating a speech response for performing an action corresponding to the received speech comprises converting the parameter value of the highest parameter into information of a predetermined format based on the status information.

18. The dialogue processing method of claim 16, wherein determining additional information needed to perform the action comprises, obtaining the parameter value of at least one parameter included in the parameter tree based on the status information.

19. A computer program stored on a recording medium, the recording medium disposed in a computer device and coupled to a processor, wherein the execution of the computer program by the processor causes the computer device to provide functions comprising:
receiving speech from a user;
generating a speech recognition result by applying a natural language understanding algorithm;
determining an action corresponding to the received speech based on the speech recognition result, retrieving a parameter tree corresponding to the action from the storage, and determining additional information needed to perform the action based on the retrieved parameter tree; and
generating a dialogue response for requesting the additional information,
wherein determining additional information needed to perform the action comprises, determining whether a first hierarchy is filled based on whether a first parameter is an alternative parameter or a partial parameter when a parameter value for the first parameter located in the first hierarchy of the parameter tree is obtained, and determining information on a parameter that is not filled with the parameter value among parameters located in the first hierarchy as the additional information when the first hierarchy is not filled.

* * * * *